United States Patent [19]

Cheng

[11] Patent Number: 5,852,448
[45] Date of Patent: Dec. 22, 1998

[54] STROKE-BASED FONT GENERATION INDEPENDENT OF RESOLUTION

[75] Inventor: Kuo-Young Cheng, Taichung Hsien, Taiwan

[73] Assignee: DynaLab Inc., Taipei, Taiwan

[21] Appl. No.: 787,083

[22] Filed: Jan. 22, 1997

Related U.S. Application Data

[63] Continuation-in-part of Ser. No. 717,172, Sep. 20, 1996.
[51] Int. Cl.$^6$ ..................................................... G06F 15/00
[52] U.S. Cl. ............................................................ 345/469
[58] Field of Search .................................... 345/467, 468, 345/469, 470, 141, 142

[56] References Cited

U.S. PATENT DOCUMENTS

| | | | |
|---|---|---|---|
| 5,301,267 | 4/1994 | Hassett et al. | 345/469 |
| 5,757,384 | 5/1998 | Ikeda et al. | 345/468 |

*Primary Examiner*—Phu K. Nguyen
*Attorney, Agent, or Firm*—Christensen O'Connor Johnson & Kindness PLLC

[57] ABSTRACT

A method and apparatus for producing a stroked-based font defined by a stroke representation displayable on high or low-resolution output device. The stroke representation includes defining a basic stroke with key points and width values as its primary parameters and feature points and curve ratios stored in a predefined curve level tree type data structure as its secondary parameters. Curve ratios are retrieved from the curve level table according to resolution level of the output device. Also, hinting information for certain key points provides for a better displayed stroke in low resolution space. Hinting information is activated according to predefined data associated with the curve level table. A CAD tool allows a font designer to easily select the parameters for the design of basic strokes and stroke shapes. The CAD tool presents a real-time display of sample characters at various bitmap sizes during font creation.

20 Claims, 50 Drawing Sheets

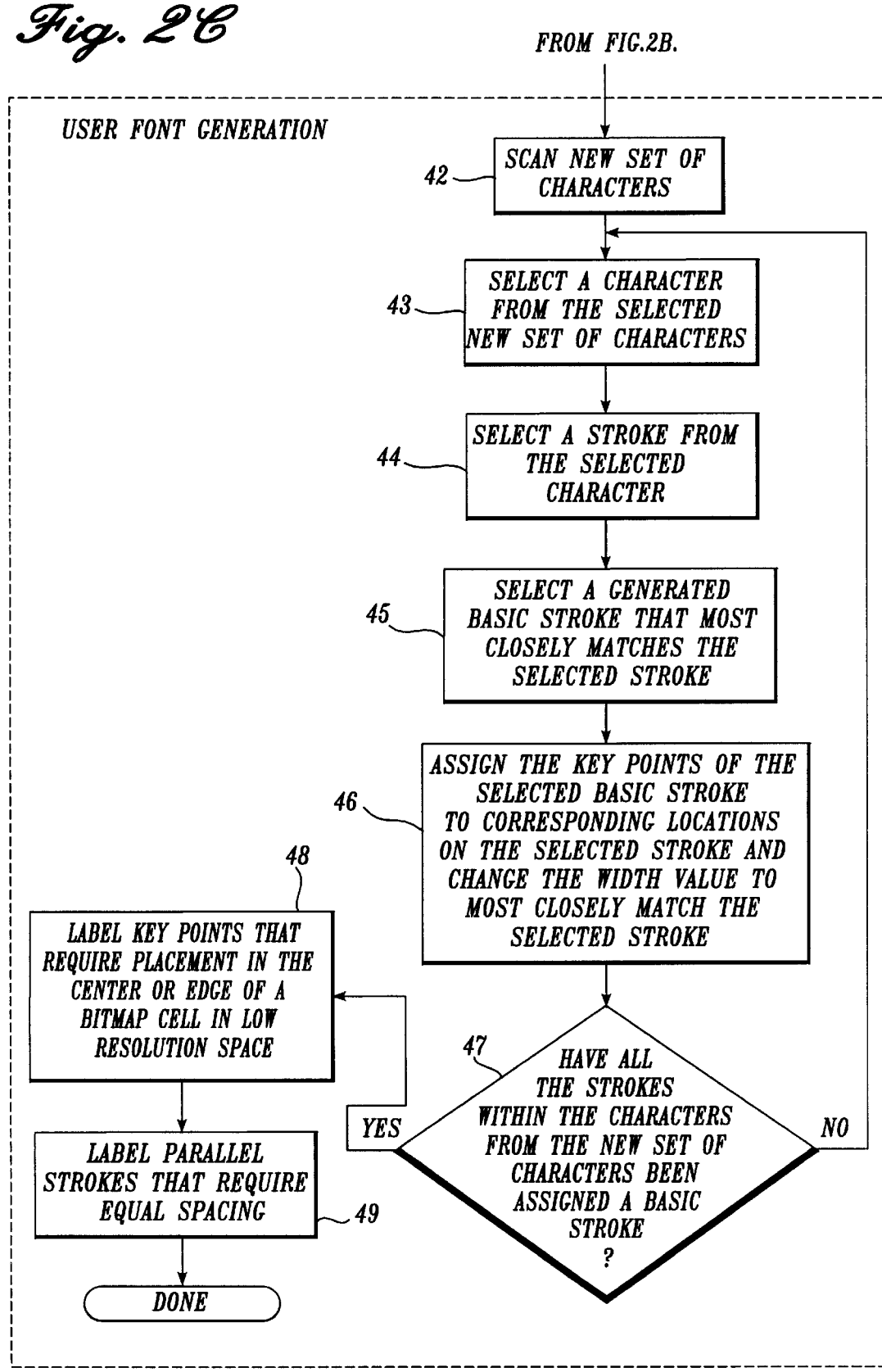

| STROKE CODES | WIDTH CODES | KEY-POINT LOCATIONS |
| --- | --- | --- |
| 0 | 10, 20 | (341, 31), (38, 344) |

| FEATURE POINTS CODES | REFERENCED KEY POINTS | REFERENCED RELATIVE POSITIONS | REFERENCED WIDTHS CODES |
| --- | --- | --- | --- |
| 0 | (0, 0) | (0.8, −1.0) | (0, 0) |
| 1 | (1, 1) | (−0.3, 0.5) | (1, 1) |

| CURVE SEGMENT CODES | END POINTS (FEATURE POINTS CODES) | MID-CONTROL POINT RATIOS |
| --- | --- | --- |
| 0 | (0, 1) | (0.309, 0.009), (0.252, 0.24), (0.075, 0.522), (0.384, 0.705), (0.611, 0.591) |

AREAS                VERTICES

TREE STRUCTURES VS. INFIX NOTATIONS

| CURVE SEGMENT CODES | CURVE SEGMENT | TREE STRUCTURES — 143 | IN-FIX NOTATIONS |
| --- | --- | --- | --- |
| 0 | Pa = 0 (FEATURE POINTS CODES)<br>P0 = (0.309, 0.009)<br>P1 = (0.252, 0.24)<br>P2 = (0.075, 0.522)<br>P3 = (0.354, 0.705)<br>P4 = (0.611, 0.591)<br>Pb = 1 (FEATURE POINTS CODES) |  | [Pa[P0 P1 [P2 P3 P4]] Pb]<br>— 144 |

*Fig. 5H*

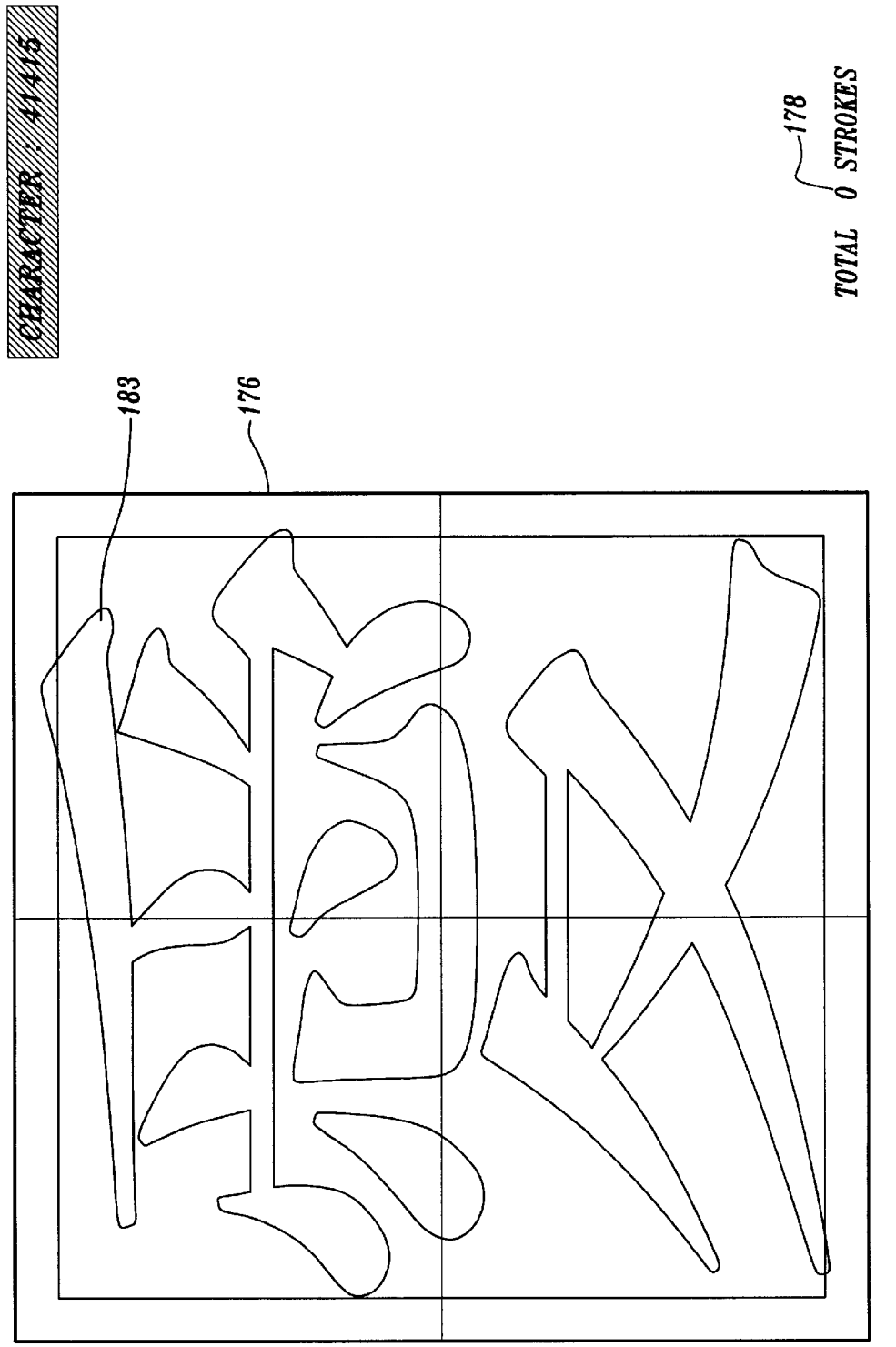

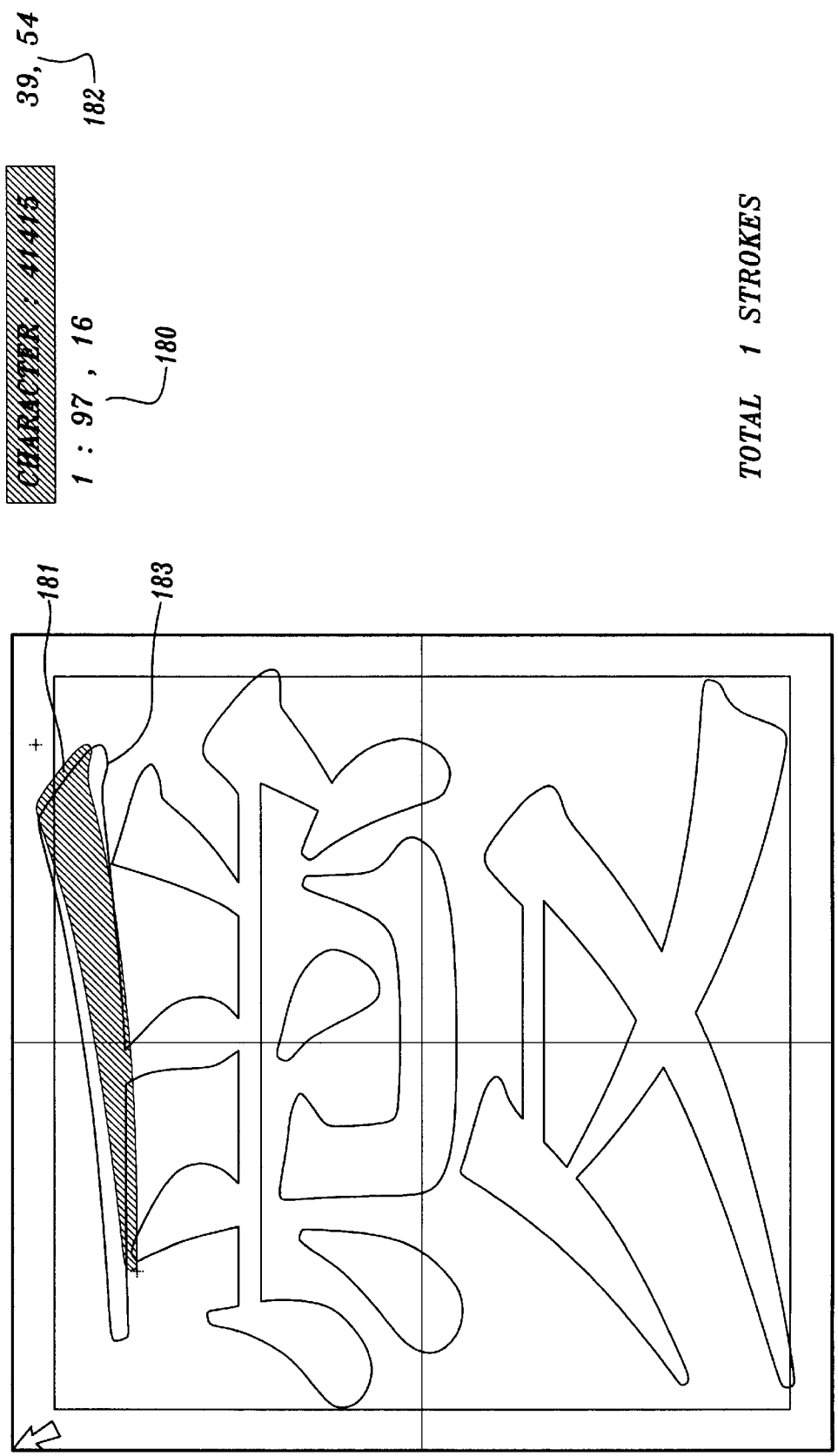

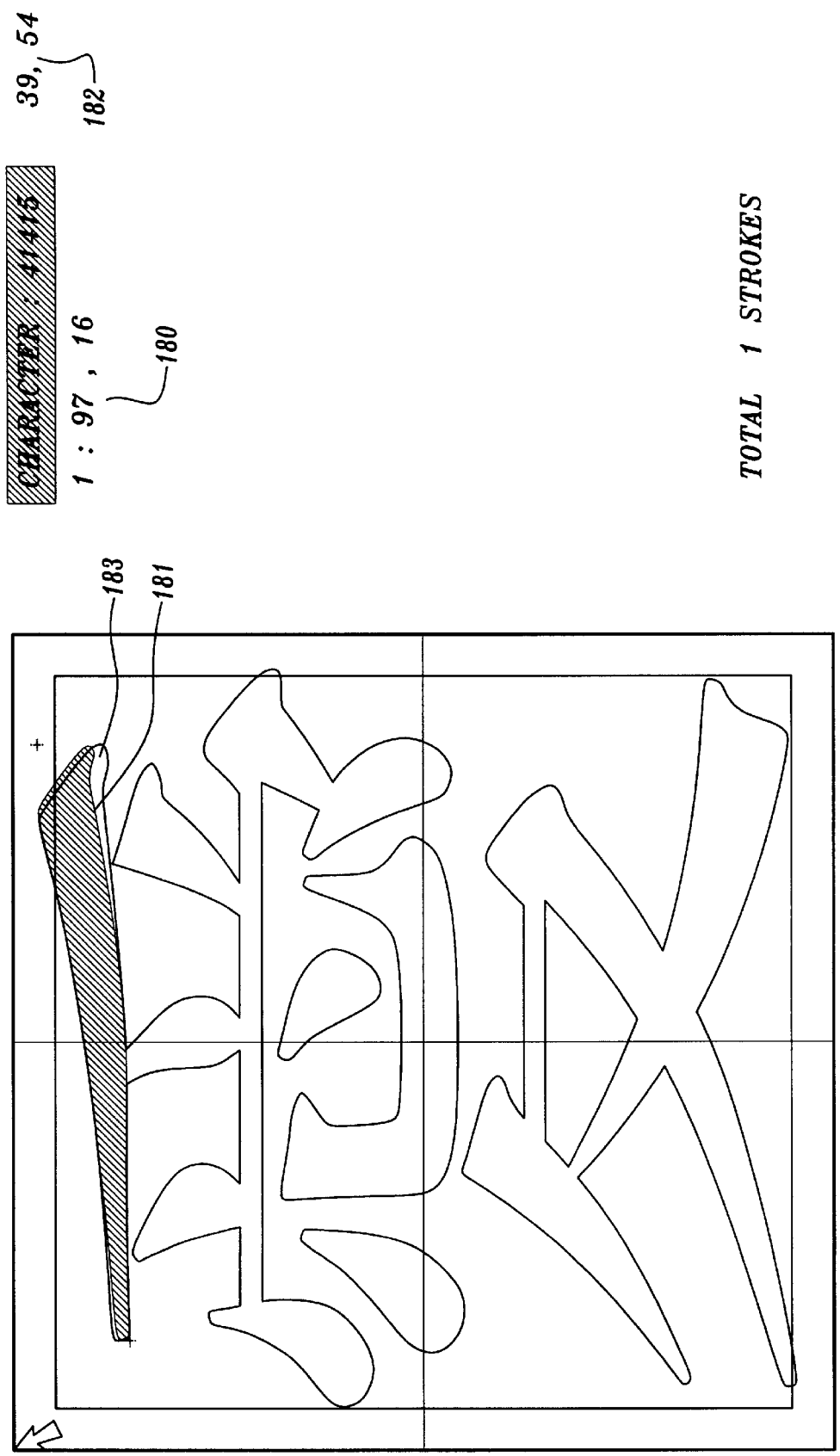

FONT ID 410, CHAR ID 43258

| STROKE<br>CODES | WIDTH<br>CODES | KEY-POINT<br>LOCATIONS | ⌐191 |
|---|---|---|---|
| 140 | 36, 20 | (11, 41)*, (243, 41) | |
| 12 | 18, 24 | (130, 41)*, (113, 245)*, (84, 224)* | |

| FEATURE POINTS<br>CODES | POINTS<br>CODES | REFERENCED<br>RELATIVE POSITIONS | REFERENCED<br>WIDTHS CODES |
|---|---|---|---|
| 0 | (0, 0) | (0.0, -3.0) | (7, 7) |
| 1 | (1, 1) | (-17.0, -20.0) | (0, 1) |
| 2 | (0, 0) | (4.0, 4.0) | (7, 7) |
| 3 | (1, 0) | (-28.0, -3.0) | (0, 7) |
| 4 | (1, 0) | (0.0, -1.0) | (0, 7) |
| 5 | (1, 1) | (0.0, 4.0) | (0, 7) |

| CURVE SEGMENT<br>CODES | END POINTS<br>(FEATURE POINTS CODES) | MID-CONTROL<br>POINT RATIOS | |
|---|---|---|---|
| 0 | (4, 5) | (0.0, -0.3) | |
| 1 | (4, 1) | (-0.088, -0.078) | |
| 2 | (0, 2) | (0.0, -0.214) | |
| 3 | (3, 0) | (0.0, 0.0) | |
| 4 | (1, 3) | (-0.045, -0.029) | |
| 5 | (2 ,5) | (0.0, 0.0) | |

| AREAS ⌐192 | VERTICES ⌐193 | ⌐195 | ⌐194 |
|---|---|---|---|
| 0 | 1, 3, 0, 2, 5, 4 | | |

| FEATURE POINTS<br>CODES | REFERENCED<br>KEY POINTS | REFERENCED<br>RELATIVE POSITIONS | REFERENCED<br>WIDTHS CODES |
|---|---|---|---|
| 0 | (0, 0) | (-8.0, 0.0) | (0, 0) |
| 1 | (0, 0) | (9.0, 0.0) | (0, 0) |
| 2 | (0, 2) | (-8.0, -1.0) | (0, 1) |
| 3 | (0, 1) | (9.0, -24.0) | (0, 0) |
| 4 | (1, 1) | (-1.0, 0.0) | (0, 0) |
| 5 | (2, 2) | (0.0, -1.0) | (1, 1) |
| 6 | (2, 2) | (0.0, 4.0) | (1, 1) |

| CURVE SEGMENT ⌐196<br>CODES | END POINTS ⌐197<br>(FEATURE POINTS CODES) | MID-CONTROL ⌐198<br>POINT RATIOS | |
|---|---|---|---|
| 0 | (0, 1) | (-0.029, 0.0) | |
| 1 | (0, 2) | (0.0, -0.002) | |
| 2 | (1, 3) | (0.0, -0.002) | |
| 3 | (3 ,4) | (0.435, 0.375) | |
| 4 | (5, 2) | (0.0, 0.0) | |
| 5 | (5, 6) | (0.0, -0.1) | |
| 6 | (6 ,4) | (0.357, -0.447) | |

| AREAS ⌐199 | VERTICES ⌐200 |
|---|---|
| 0 | 0, 2, 5, 6, 4, 3, 1 |

*Fig. 12*

FONT ID: 410, WIDTH*HEIGHT: 24*24, GRID: 10

Fig. 13

STROKE-BASED FONT GENERATION INDEPENDENT OF RESOLUTION

RELATED APPLICATIONS

This application is a continuation-in-part of U.S. Ser. No. 08/717,172 filed Sep. 20, 1996.

FIELD OF THE INVENTION

The invention relates to the art of generating digital representations of typographic bitmap characters or other symbols and more particularly, methods and apparatus for generating a bitmap font of Asian characters or symbols for low and high-resolution space using same stored font data.

BACKGROUND OF THE INVENTION

Many font generating systems exist for generating a family of Asian font characters or an Asian font. An Asian font is composed of a large number of characters or character patterns. The following are various character pattern generating techniques.

One conventional computer technique is a method using character patterns stored in two-dimensional dot matrix form. With this method, a stored character pattern can be outputted correctly, however, enlargement, reduction or rotation of a character pattern cannot be done with high quality.

Another technique uses font outlines. This system is described in "PostScript Language Tutorial and Cookbook" by Adobe Systems, Inc. (Addison-Wesley Publishing, 1985). According to this method, the outline of a character pattern is stored in the form of straight lines and curves, and a conversion such as enlargement, reduction, rotation or the like is carried out at the time of outputting of a character pattern. Since the outline of a character pattern is stored graphically, the conversion can be carried out freely. In addition, it is possible to store an original character pattern in the form of an outline with high quality. However, this method is ineffective for generating a database of character data displayable on high and low resolution devices.

Another method of generating character patterns uses character pattern data. The character pattern data of this stroke-based technique includes skeleton pattern data, stroke thickness data and shape parameter data, see U.S. Pat. No. 4,897,638. Another stroke-based technique defines characters with strokes defined by height, width and curvature points, see U.S. Pat. No. 4,990,903. These stroke-based techniques are good for generating high resolution characters but inadequate for generating low resolution characters, because they are unconcerned with geometric constraints in low resolution space.

With great frequency, features of stroke shapes will not fall directly on available pixels but, instead, fall between pixels. Consequently, due to the coarseness of the display resolution, it may not be possible to display the precise features, thereby losing the feature entirely or at least somewhat altering its shape. For example, the mapping strategy of the '903 patent produces the bitmap font in a 24×24 dot matrix shown in FIG. 1B. This mapping strategy activates a pixel, if it contains or is contained by piece of the generated stroke area, as shown by the outline. This mapping strategy avoids dropping out a stroke shape, but widens the stroke shapes with undesirable pixels. Consequently, the display is jammed with activated pixels which produces an unacceptable low resolution bitmap character. Therefore, the method is suitable for generating a good quality high-resolution font and not suitable for yielding a good quality low-resolution font. Furthermore, these techniques fail to provide an interface for designers and users for easily creating desired character sets that operate with various resolution sizes. Also, curvature points cannot define curve segments accurately enough for both low and high resolution devices.

The present invention is directed to overcoming the foregoing and other disadvantages. More specifically, the present invention is directed to providing a method and apparatus for generating stroke-based fonts regardless of display resolution size.

SUMMARY OF THE INVENTION

In accordance with this invention, a method and apparatus for generating a font of an Asian language is provided, the Asian language including a set of characters. The method includes the step of selecting a character for display on the output device, wherein each stroke of the character comprises predefined, prestored key points, width values, structured curve ratios stored in a tree type data structure, and feature points that have a predefined spatial relationship to the key points and wherein a key point is labeled with hint information if the key point requires a predefined specific display location. The method also includes the steps of determining the resolution of the output device and retrieving curve ratios from the prestored curve level table according to the determined resolution of the output device. The method further includes the steps of calculating non-labeled key points that are associated with the strokes of the selected character in the characters display space at the key points' prestored position, calculating labeled key points that are associated with the strokes of the selected character in the characters display space in the center or edge of the bitmap cell that contains the labeled key point according to the key points' prestored position, and rendering the strokes of the selected character in the character bitmap space on the output device according to the width values, the retrieved curve ratios, and feature points of the strokes and calculated, labeled and non-labeled key points.

In accordance with other aspects of this invention, the step of rendering further includes the steps of calculating feature points according to the predefined spatial relationship with the placed labeled key points and the unlabeled key points, calculating at least one curve segment between consecutive generated feature points according to at least one retrieved curve ratio and calculating outlines for strokes by connecting the generated curve segments. The step of rendering further includes the step of activating pixels on the output device if at least half of the pixel is covered by the area within the calculated stroke outline, if the center of a pixel is within the calculated stroke outline or if an extending portion of the calculated stroke outline is predefined as requiring display emphasis.

In accordance with still other aspects of this invention, the step of calculating binary-structured curve segments with at least one curve segment between consecutive generated feature points according to at least one retrieved curve ratio further includes the steps of calculating at least one mid control point existing between two consecutive feature points according to the at least one curve ratio and calculating the at least one curve segment with Bezier triangle curve generation according to the defined at least one mid control point and the corresponding feature points.

In accordance with still further other aspects of this invention, the step of calculating labeled key points further includes calculating the bitmap cell width of the strokes in the selected characters and positioning the labeled key point of a stroke at the nearest bitmap cell center, if the calculated bitmap cell width of the stroke is odd, or positioning the labeled key point of a stroke on the nearest bitmap cell edge, if the calculated bitmap cell width of the stroke is even.

In accordance with yet other aspects of this invention, each stroke that is parallel with another stroke within a selected character further includes a predefined spatial relationship with any parallel stroke. The step of calculating labeled key points further includes calculating labeled key point positions of key points of a stroke that is parallel to at least one other stroke according to the predefined spatial relationship with the at least one parallel stroke.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A–2D are flow diagrams of the method for the construction of a stroke-based font in accordance with the claimed invention;

FIGS. 4A–4J are screen shots of a CAD tool used for creating basic stroke objects used for user font designation;

FIGS. 5B–5G are screen shots of a CAD tool used for curve level generation;

FIGS. 5I–M are screen shots of a CAD tool used for resolution assignment to the generated curve levels;

FIGS. 6A–6E are screen shots of a user CAD tool used for creating a stroke-based font with the strokes created by the designer CAD tool;

FIG. 12 is an illustration showing the primary font data of a character; and

FIG. 13 is a low resolution display of Asian characters generated by this invention.

DETAILED DESCRIPTION OF THE PREFERRED EMBODIMENT

Figure 1A:
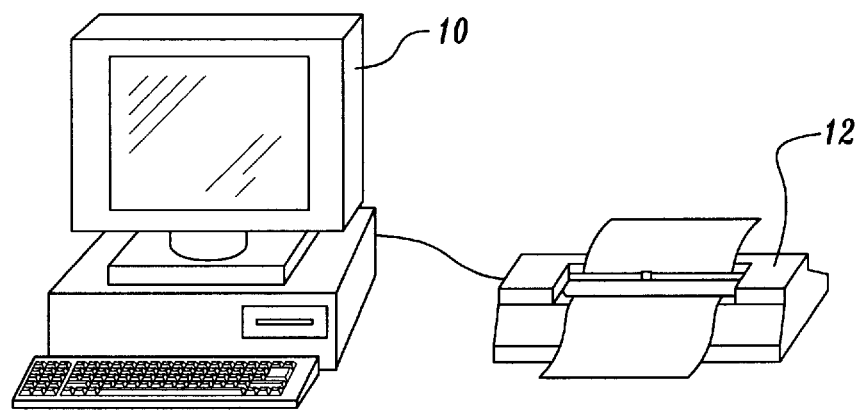
FIG. 1A is a drawing of a general purpose computer and printer for executing the methods of the present invention.
Figure 1B:
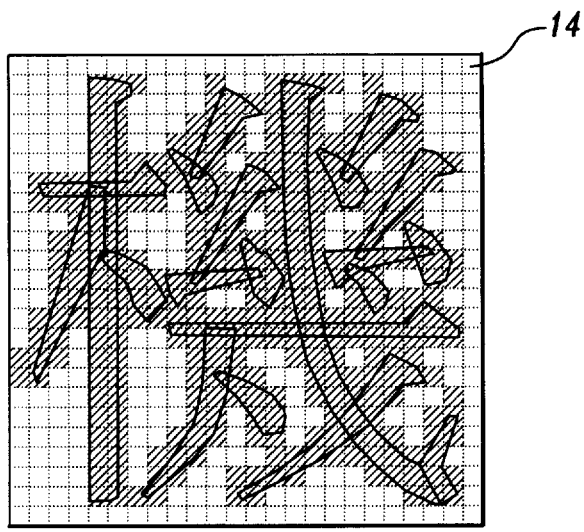
FIG. 1B is a high resolution stroke-based character displayed in a low resolution space according the prior art.

FIG. 1A is a display of a general purpose digital computer 10 with an attached printing device 12, which when loaded with a windowing type of software operating system, such as Windows 95™, is fully capable of performing the method of the present invention. The printing device 12 and the display of the digital computer 10 may print and display in either low (e.g. dot matrix) or high (e.g. laser) resolution quality. Other type of computing systems, such as networked or mainframe-based systems, are compatible with the present invention provided the system includes a compatible window-type operating system.

Figure 1C:
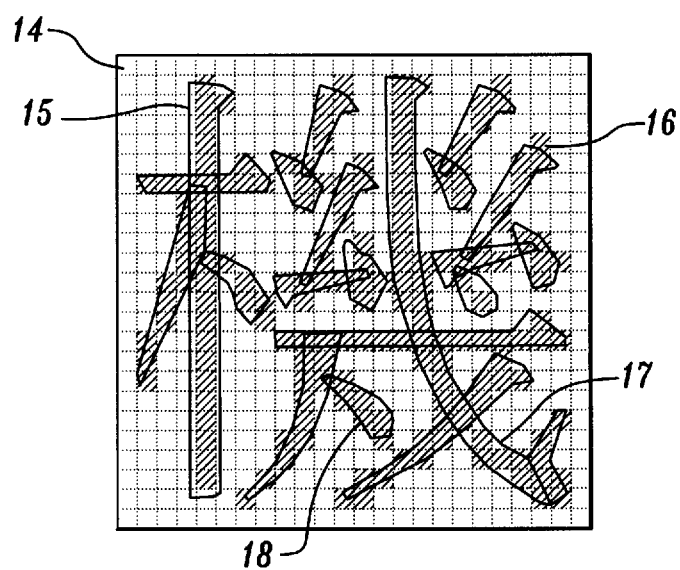
FIG. 1C is a high resolution stroke-based character generated according to the present invention and displayed in low resolution space.

The preferred embodiment of the present invention yields quality strokes that make up characters of a bitmap font for low or high resolution character display areas, similar to the bitmap character displayed in the 24×24 bitmap pattern 14 shown in FIG. 1C. A font is defined as a set of characters (in this case Asian language characters) with a similar style.

A second embodiment of the present invention provides a system for defining a database including a reduced set of "basic strokes" for purchase and use by a graphics designer (user). Each basic stroke in the database represents one or more similar strokes used to formulate characters. Each basic stroke in the database includes curve level tables that contain curve information for high and low resolution output devices.

A third embodiment of the present invention provides a system for creating a stored set of characters from the defined database of basic strokes. A basic stroke is at least one single brush stroke within a character. For example, stroke 17 of FIG. 1C includes three brush strokes, as shown by the three connected outlined shapes, and stroke 18 is an example of a stroke with only one brush stroke. The highlighted pixel cells 16 represent the actual display of a character created from a predefined database of strokes. The highlighted pixel cells 16 correspond as nearly as possible to their analog forms or outlines 15.

Figure 2A:
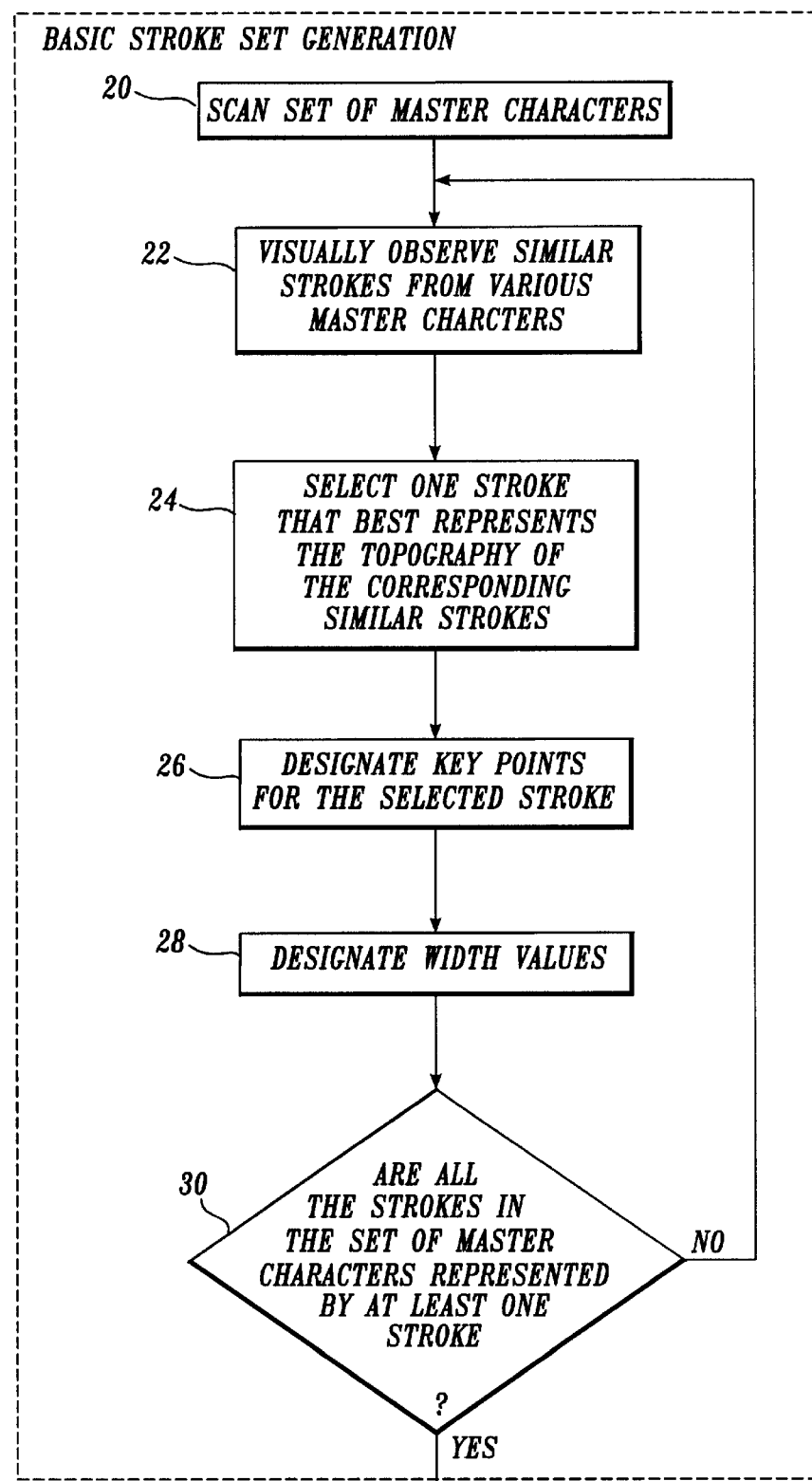

FIGS. 2A–2D are flow diagrams that illustrate the preferred embodiment of the present invention for producing adequate font data for high and low resolution bitmap character generation. The steps shown in FIG. 2A illustrate the process for generating the primary parameters of a basic stroke. A set of basic strokes are a reduced set of strokes that represent, in a topography manner, all the strokes in a desired set of master characters. In the first step, at block 20, a font designer scans in or generates through the use of a graphics program a set of master characters. Other techniques may be used, provided that a set of master character images or outlines is usable as a template. The set of master characters are of the same font. If the master characters are Chinese characters, the following are examples of different Chinese character fonts a designer may choose from to form the set of master characters: text hand; running hand; cursive hand; seal type; Sung type; and Ming type.

The font designer then observes a group of similar strokes from the set of master characters, at block 22. The step of observing is as simple as visually scanning, manually or automatically by image analysis techniques, the set of master characters for strokes with similar topography. The font designer then selects a stroke to represent a group of strokes that have a similar topography, at block 24. It can be appreciated that the step of generating a basic stroke to represent a group of strokes is as much art as it is logic. It is up to the font designer's skill in knowing all of the characters in the language and determining whether or not a basic stroke is appropriate for a set of similar strokes.

Each selected basic stroke is designated as a basic stroke by first storing the primary parameters for a basic stroke. At block 26, the font designer identifies key points in a position relative to the topographic layout of the selected stroke. The font designer decides, based on stroke topography, size, vertical and horizontal portions and the observed similar strokes, where to place key points. Key points designation is described in more detail below with FIGS. 3A and 3B. Generally speaking however, key points are placed at the beginning and terminus of a stroke and at any location where a stroke changes direction abruptly. Moreover, key points should be placed wherever is necessary to "push or pull" segments of the basic stroke in order to match any of the set of similar strokes of which the basic stroke represents. In other words, the basic stroke must be able to be manipulated by the key points in order to form any of the strokes the basic stroke represents.

Next, in block 28, the font designer designates at least one width value for each stroke. The value of the widths chosen is a font designer determination based on observed widths of the observed similar strokes. Width value entry is described in more detail below with FIGS. 3C and 3D.

The font designer continues storing primary parameter values for basic strokes until all of the strokes in the set of master characters have a topological layout similar to at least one of the stored basic strokes. This is accomplished by decision block 30. It can be appreciated by one of ordinary skill in the art that the basic stroke storing steps described above could be performed manually or automatically with image analysis software identifying similar strokes and optimum locations for key points and values for widths of the similarly identified strokes.

Figure 2B:
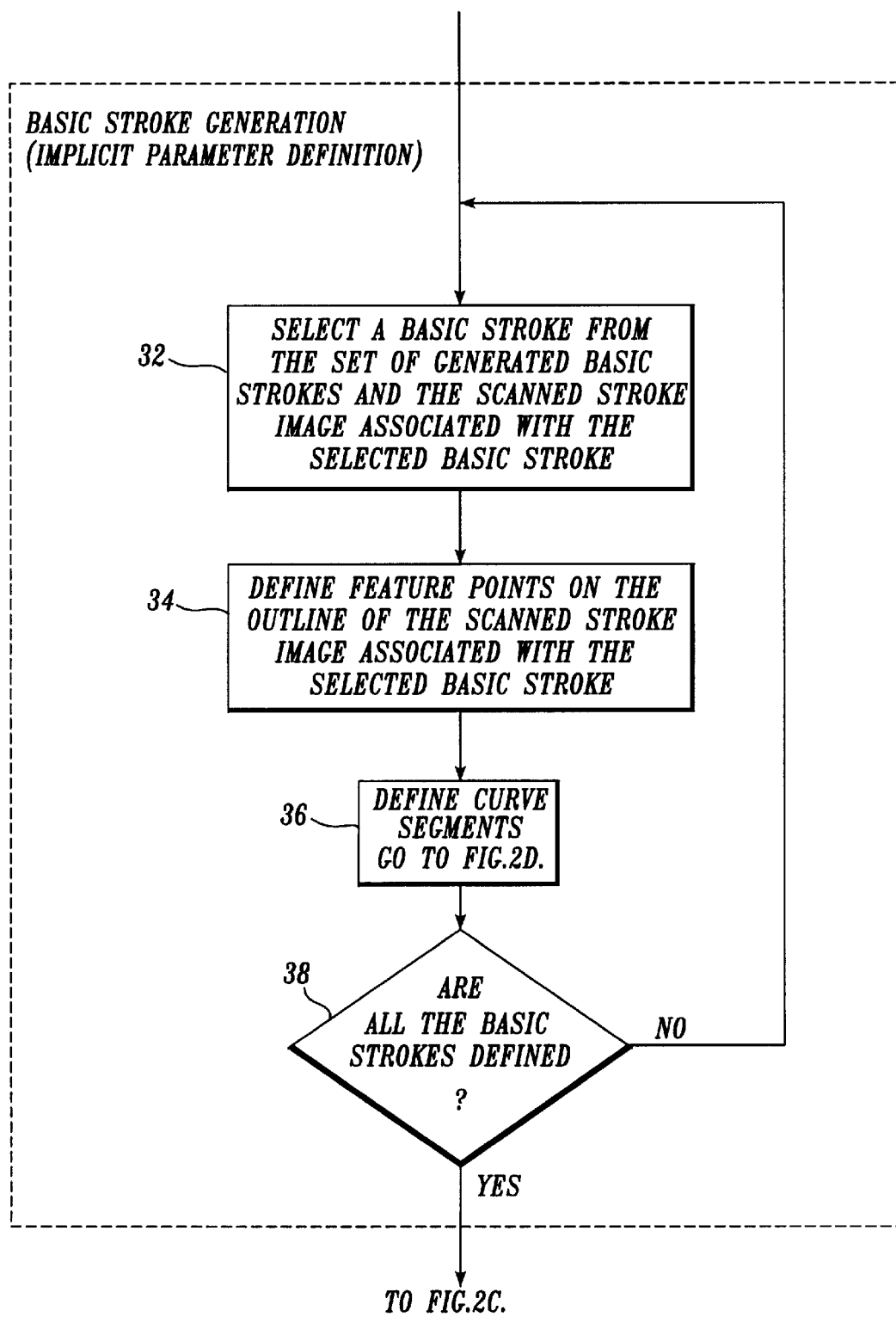

FIG. 2B illustrates the steps required for assigning secondary parameters for the basic strokes, thus completing basic stroke creation. In secondary parameter assignment, a font designer selects a basic stroke with its outline image from the set of generated basic strokes, at block 32. The outlined image of the selected basic stroke is retrieved as a template for secondary parameter designation. The font designer defines feature points using the outlined image of the basic stroke, the key points and width values, at block 34, and then defines curve segments between pairs of defined features points, at block 36. See FIG. 2D described below. The feature points are generally placed on the outline of the basic stroke at locations where the outline changes in direction or curvature.

At block 38, once all the basic strokes are fully defined by secondary parameters, the basic stroke definition is complete. Basic stroke definition can also be performed automatically, using similar techniques used for automatic basic stroke set generation described above. Basic stroke creation is described in more detail below with the designer CAD tools of FIGS. 4A–4J.

FIG. 2C illustrates the steps performed by a user for generating a user font. A user is typically a graphic designer attempting to create a stored font database for commercial use. The user first scans a new set of characters in the font desired to use as a template for creating the user font at block 42. The new set of characters is a set of characters the user wishes to store in reduced space for a low or high resolution display. The user then selects a character from the scanned set of characters and a stroke from the selected character, at blocks 43 and 44. The user retrieves, from a list of created basic strokes, a basic stroke that most closely matches the selected stroke, at block 45. The shape of the selected basic stroke is then matched to the shape of the selected stroke by moving the key points of the selected basic stroke, thus moving the outline of the basic stroke to correspond to the outline of the selected stroke. The user also changes width value(s) of the basic stroke to match the width of the selected stroke, at block 46. The matching basic stroke is stored for representing the selected stroke during display processing. At block 47, the steps of selecting and matching basic strokes to strokes within characters of the scanned new set of characters is performed until all the strokes within all the characters have a stored matched basic stroke.

Next, the strokes that match strokes of the new set of characters and their key points are observed in a low resolution character space. If observed strokes require specific placement within the character space in order to avoid poor display quality, the key points of these strokes are labeled with hint information for future display processing, at block 48. A labeled key point's display location depends on the pixel width of the stroke in the respective resolution space. In block 49, multiple parallel strokes requiring equal spacing are labeled. Labeling is assigned to strokes when displayed in certain resolution spaces; resolution spaces requiring stroke display control for generating accurate characters. The step performed in block 48 may be performed by the font designer during the feature point and curve segment generation. The user font generation method is described in more detail below with the user CAD tools of FIGS. 6A–6E.

Figure 2D:
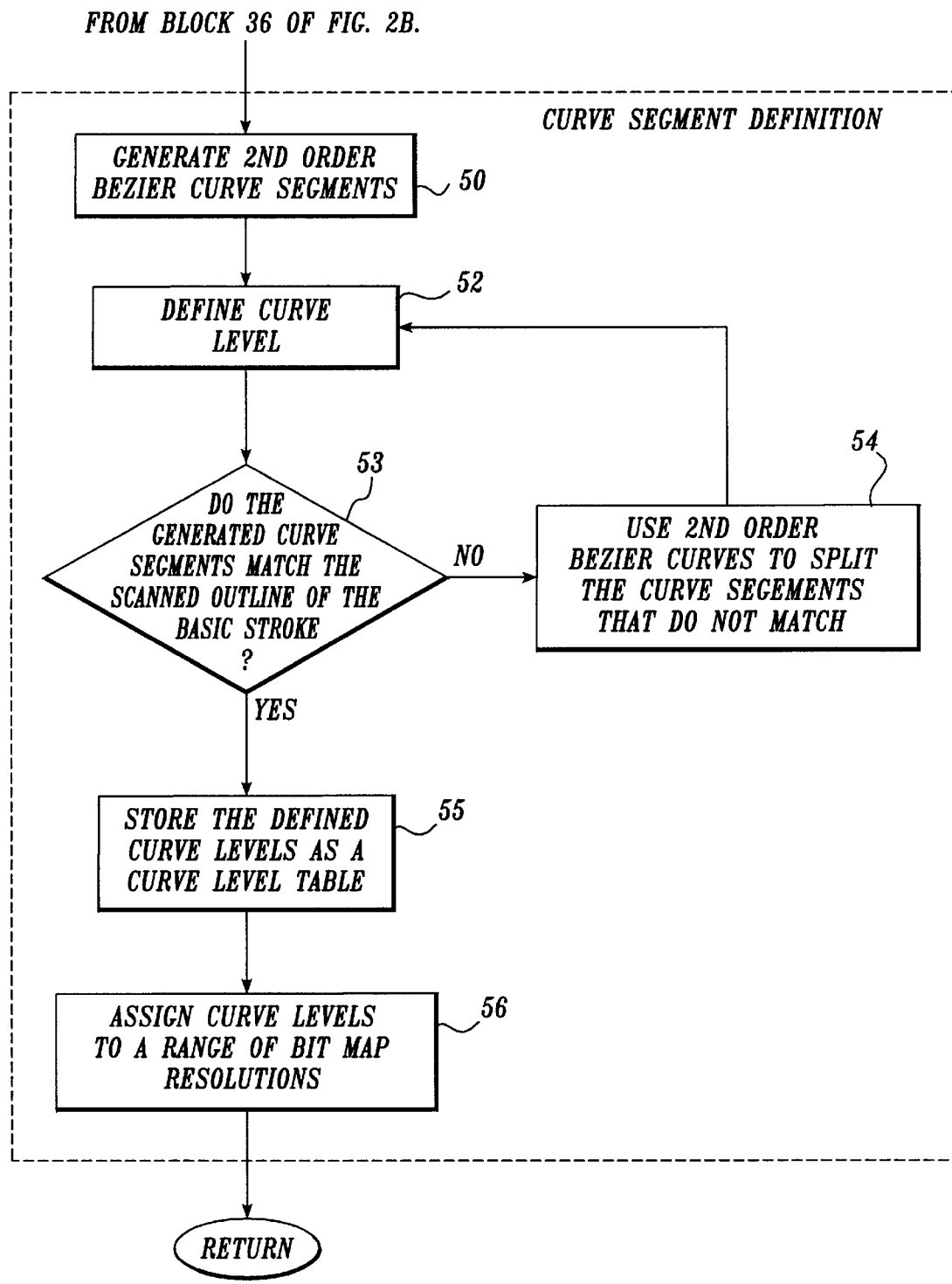

As shown in FIG. 2D, the curve segment definition step is illustrated in more detail. First in block 50, a second order Bezier curve segment is generated between feature points. A curve segment is defined by two end points and a midcontrol point or a ratio that defines the midcontrol point's location relative to the end points for calculating the second order Bezier curve between the two end points. End points may be a feature point or a point on the curve segment defined by the midcontrol point, shown and described in more detail below by point 146 in FIG. 5A. In block 52, a curve level is assigned to the ratios of the generated curve segments. Essentially, a curve level is a pointer to a set of ratios of the generated curve segments between feature points. A curve level defines the level of detail of the curve between two feature points. A curve level that defines a low level of detail points to very few midcontrol point ratios and a curve level that defines a high level of detail points to a greater number of midcontrol point ratios. Next, in decision block 53, a visual determination is made whether the generated curve segments match the scanned outline the curve segments are intended to represent. If the generated curve segments match the scanned outline, then curve segment definition is complete. However, if a generated curve segment does not match the scanned outline, a second order Bezier curve segment is generated for the non-matching curve segment as shown in block 54. A CAD tool, described in FIGS. 5A–5H below, allows a designer to isolate a portion of a curve segment and generate a new second order Bezier curve segment between the ends of the isolated curve segment. A new curve level is defined, if at least one of the curve segments between a pair of feature points or end points is further defined by a new midcontrol point ratio for defining a new curve segment. The generation of curve segments continues until all generated curve segments visually match or significantly match the scanned outline of the basic stroke. At block 55, the defined curve levels are stored once in memory as a curve level table. Any curve level is easily accessible because of the ease in retrieving from the curve level table. At block 56, each curve level is assigned to a range of bit map resolutions. Curve segment definition and resolution level designation is described in more detail below with FIGS. 5A–5L.

Figure 2E:
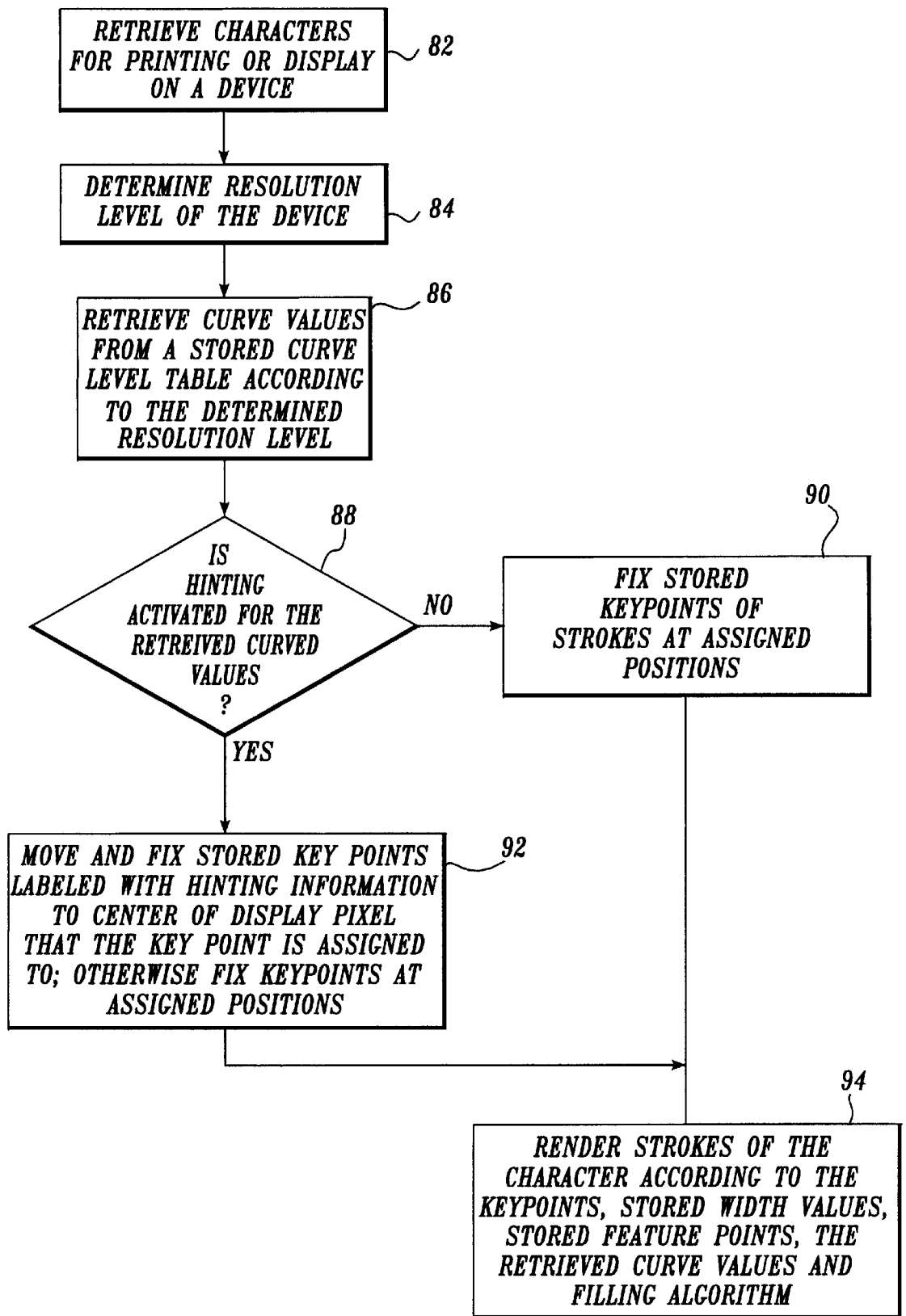
FIG. 2E is a flow diagram of the method for rendering characters for high and low resolution devices.

FIG. 2E illustrates the method for rendering characters of the preferred embodiment of the present invention. The steps shown in FIG. 2E are the steps performed by an image rendering program/engine in a computer for display on a low or high resolution display device or for printing on a low or high resolution printer. In block 82, one retrieves characters for printing or display on the printer or display device by selecting the characters in an application program, such as a word processing program. In block 84, the system determines the resolution level of the printer or display device. At block 86, curve values are retrieved from a stored curve level table according to the determined resolution level of the printer or display device, at block 86.

At decision block 88, the system determines if hinting is activated for the retrieved curve values. If hinting is not activated for the curve values, the non-labeled key points of the strokes of the retrieved characters are retrieved according to their assigned positions on the display device, at block 90. However, if hinting is activated for the retrieved curve values, the labeled key points are moved and fixed to the center of the display pixel that the keypoint is addressed to and the non-labeled key points are fixed to their assigned positions, at block 92. Finally at block 94, the strokes are rendered according to key point positions, stored width values, stored feature points that identify points on the outline of the strokes, the retrieved curve values that define the lines between the feature points of the strokes, and a common filling algorithm for activating pixels within the outline of the strokes.

BASIC STROKE CAD TOOL

Figure 3A:
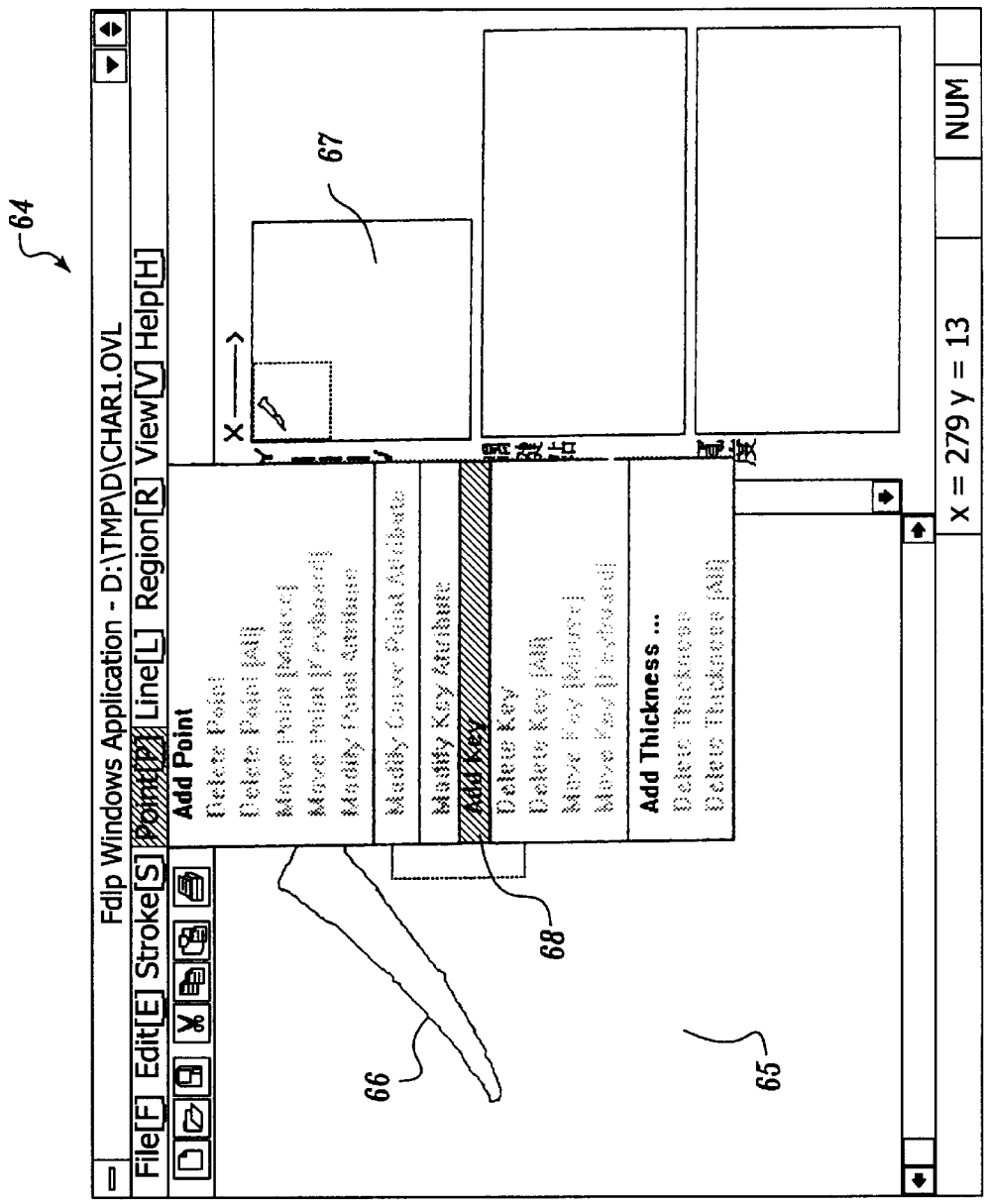
FIGS. 3A–3D are screen shots of a designer CAD tool used for designating primary parameters for basic strokes.

FIGS. 3A–3D illustrate primary parameter designation within a basic stroke CAD tool 64. As shown in FIG. 3A, the font designer retrieves an outline image 66 of a stroke retrieved from a set of scanned master characters. Outline image 66 is a stroke the font designer believes best represents a set of similar strokes from the observed set of master characters. The font designer begins primary parameter designation by selecting Add Key command 68 from the main menu of the CAD tool 64. Selection of the Add Key command 68 allows a font designer to place a first key point 70 at one end of outline image 66 within interactive windows 65. The CAD tool 64 is a Windows-based graphical user interface (GUI) with a title, main menu and button and a work space below the CAD tool bars with two 2-dimensional display areas 65 and 67. Display area 67 is located to the right side of the work space and is a character space that displays the retrieved outline image 66. The retrieved outline image 66 is displayed within a smaller block inside display area 67. Display area 65, located to the left of display area 67, is a larger view of the small box within display area 67. The font designer interfaces with the retrieved outline image 66 within display area 65. The retrieved outline image 66 is used as a template for defining the primary and secondary parameters of the basic stroke.

Figure 3B:
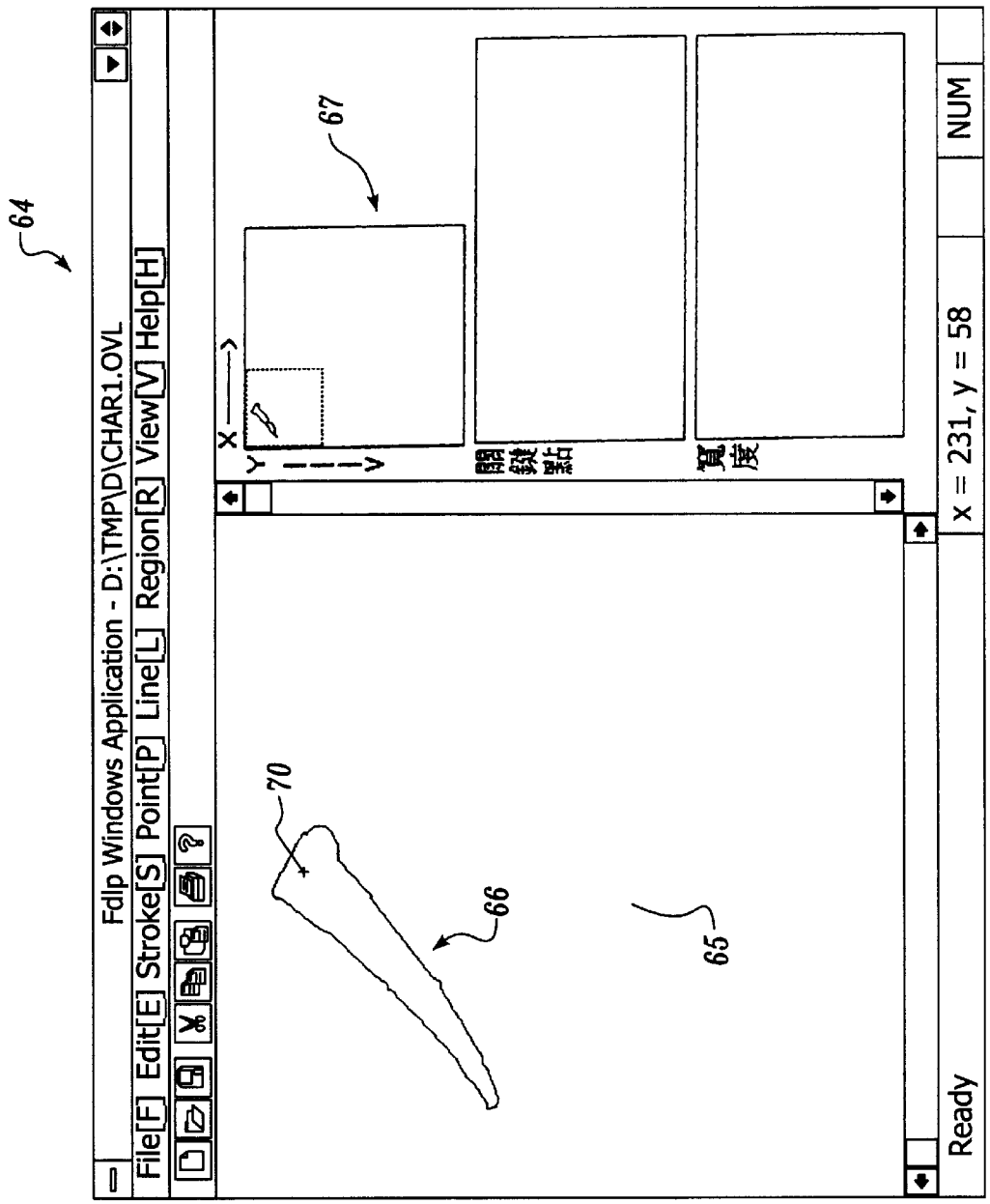

The font designer places a key point within display area 65 by activating or clicking a cursor device, such as a mouse, at a desired point. The font designer can place a key point either on, inside or outside of the outline of the retrieved outline image 66. Key point position depends on a number of observed features of the similar strokes from the set of master characters. It is preferable to place a key point at each end of the basic stroke. If the basic stroke is primarily a vertical stroke, the font designer places the key points horizontally in the middle of the width of the respective end. The opposite is true for primarily horizontal basic strokes. If a basic stroke includes a horizontal and a vertical portion joined at a joint, the font designer places a key point horizontally in the middle of the vertical portion's width and vertically in the middle of the horizontal portion's width. Essentially, key points are positioned to allow elongating, stretching or warping of a basic stroke's ends or other sections in order to match the observed similar strokes. Thus, key point placement depends upon font designer discretion. As shown in FIG. 3B, the font designer has placed a key point 70 within the outline of the outline image 66 at the fat end of the retrieved stroke 66. The minimum number of key points for a stroke is two.

Next, the font designer designates at least one width value for basic stroke. Again, it is up to the artistry of the font designer to designate those locations on the basic stroke that will require a width value. In general, width values should be located in those places of the stroke that need to be modified in order to adjust the basic stroke to fit any of the strokes in the set of strokes the basic stroke is to represent.

Figure 3C:
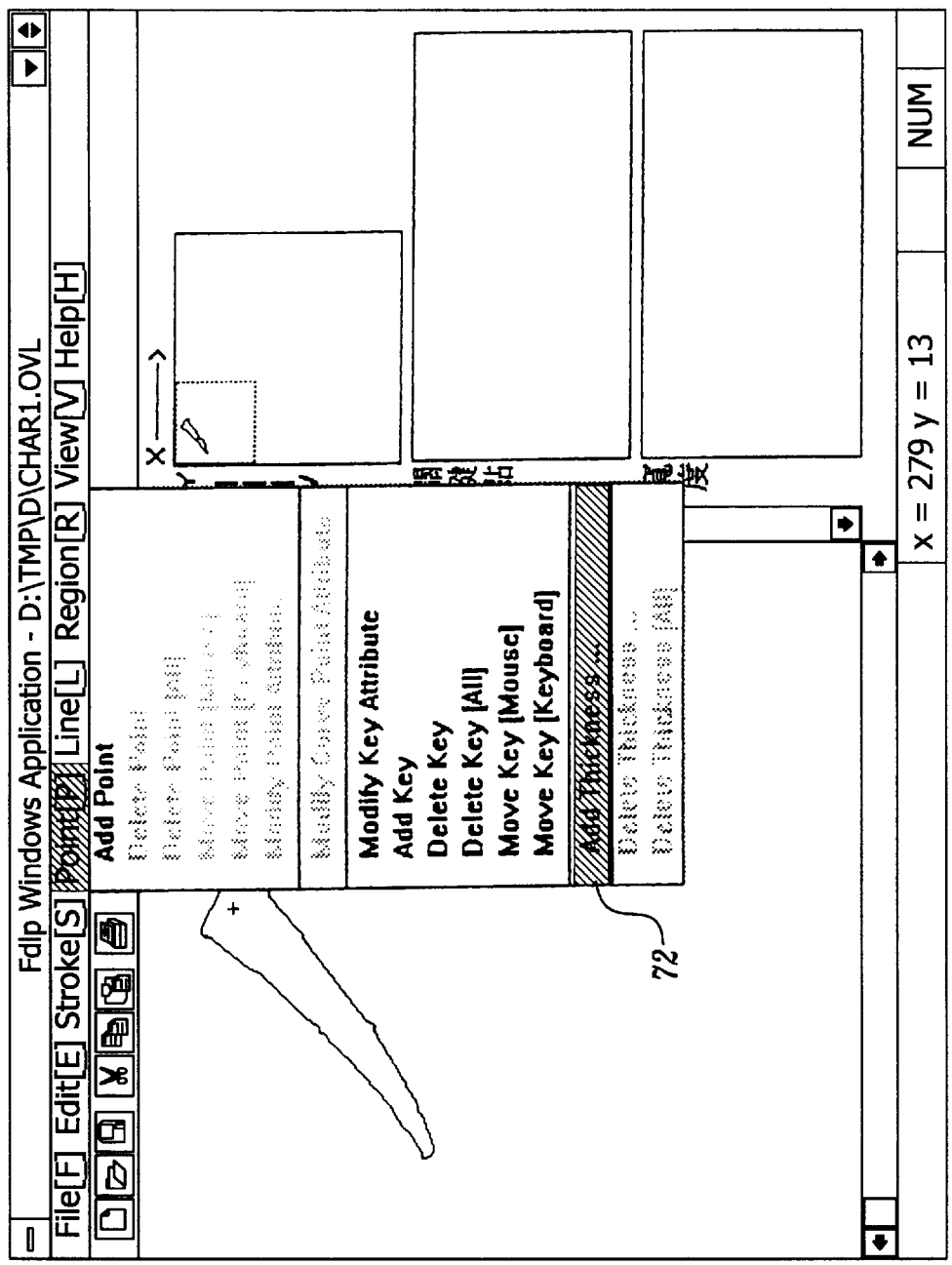
Figure 3D:
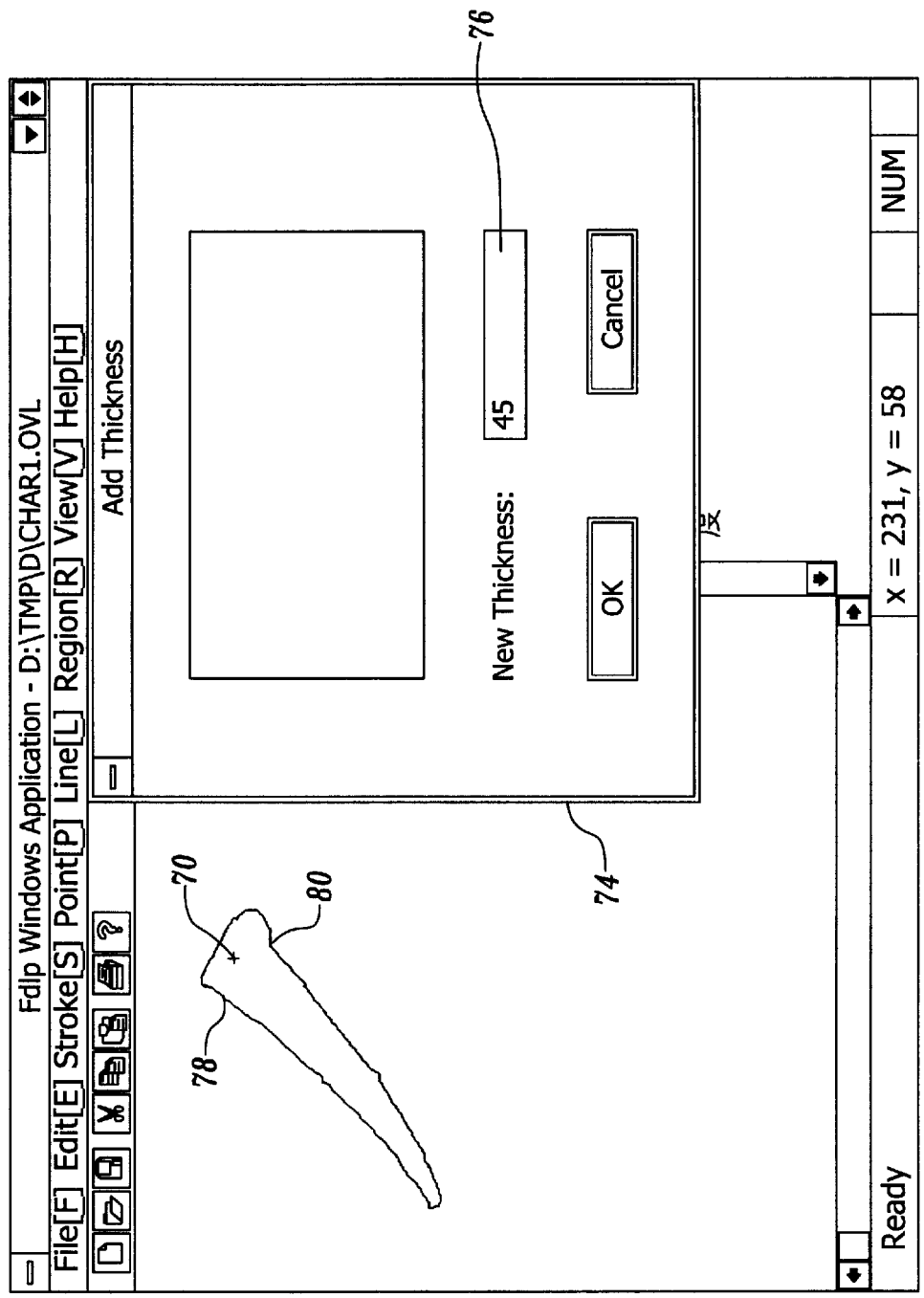

As shown in FIG. 3C, the font designer selects an Add Thickness command 72 to retrieve Add Thickness window 74, shown in FIG. 3D. Within Add Thickness window 74 the font designer designates a width value within new thickness box 76. The width value entered in new thickness block 76 is entered by the font designer designating a first and second point 78 and 80 on the outline of the stroke 66. The width value is obtained by measuring the straight-line distance between first and second points 78 and 80. The font designer determines the points on the outline by observing the widths of the observed similar strokes.

Figure 4A:
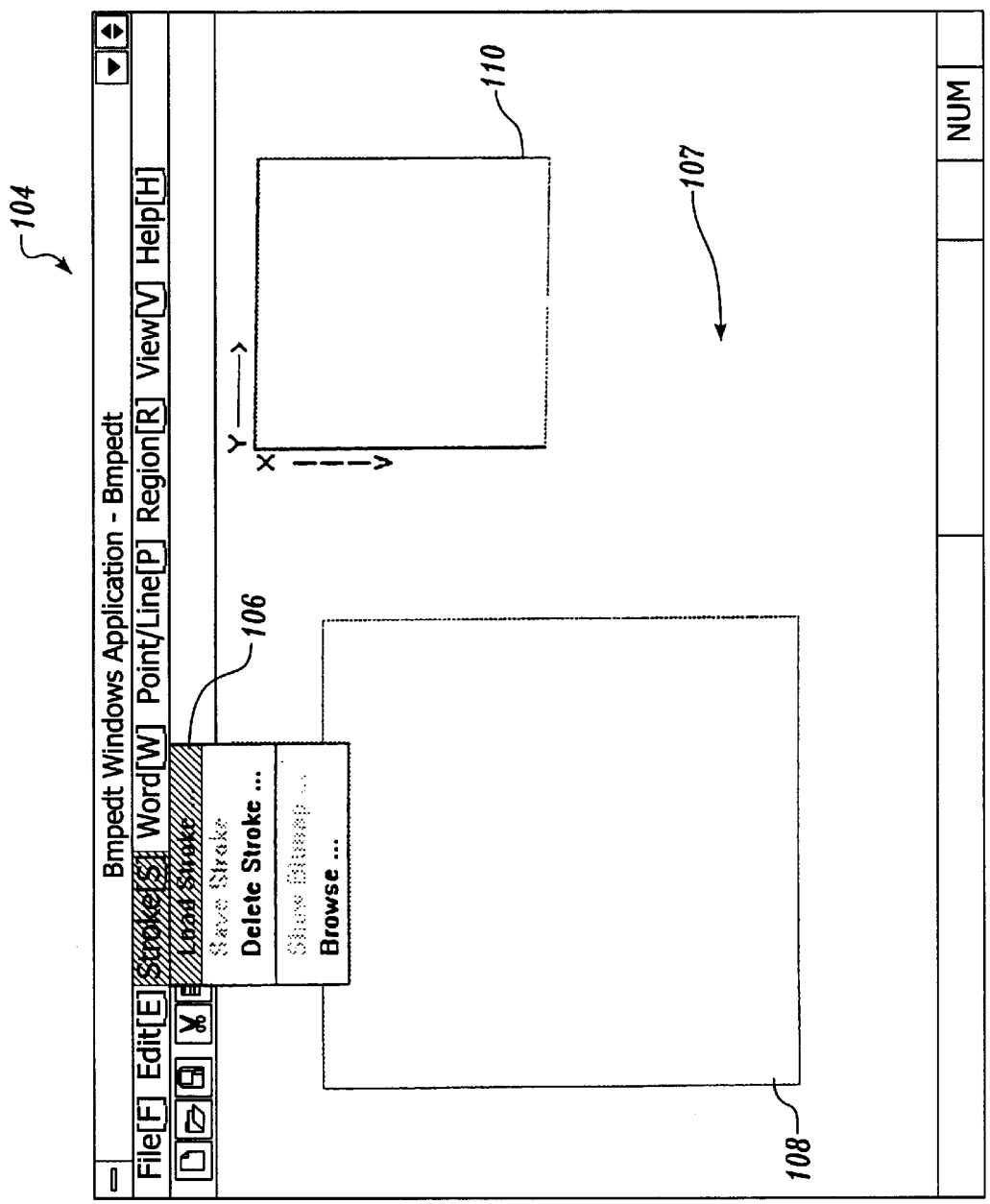
Figure 4B:
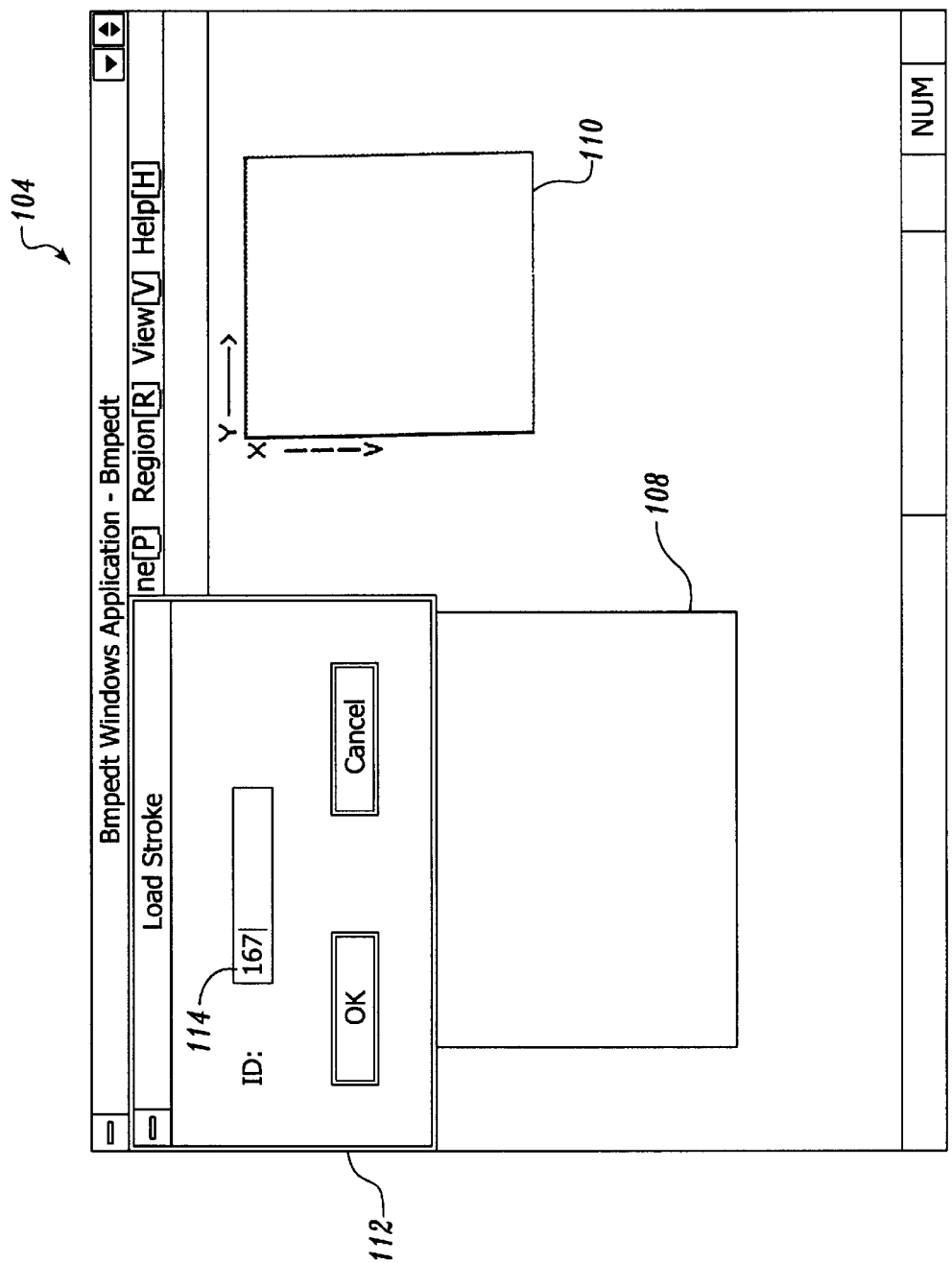
Figure 4C:
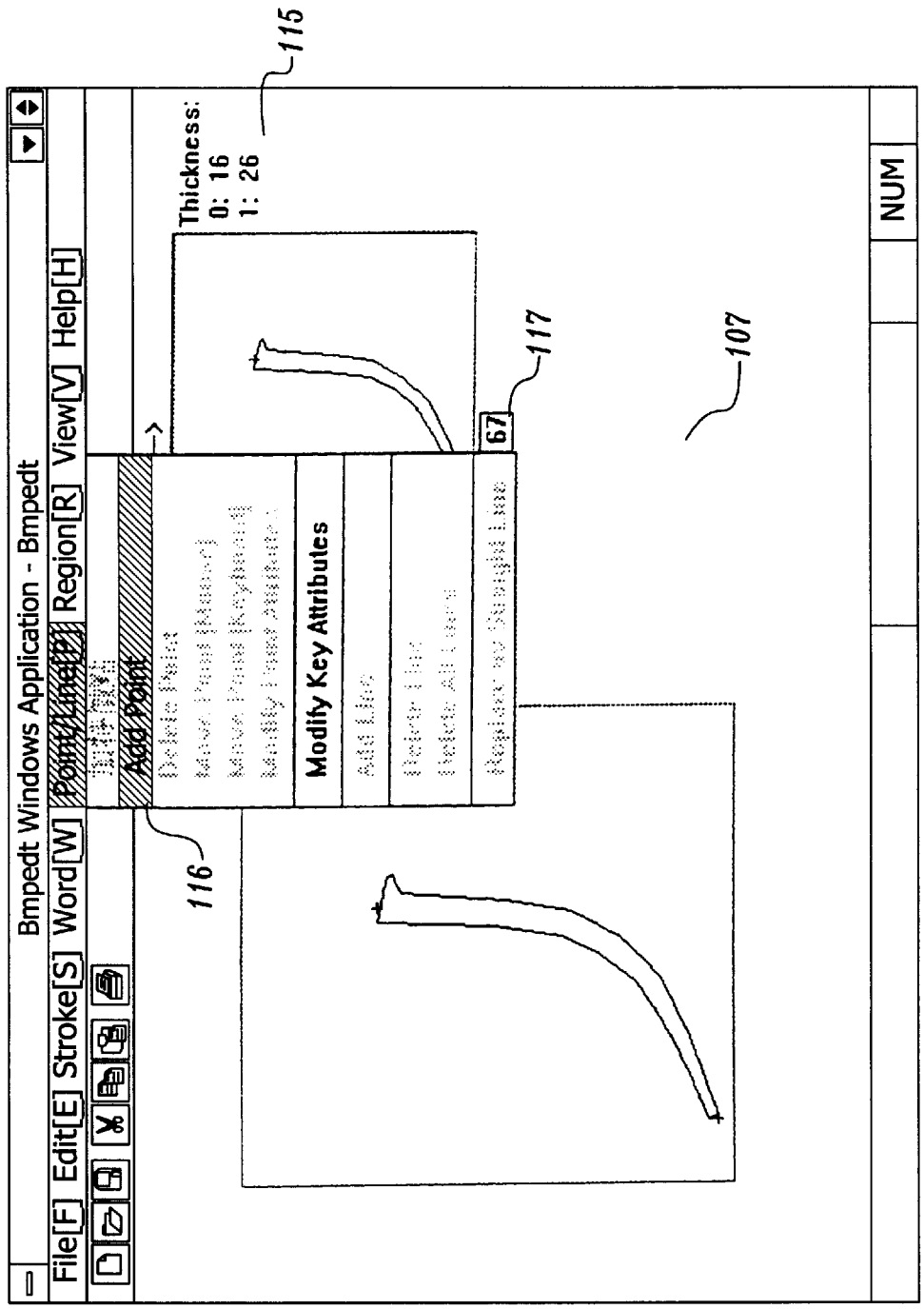

The basic stroke is complete after determining the secondary parameters of feature points and curve segments. FIGS. 4A–4J illustrate a basic stroke CAD tool used by a font designer for designating the secondary parameters of the basic stroke. The font designer begins by retrieving a basic stroke. The font designer selects a Load Stroke command 106 from the menu bar of the CAD tool 104, as shown in FIG. 4A, that retrieves basic stroke ID window 112, as shown in FIG. 4B. Each basic stroke is prestored with an assigned code. The font designer enters the code of a basic stroke into a field block 114 within ID window 112 in order to retrieve the basic stroke assigned to the entered code. The system displays the retrieved basic stroke in two 2-dimensional coordinate spaces. The first coordinate space 108 is a graphically interactive area and the second coordinate space 110 is a smaller noninteractive area. The second coordinate space 110 may be used to display the retrieved stroke at various resolutions. Both coordinate spaces are displayed in a CAD workspace 107 located below the CAD tool's GUI bars. The retrieved basic stroke is displayed in the two coordinate spaces 108 and 110, and the associated code 117 and assigned width values 115 of the displayed stroke key point are displayed in the workspace 107, as shown in FIG. 4C.

As shown in FIG. 4C, the font designer enters a feature point by first selecting Add Point command 116 from the menu bar of the CAD tool 104. Feature point window 118 appears over a portion of the CAD tool 104. Using a cursor controlling device, such as a mouse, the font designer designates, in the first coordinate space 108, a feature point on the outline of the displayed basic stroke. The font designer places feature points at points on the outline where the outline creates a distinct angle, or similar significant change in direction, and at either end of a curve segment with a substantially constant radius.

Figure 4D:
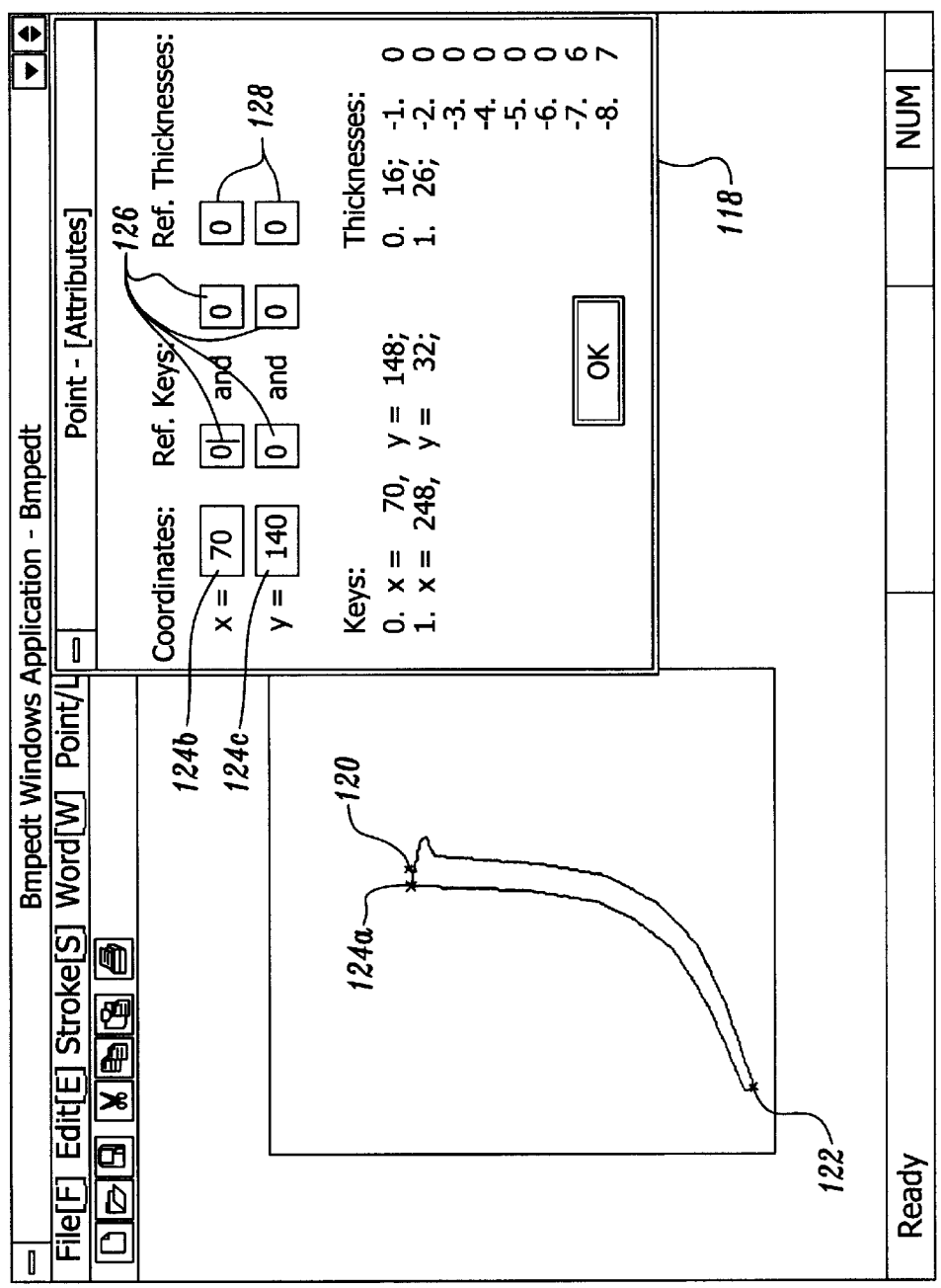

Turning to FIG. 4D, the coordinate values for the designated feature point are displayed within feature point window 118 in feature point coordinate boxes 124b for the X coordinate value and 124c for the Y coordinate value. The font designer then enters at least one code of a key point. This associates the feature point to a key point. This is done at two sets of two key point field code boxes 126, one set for X and one for Y coordinates.

The font designer also enters two codes of a width value(s) in width field code window 128. One entered width value code is for the X coordinate and the other width value is for the Y coordinate. The entered codes are referred to as reference values.

The system retrieves one of a number, n, of predefined formulas according to the entered referenced key point(s) and width value combination. The retrieved formula calculates referenced relative X and Y positions of the designated feature point. The referenced relative X and Y positions are stored for later use by a display processor for calculating feature point positions by applying the retrieved formula in the reverse direction.

In the example of FIG. 4D, the font designer designated a feature point 124a on the outline of the stroke near key point 120 (code=0). Also, the font designer has entered referenced values for the X and Y coordinates (key point 120 (code=0) and width values=26 (also code=0). The system retrieves the predefined formula that is associated with the designer entered referenced key point and width value. The formula is executed separately for the X and Y coordinates. The following formulas (1) and (2) are performed for feature point 124a, as shown in FIG. 4D. X is the x coordinate value and Y is the y coordinate value of designated feature point 124a. $X_{k\phi}$ is the x coordinate value and $Y_{k\phi}$ is the y coordinate value for key point 120 (code=0) and $W_\phi$ is the width value of width code=0.

$$X_{Ref}=(X-X_{k\phi})/W_\phi \quad (1)$$

$$Y_{Ref}=(Y-Y_{k\phi})/W_\phi \quad (2)$$

Figure 4E:
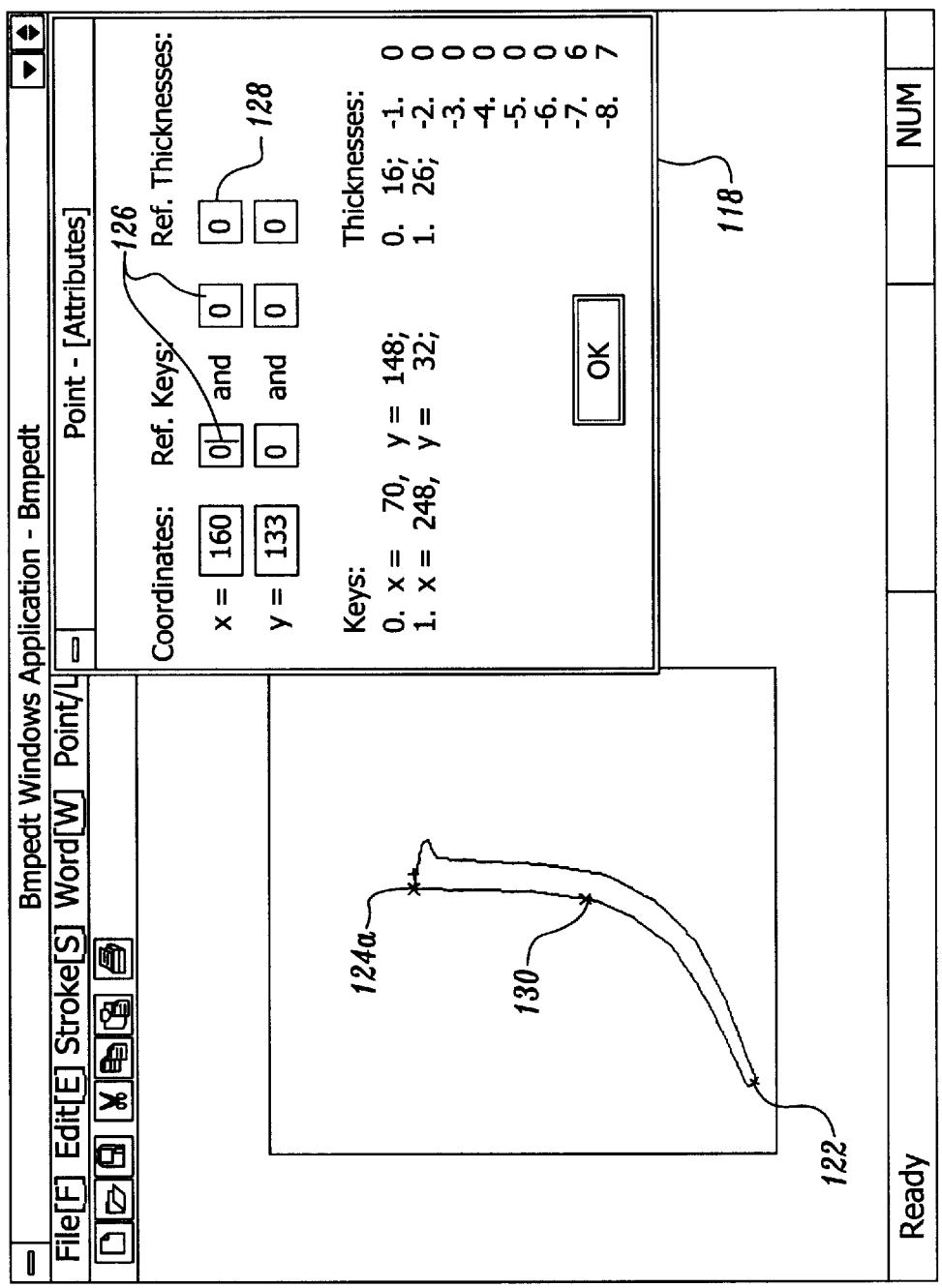
Figure 4A:
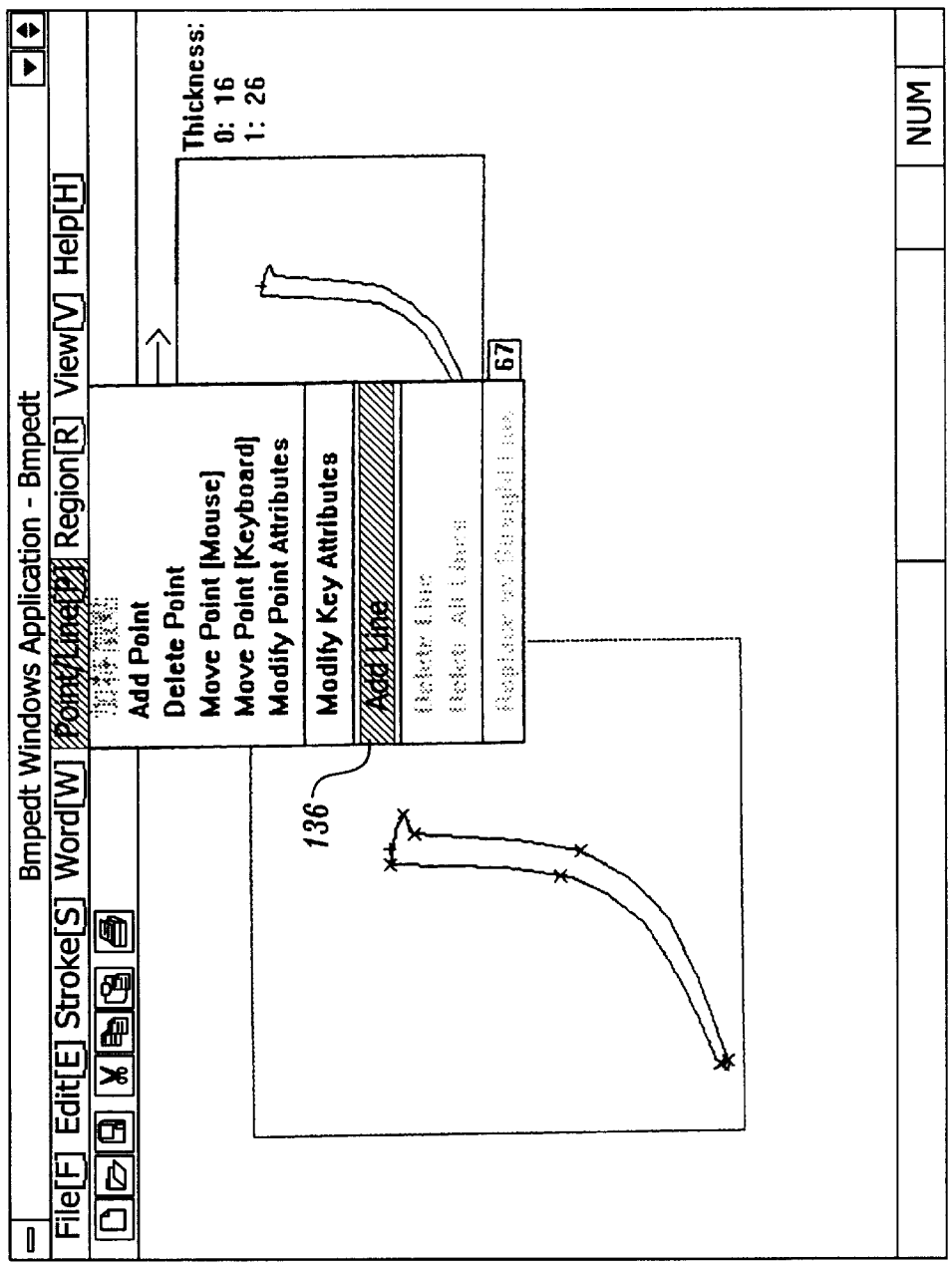
Figure 49:
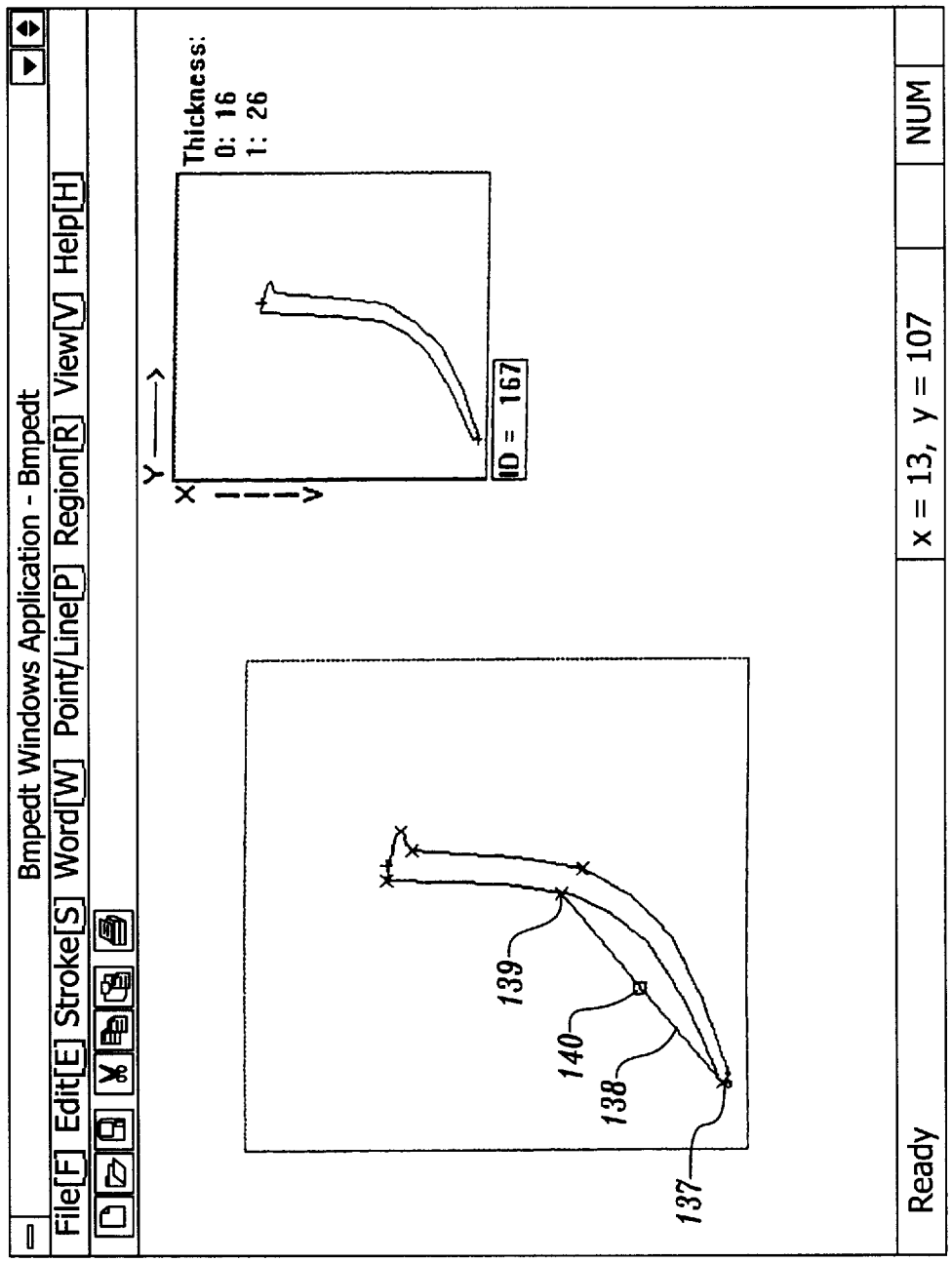

The next two formulas (3) and (4) are retrieved and executed according to the font designer referenced values for feature point 130, as shown in FIG. 4E.

$$X_{Ref}=(X-X_{k\phi})/(X_{k1}-X_{k\phi}) \quad (3)$$

$$Y_{Ref}=(Y-Y_{k\phi})/(Y_{k1}-Y_{k\phi}) \quad (4)$$

Note that formulas (3) and (4) do not use the width value in the calculation. This is because it is not necessary to calculate the referenced values for feature point 130.

Figure 4H:
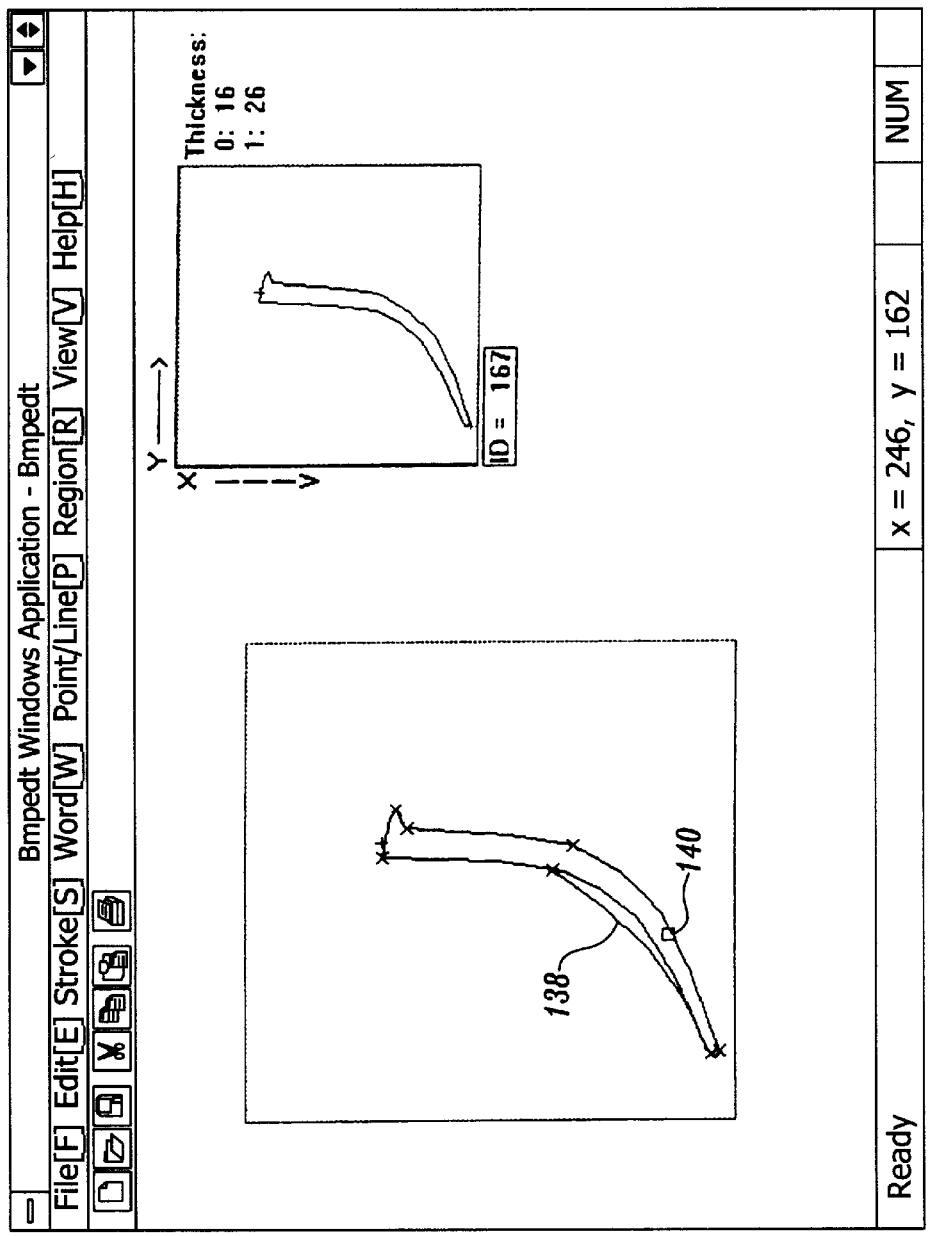
Figure 49:
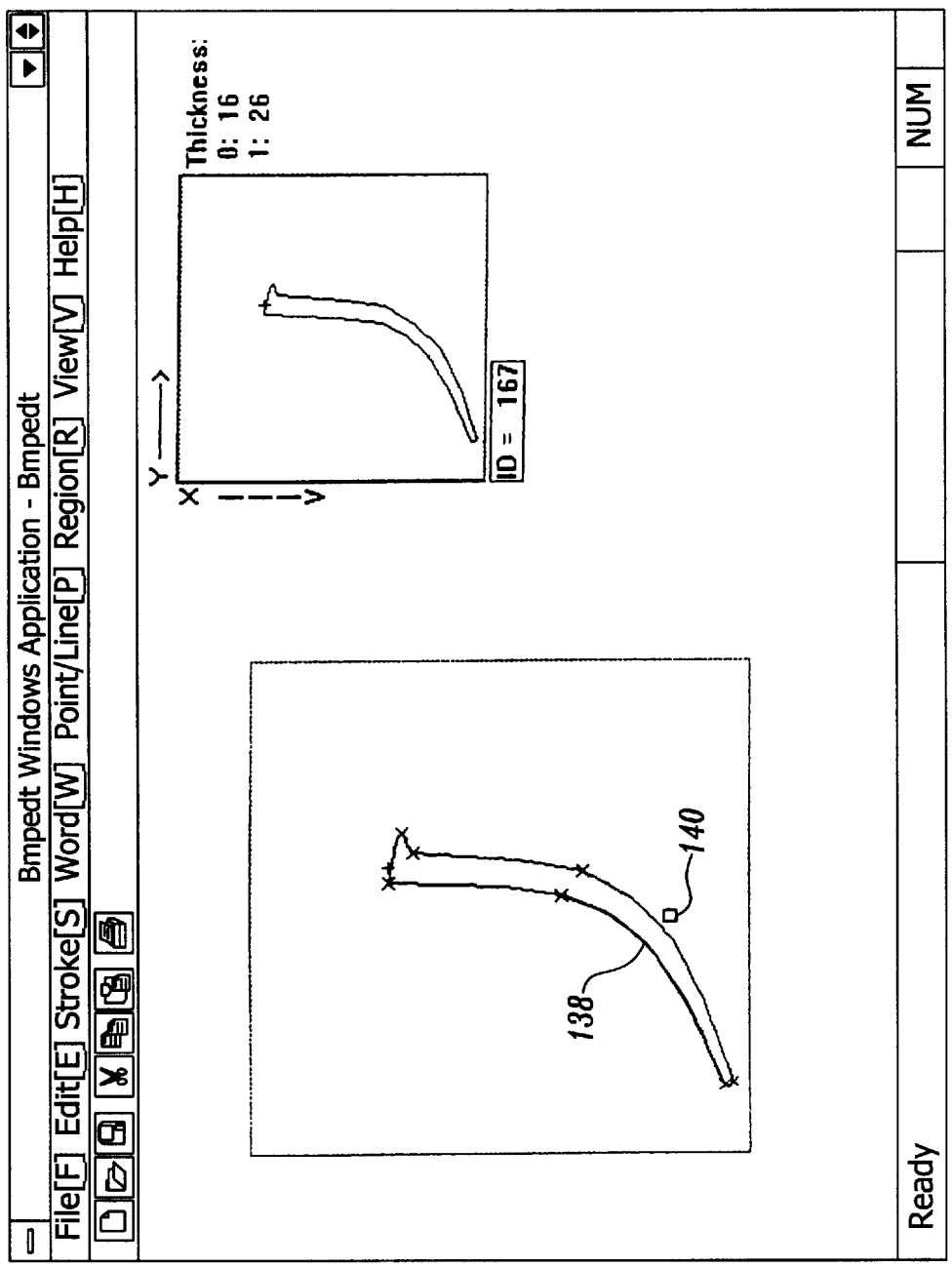

Once two consecutive feature points exist, a curve segment can be generated between the feature points. Referring to FIG. 4F, the designer selects the Add Line command 136 from the menu bar to initiate line or curve generation. As shown in FIG. 4G, the designer selects a pair of consecutive feature points 137 and 139 and selects the Add Line command 136 that presents a line 138 connecting the selected feature points 137 and 139 and a movable midcontrol point 140 at the midpoint of line 138. The midcontrol point 140 is movable by the cursor controlling device to any position within space 108. FIG. 4G illustrates a single midcontrol point designation used by the preferred embodiment for multiple midcontrol point designation, as more fully shown in FIGS. 5B–5L. As shown in FIG. 4H, a curve is generated when the midcontrol point 140 location is not co-located with a direct line connecting the two feature points 137 and 139. Curve generation is performed according to second order Bezier curve generation.

The following formulas are used by the processor for performing the curve generation described above:

if $X_{P1}=X_{P2}$ then $$X_R=X_{mid}-X_{P1}; \quad (5)$$

if $X_{P1} \neq X_{P2}$ then $$X_R=(X_{mid}-(X_{P1}+X_{P2})/2)/|X_{P1}-X_{P2}|; \quad (6)$$

if $Y_{P1}=Y_{P2}$ then $$Y_R=Y_{mid}-Y_{P1}; \quad (7)$$

if $Y_{P1} \neq Y_{P2}$ then $$Y_R=(Y_{mid}-(Y_{P1}+Y_{P2})/2)/|Y_{P1}-Y_{P2}|; \quad (8)$$

Figure 5A:
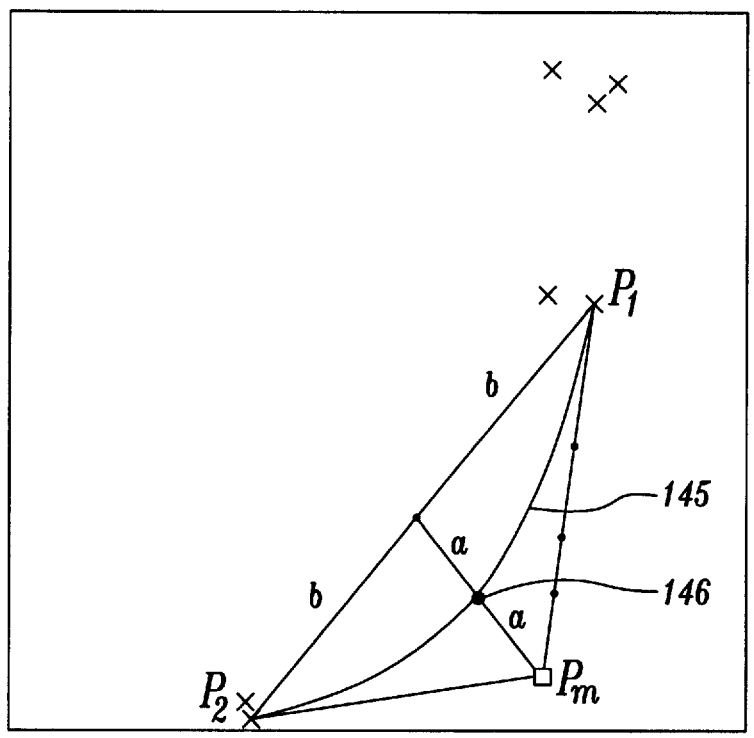
FIG. 5A is a screen shot illustrating curve generation geometry.

P1 is, a first feature point, P2 is a second feature point, mid is the midcontrol point and R is a ratio value that is used for determining curve segments between feature points. FIG. 5A illustrates an example of the curve generation geometry generated using equations 5–8.

Figure 4I:
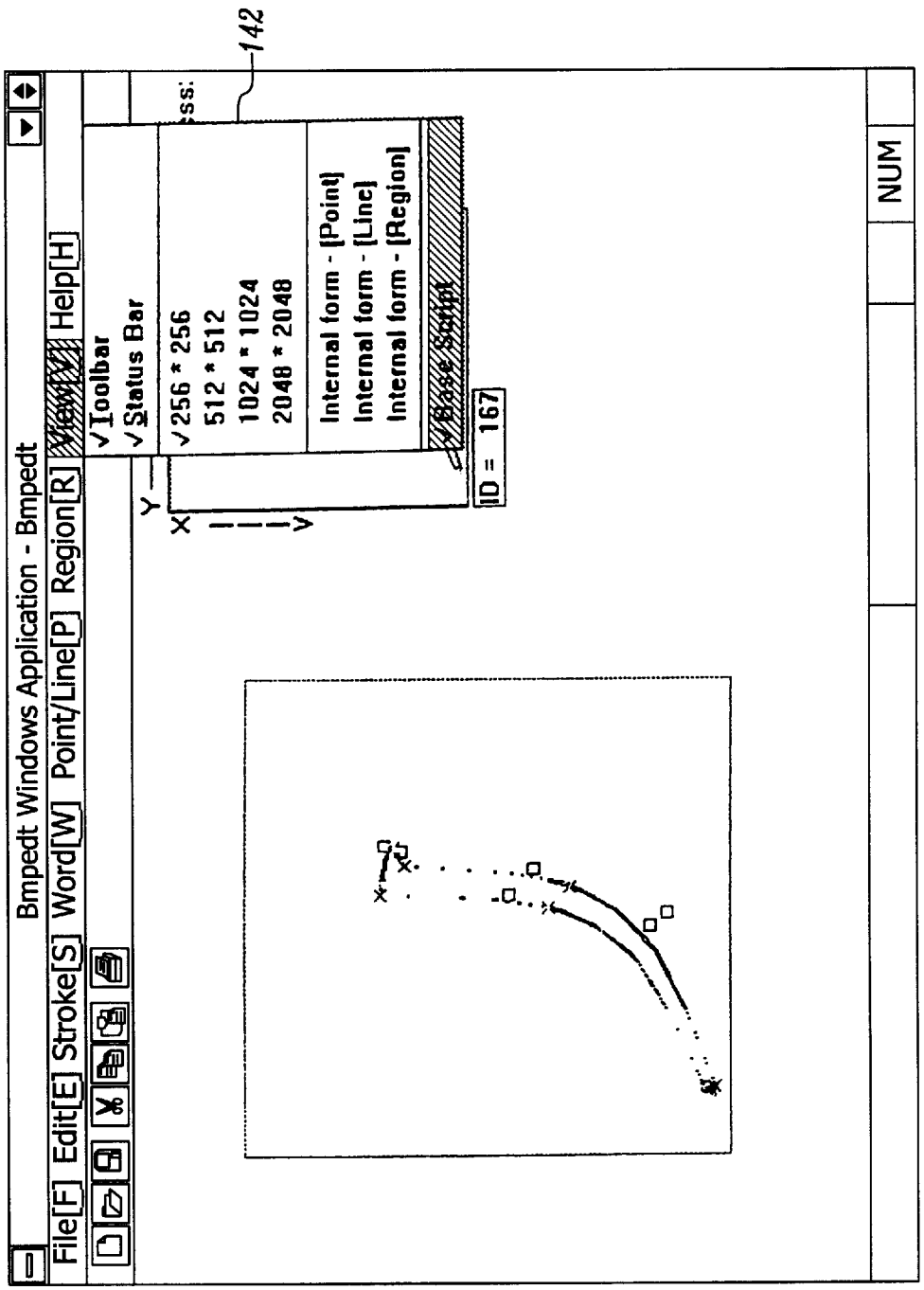

In FIG. 4I the midcontrol point 140 is positioned such that the generated curve segment matches the outline of the template basic stroke. In FIG. 4J, all the feature points and midcontrol points have been designated to adequately describe the outline of the basic stroke. The primary and secondary parameters have now been assigned and stored for the basic stroke from the example shown in FIGS. 4A–4J. The basic stroke is now completely described by the primary and secondary parameters. Also, a base resolution is assigned to the basic stroke as designated in a pull-down menu 142. Pull-down menu 142 presents selectable display and base script character space resolution options.

CURVE LEVEL DEFINITION

FIGS. 5B–5G illustrate a CAD tool for performing the curve generation method described in FIG. 2C. The CAD tool allows a font designer to create curve information sufficient for a low resolution display and more detailed curve information sufficient for a high resolution display, whereby the curve information is stored in a single tree-level table data structure.

The curve generation of FIGS. 5B–5G is similar to that shown above in FIGS. 4F–4I. A line is initially generated between two feature points with a cursor controlled midcontrol point. A second order Bezier curve segment is generated to closely match the scanned outline image of the basic stroke between the two stationary points, such as two feature points. The second order Bezier curve geometry is illustrated in FIG. 5A. As shown in FIG. 5A, second order Bezier curve generation creates a triangle between the two stationary points (feature points) $P_1$ and $P_2$ and the moveable midcontrol point $P_m$. Also, a line is connected between the midcontrol point $P_m$ and the midpoint of the line connecting stationary point $P_1$ and $P_2$. The generated curve segment 145 is tangent to both the line connecting $P_1$ to $P_m$ and $P_2$ to $P_m$ at point $P_1$ and $P_2$, respectively. Generated curve segment 145 also passes through the midpoint 146 of the line connecting $P_m$ to the midpoint of the line connecting $P_1$ and $P_2$.

Figure 5B:
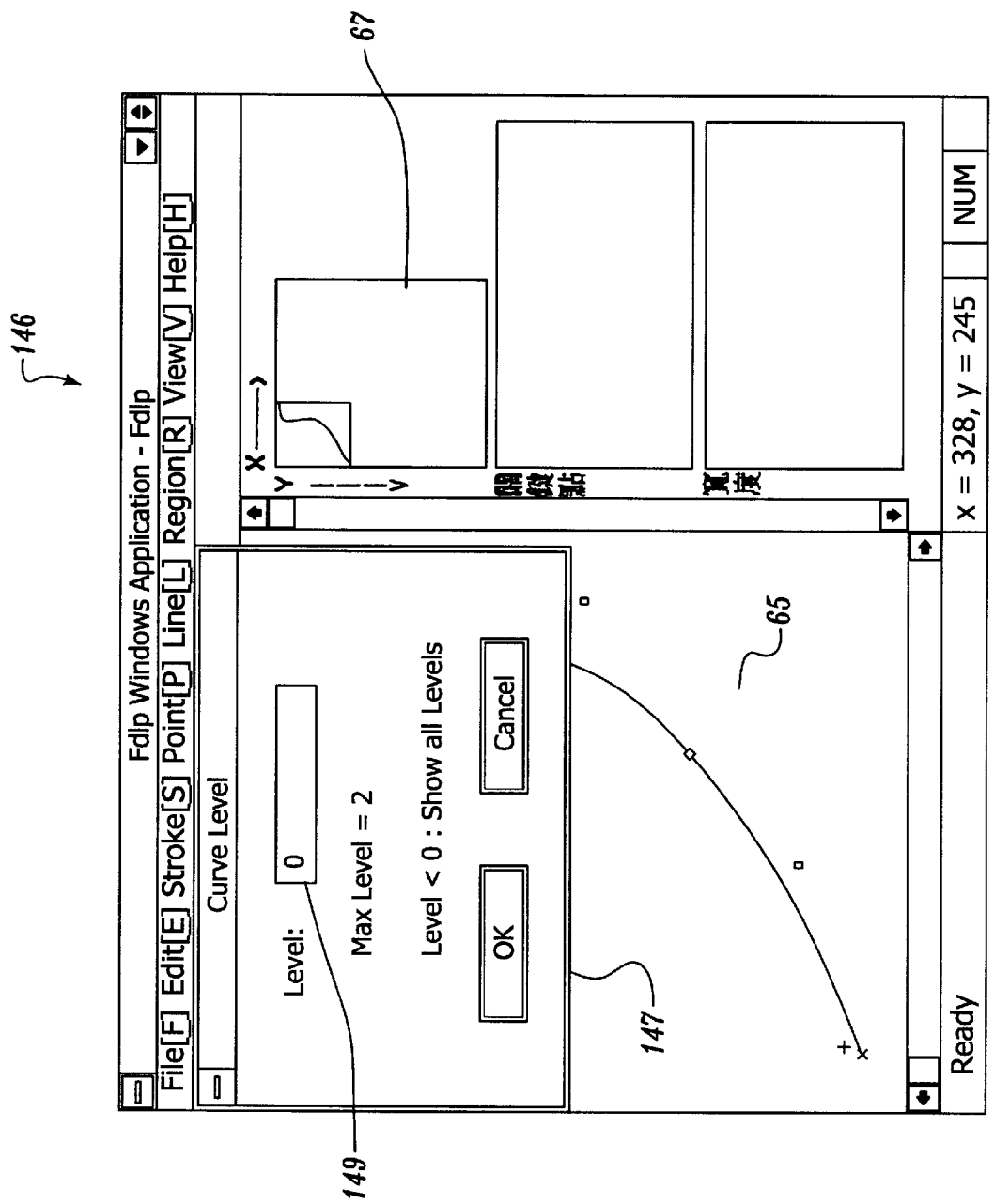

As shown in FIG. 5B, the font designer begins the process of describing curve segments for high and low resolution output devices. First, a font designer generates a curve segment between two feature points as described above with FIGS. 4F–4I. Then, curve segments are described in greater detail by performing a split curve command for generating multiple ridcontrol points between feature points. The split curve command generates a new midcontrol point between a previously generated portion of a curve segment. For example, from FIG. 5A, if the font designer wishes to further define the upper portion of curve segment 145, the font designer selects the split curve command for feature point $P_1$ and point 146. A cursor controlled midcontrol point is displayed to allow manipulation of a new curve segment between feature point $P_1$ and point 146, similar to that described for FIG. 5A.

In FIGS. 5B–5G, the font designer assigns generated curve segments to curve level codes. The font designer can define in greater detail a curve between two feature points by generating a greater number of curve segments between the two feature points. Greater detail is more important for generating a character for a high resolution display. A high resolution display requires greater detail for characters than a low resolution display would.

Each curve level code represents a set of mid control points or ratios assigned to levels of a tree-type data structure stored in memory that describes a curve between two feature points. See FIG. 5B described below. The font designer retrieves curve level window 147 and enters a curve level code into a curve level code block 149 within curve level window 147. In this example, the font designer has designated the curve level=0 with a single midcontrol point $P_1$ between feature points $P_A$ and $P_B$. Note that midcontrol point $P_1$ is located closer to feature point $P_A$ in work space area 65 of FIG. 5C. The points, midcontrol point and always feature points, stored for curve level zero are ($P_A$ $P_1$ $P_B$).

Figure 5G:
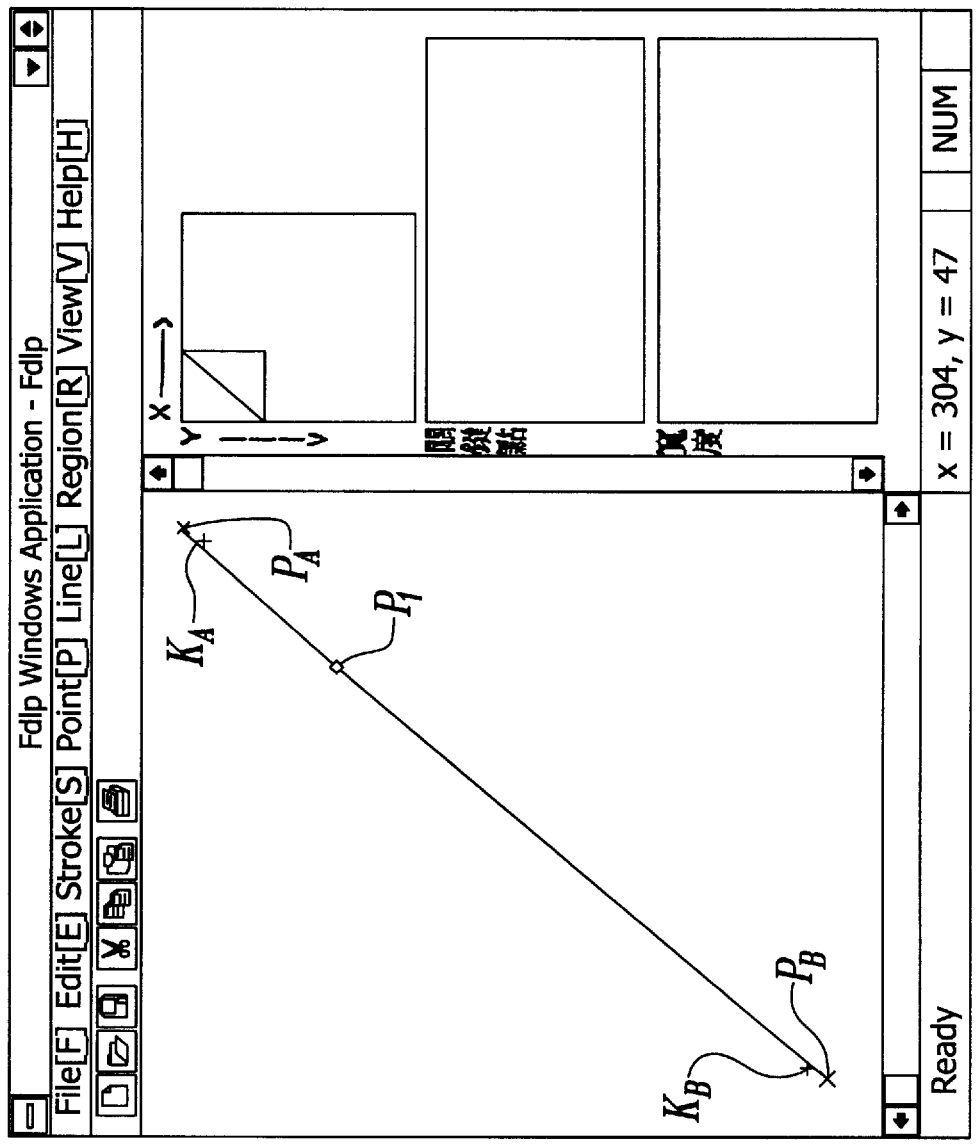
Figure 5D:
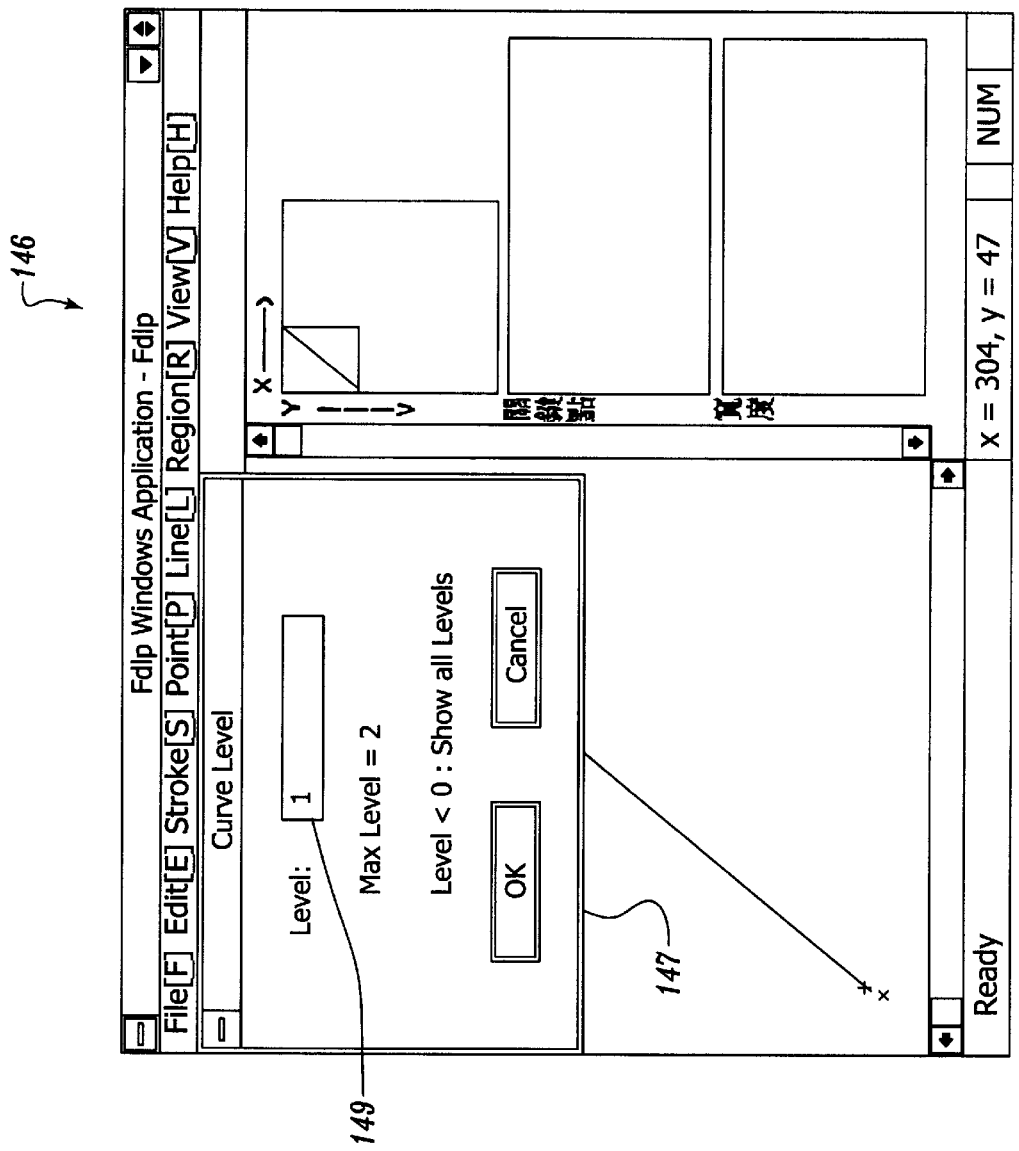
Figure 5E:
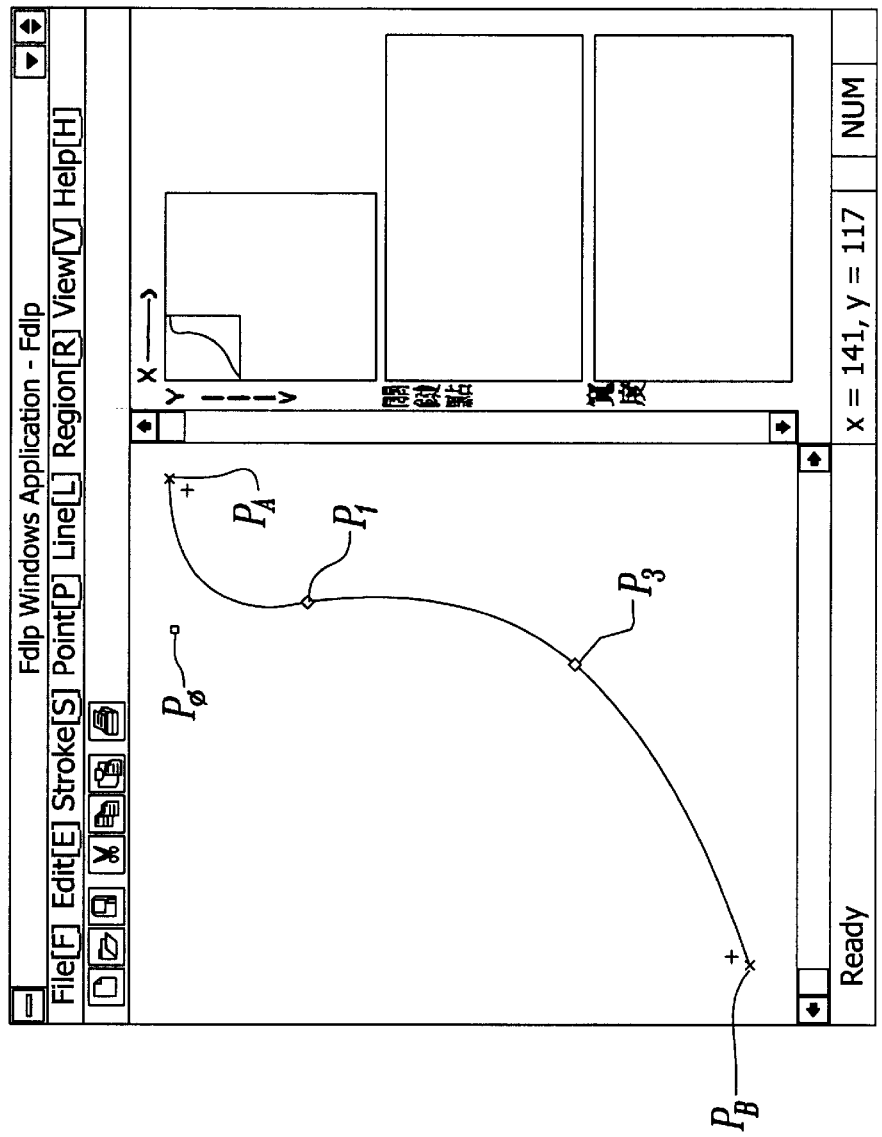

In FIG. 5D, the font designer defines curve level 1 within curve window 147. As shown in FIG. 5E, the curve segments between $P_A$ and $P_1$, and $P_1$ and $P_B$ are split and assigned two new midcontrol points, $P_0$ and $P_3$, respectively. Level 1 is ($P_A P_0 P_1$) for the first segment and ($P_1 P_3 P_B$) for the second curve segment. In FIG. 5F, the font designer completes curve level designation by designating the values for curve level 2 within curve level window 147. As shown in FIG. 5G, the font designer has split the curve segments between $P_1$ and $P_3$, and $P_3$ and $P_B$ with new midcontrol points, $P_2$ and $P_4$, respectively. The Level 2 is ($P_A P_0 P_1$) for the first curve segment, ($P_1 P_2 P_3$) for the second curve segment, and ($P_3 P_4 P_B$) for the final curve segment.

Figure 5H:
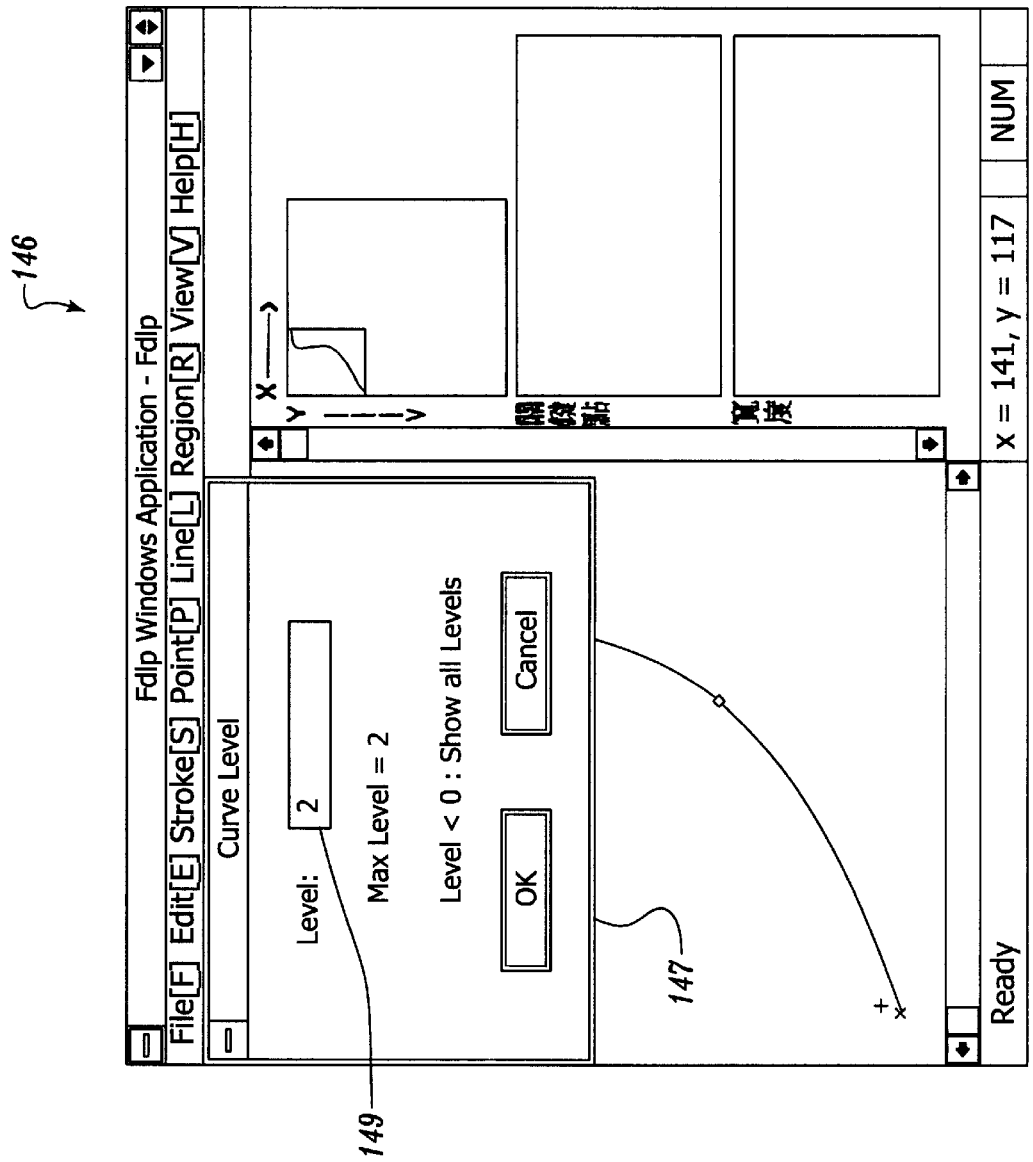
FIG. 5H is an illustration showing the primary font data of the curves generated in FIGS. 5B–5G.
Figure 59:
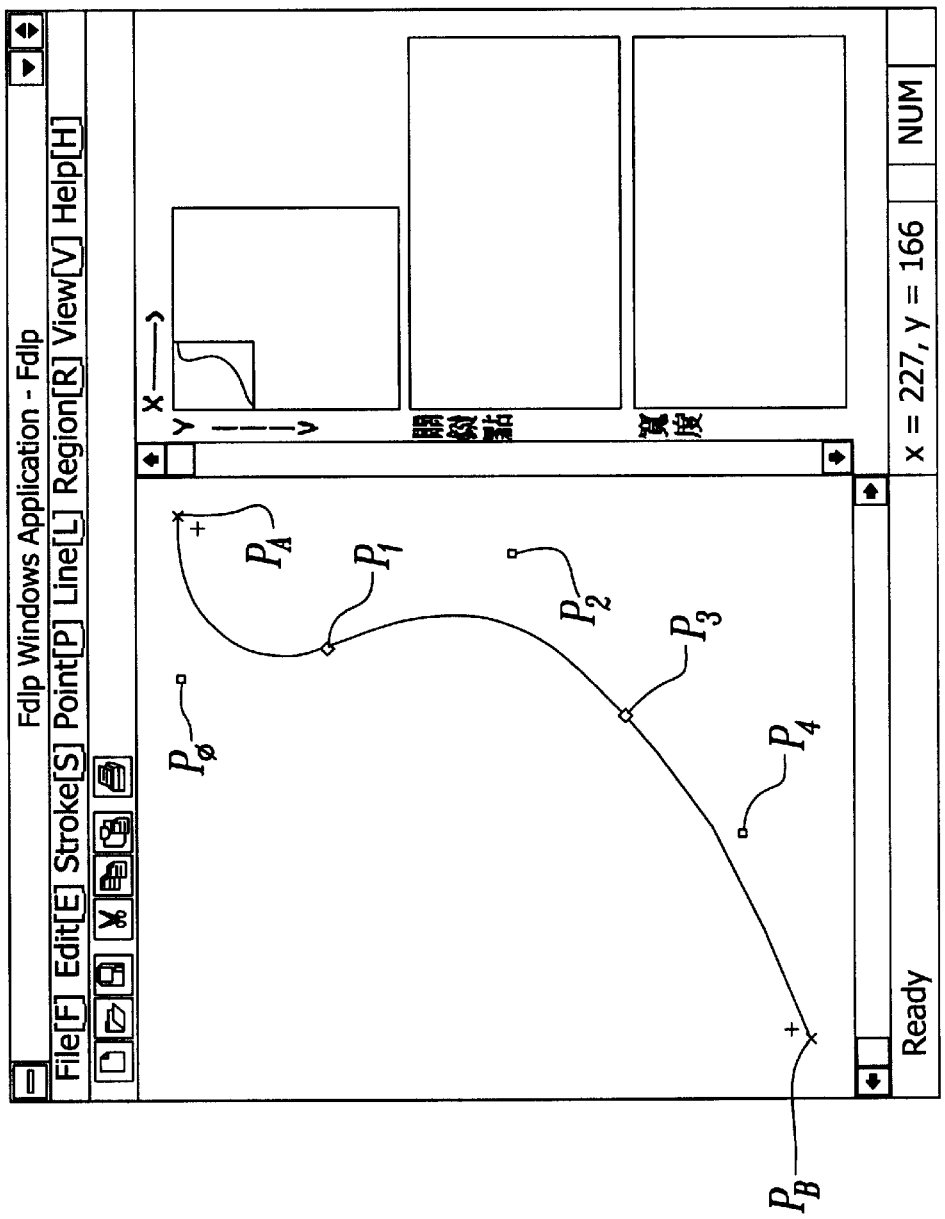
Figure 59:
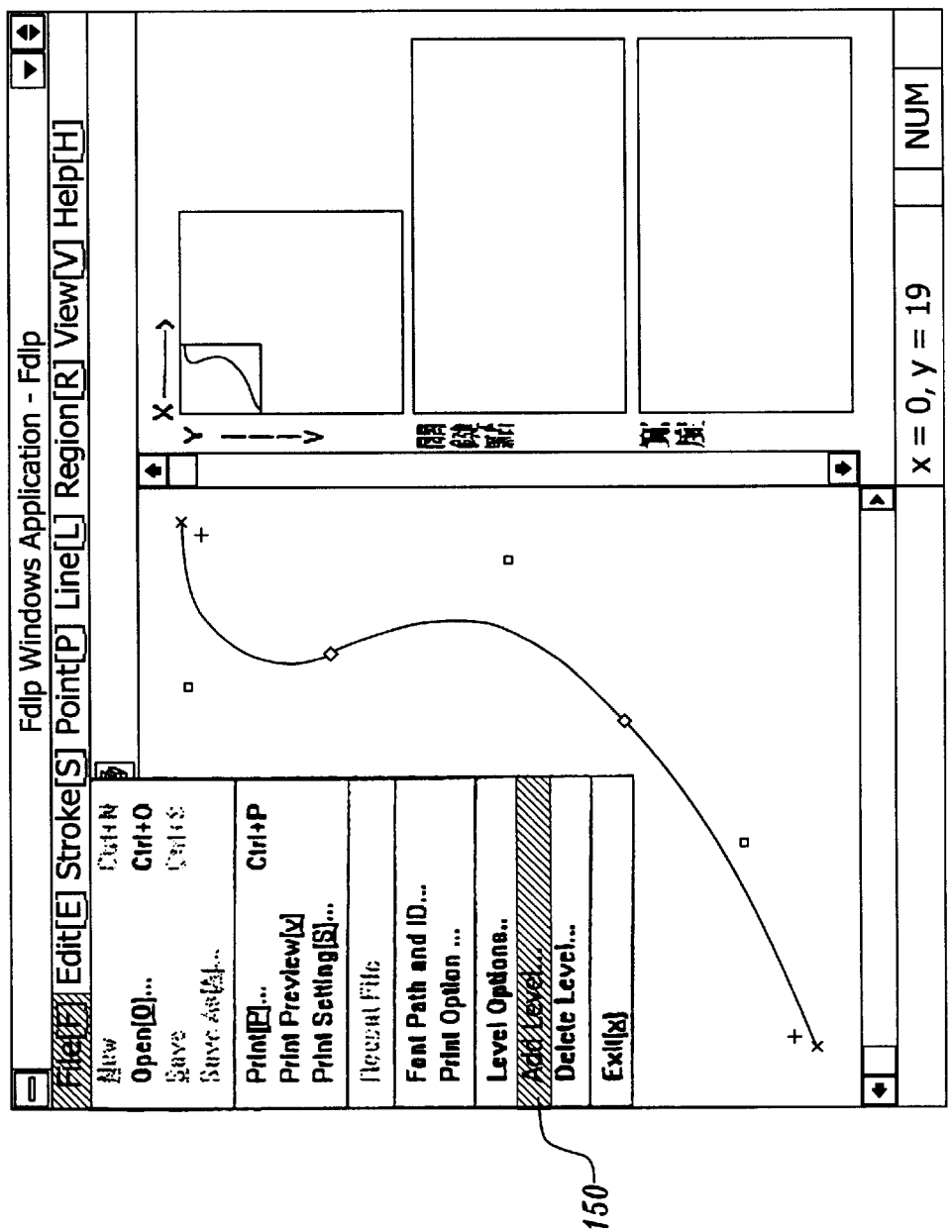
Figure 5F:
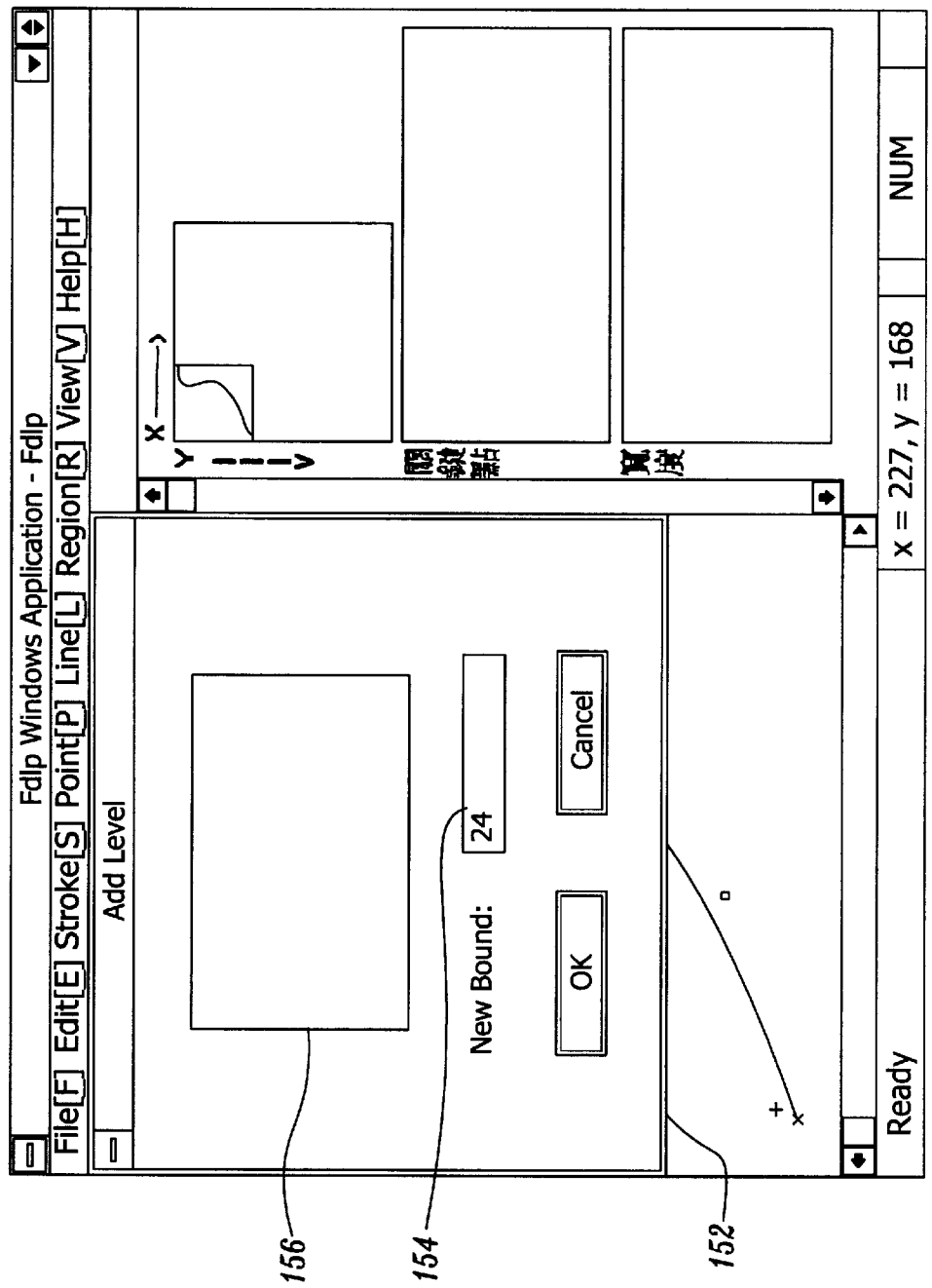

FIG. 5H illustrates the stored data for curve segment (code number 0) generated in FIGS. 5B–5G above as part of stroke (code number 0). The stroke is defined by two key points with character space values of (341,31) and (38,344), and width values of 10 and 20. Also, the referenced values of the two feature points (code numbers 0 and 1) are shown below the width values and key point values. The midcontrol points designated in FIGS. 5B–5G are stored according to their relative position or ratio from feature points $P_A$ and $P_B$, and are shown below the displayed referenced values of the two feature points. Below the displayed midcontrol point ratios is a visual comparison between the midcontrol point ratios shown in a tree structure 143 format and in an in-fix notation 144 format. Tree structure 143 illustrates the hierarchical relationship between the midcontrol point ratios between feature points $P_A$ and $P_B$. In Tree structure 143, the connecting lines between the midcontrol points and the feature points $P_A$ and $P_B$ illustrate pointers that are stored with each midcontrol point ratio. The pointers indicate the connection between each of the midcontrol point ratios, thus presenting the information for generating low to high resolution curves. The top level of the tree structure 143 ($P_1$) has been assigned to curve level 0, see FIGS. 5B and 5C. The second level of the top of tree structure 143 (including $P_0$ and $P_3$) has been assigned curve level 1 and so on. The feature points $P_A$ and $P_B$ are not assigned to a curve level, but are shown with pointers to them. When a curve level is designated for display, the midcontrol point ratios assigned to the designated curve level and all midcontrol point ratios above the designated curve level in the tree structure 143 are retrieved for curve generation. Thus, midcontrol point ratios are stored only once for various resolution displays, as shown by the in-fix notation 144. Therefore, storage space is optimized for multi-resolution display usage. The in-fix notation 144 is another way of illustrating the relationships shown in tree structure 143.

After each curve level is defined, as shown above in FIGS. 5B–5G, the font designer assigns each of these levels to specific bitmap boundaries. Essentially, the font designer is assigning a level of detail to a range of bitmap values by visually determining the least amount of curve information require for generating acceptable curve segments at each range of bitmap values. For example, if a curve segment displayed on a low resolution display appears the same whether it is defined by a single midcontrol point ratio or multiple midcontrol points, the font designer determines that it is wiser to define the curve segment by the single midcontrol point ratio therefore saving display processing time.

Figure 5K:
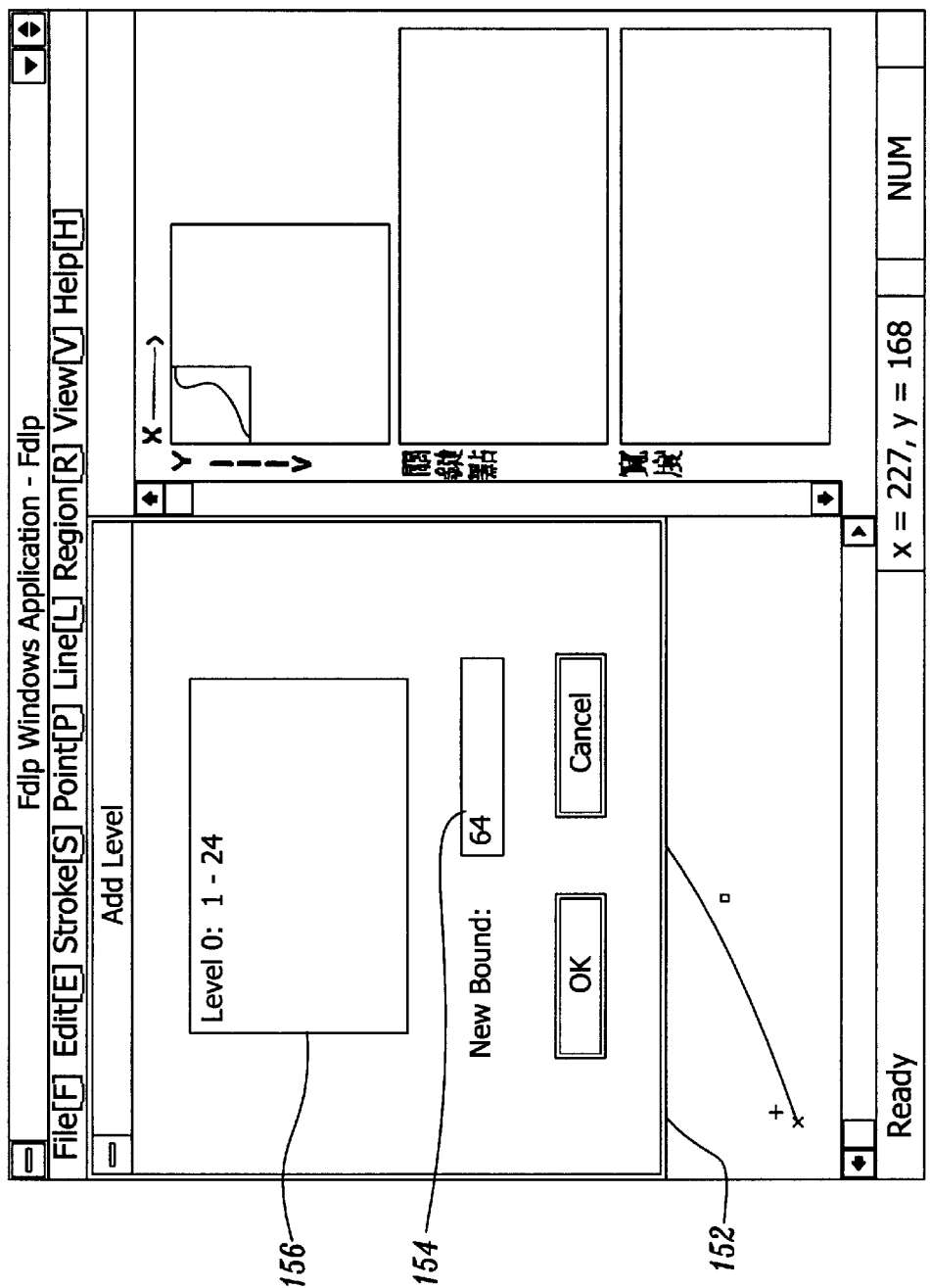
Figure 5L:
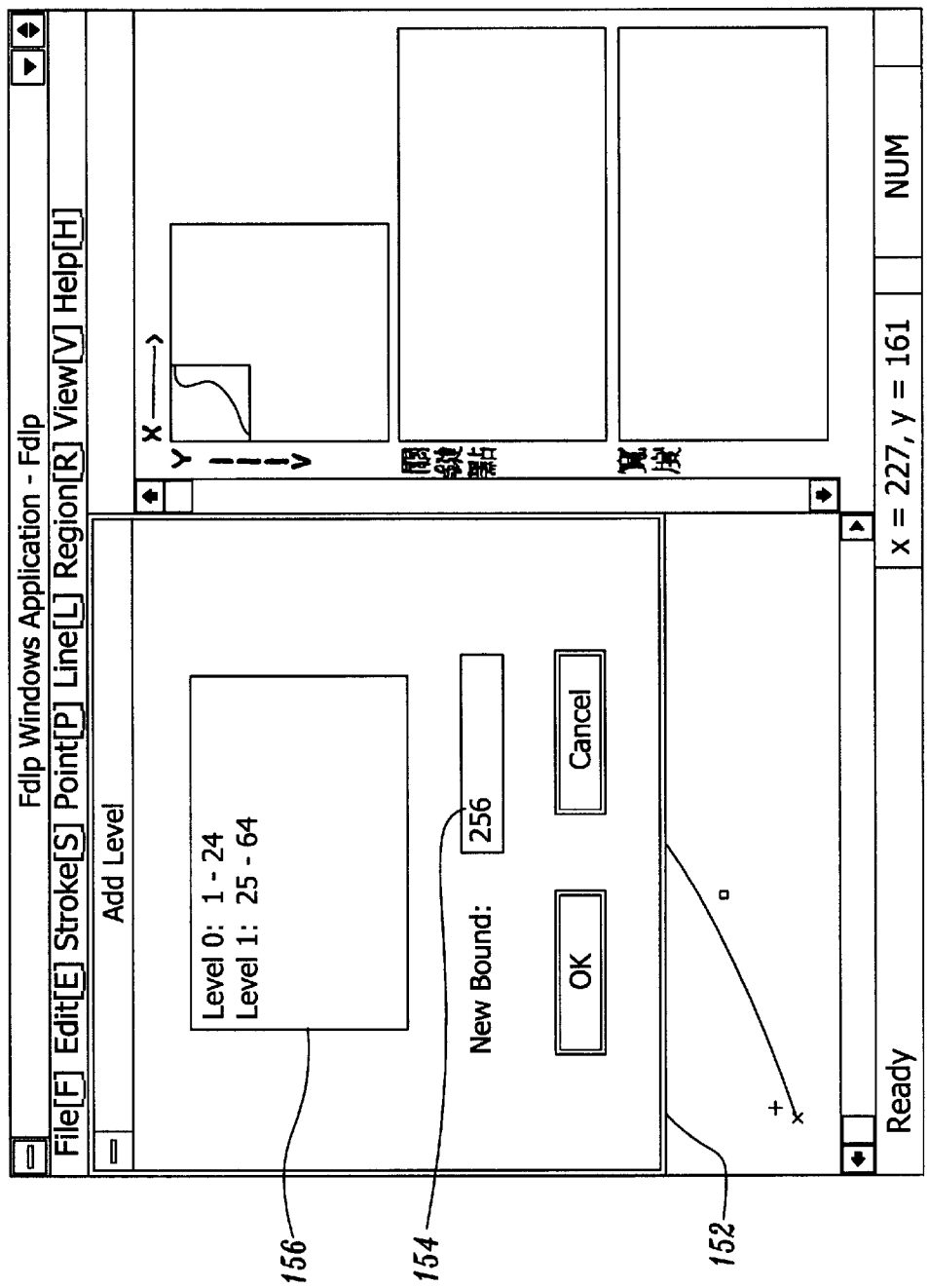
Figure 5M:
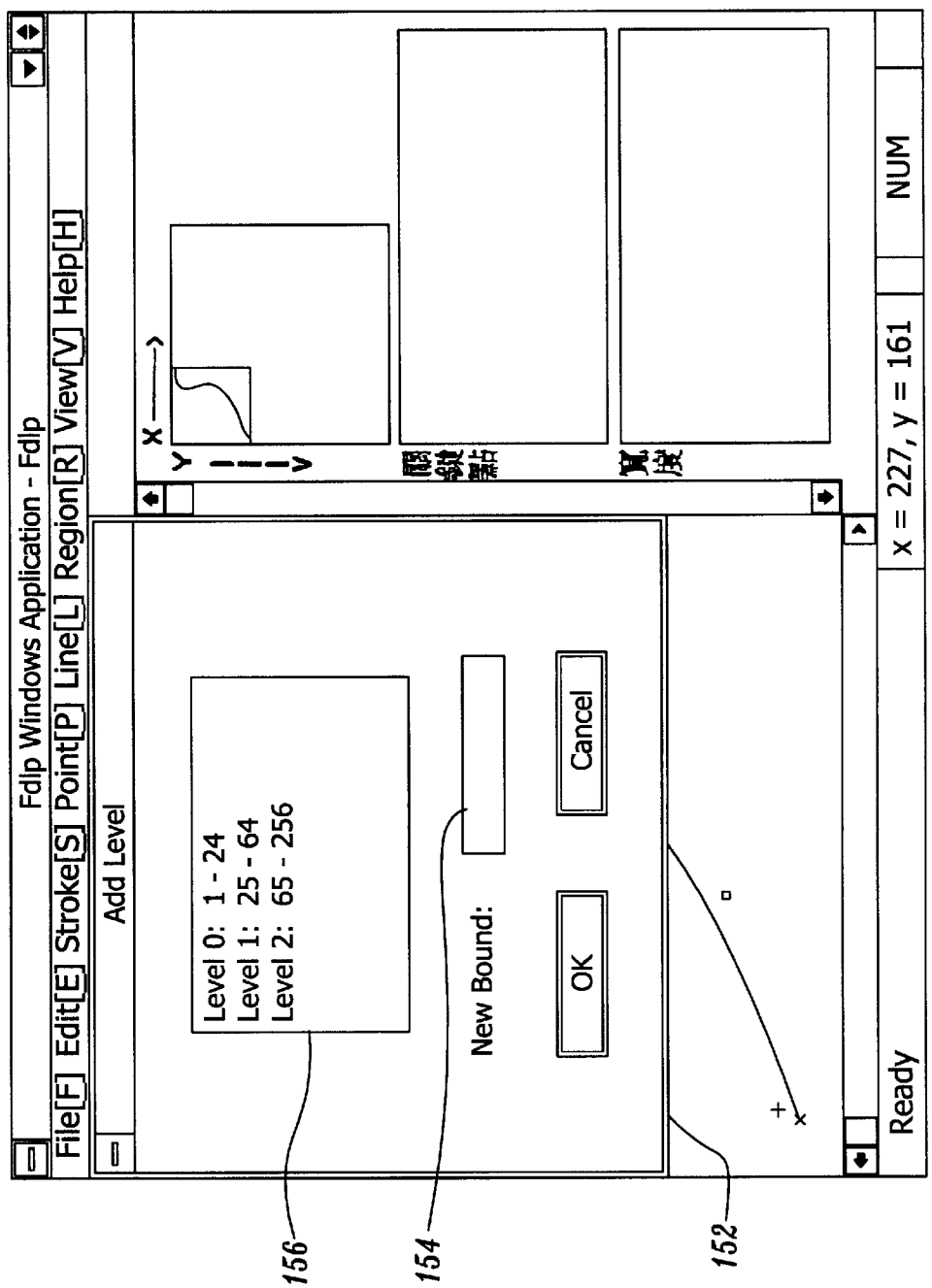

As shown FIG. 5I, the font designer selects Add Level command 150 from a pull-down menu of the main menu of the CAD tool to begin designating boundaries for the stored levels. As shown in FIG. 5J, the Add Level command 150 accesses an overlay Add Level window 152 which includes a boundary designation block 154 and a level number bitmap boundary display area 156. The level bitmap boundary display area 156 displays the stored level number and which bitmap boundaries are assigned to the shown level. In the example of FIG. 5J, the font designer has entered bitmap value 24 into the bitmap boundary designation block 154, thus assigning all bitmap values up to and including 24×24 to Level 0, as shown in the display area 156 in FIG. 5K. In FIG. 5K, the font designer enters upper bitmap level boundary =64 into the boundary box 154, thus assigning bitmap values between 25 and 64 to Level 1, as shown in display area 156 of FIG. 5L. Finally, in FIG. 5L, the font designer enters the bitmap value 256 into bitmap boundary block 154, thus assigning all bitmap values between 65 and 256 to the last stored level, Level 2, as shown in display block 156 of FIG. 5M.

The font designer can also designate the level at which hinting information will be used during display processing of the stored basic strokes. For example, if the font designer designates Level 1, of the examples shown in FIGS. 5B–5M, as a hint information active level, all levels below and including Level 1 will exhibit active hinting of key points labeled with hint information. Other types of information may be attached to one or more curve levels. The hinting process is described in more detail below with FIGS. 7A and 7B.

The strokes of a basic stroke are expressed by the following:

$$S = f_i(\{K_j\}, \{W_k\}) \qquad (9)$$

where S is the stroke, i is the ith or the basic stroke code=i of the basic stroke, $f_i$ is the feature point reference formula corresponding to the basic stroke code=i, $K_j$ is the key point j, and $W_k$ is the kth referenced width. The formula $f_i$ is an algorithm which accepts the input data of key point locations $|\{K_j\}|$ and referenced width values $|\{W_k\}|$ to generate the outline. As such, stroke data of a font is stored in the form of the mathematical expression Equation 9 above.

USER CAD TOOL

Figure 6B:
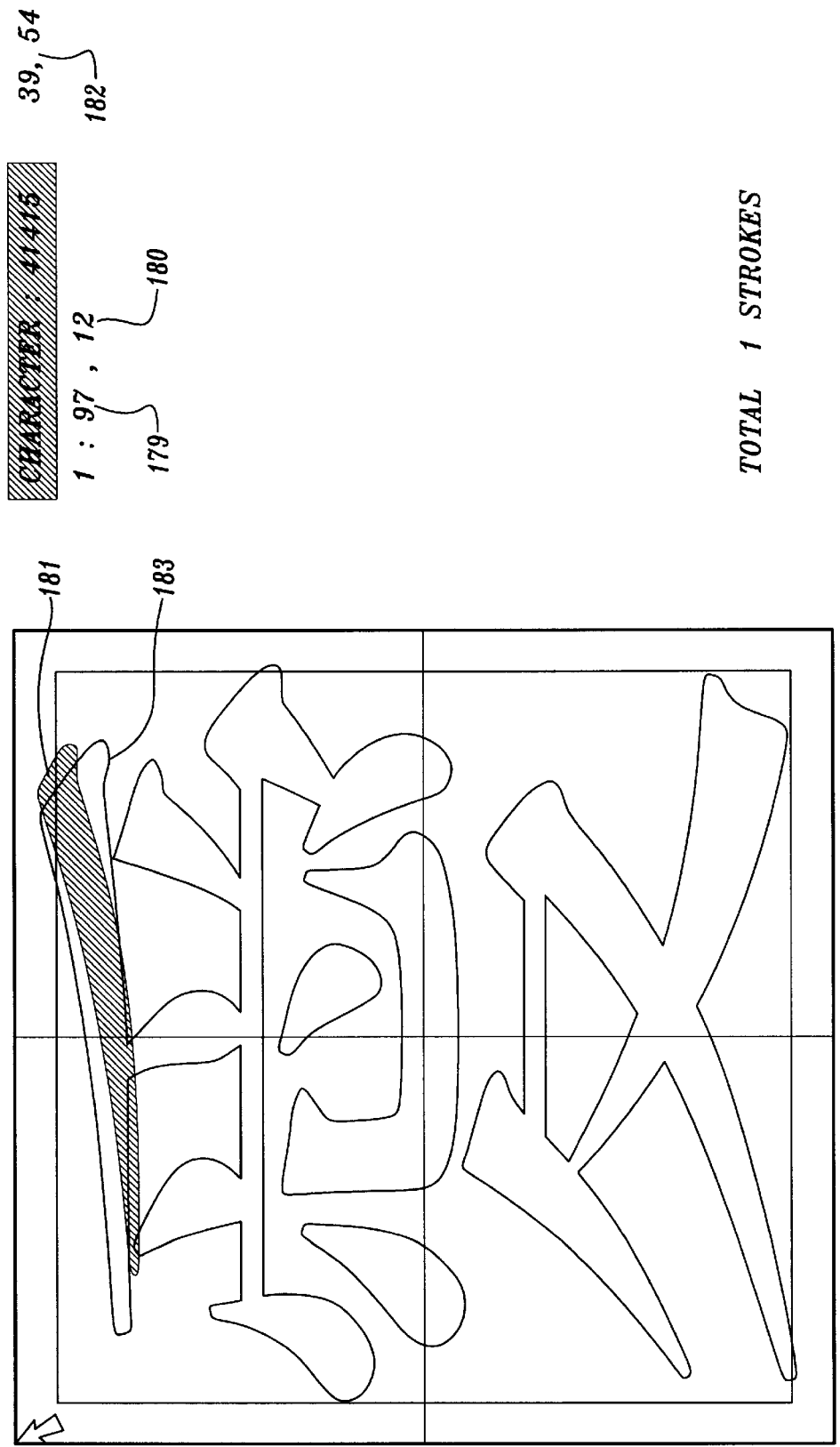
Figure 68:
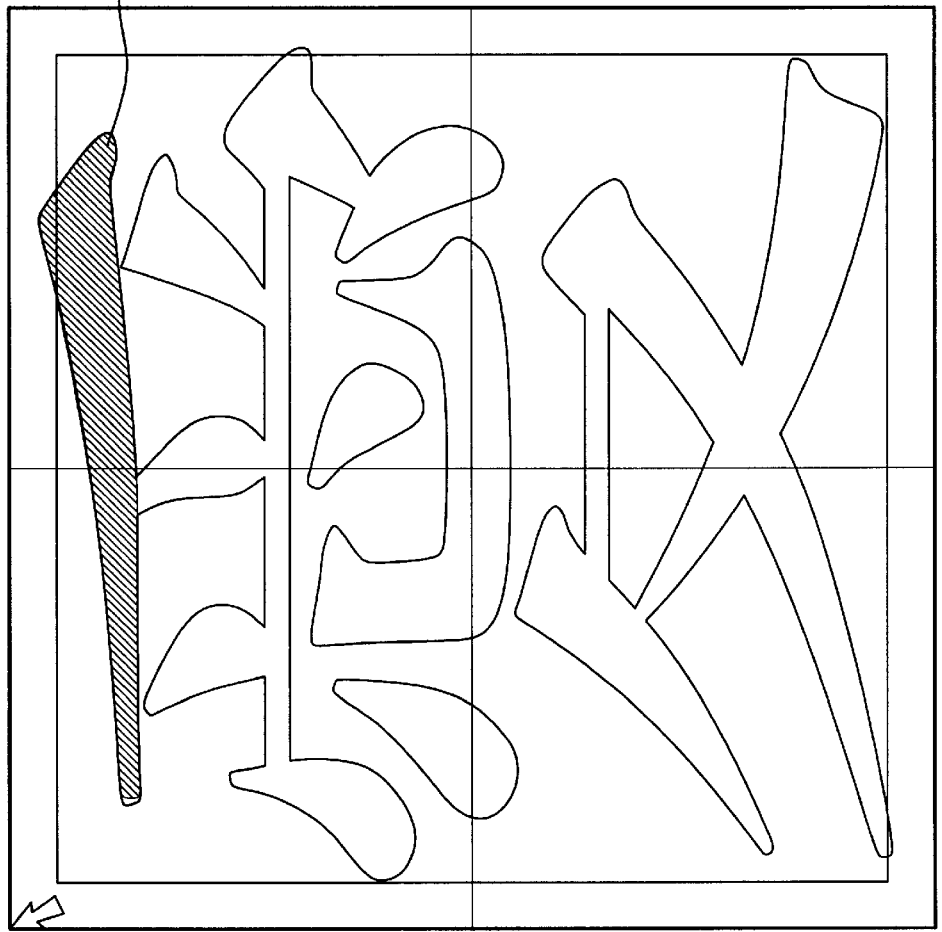

FIGS. 6A–6E illustrate a user CAD tool for performing the user font generation method described in FIG. 2D above. The user CAD tool is also a windows-based graphical user interface that includes a workspace with a character display area 176. First, the user selects a character of a font that the user desires to use as a template for creating a stored set of strokes. The selected character is displayed in the character display area 176. Also, within the workspace the CAD tool displays the number of strokes saved, at space 148, and the stroke number the user is presently working on, at area 177. Second, the user assigns a previously generated basic stroke to each of the strokes of the selected character. The user selects a basic stroke that most closely resembles each stroke in the selected character. For example, as shown in FIG. 6B, the user has selected the basic stroke 181 (code=97) to match the top horizontal stroke 183 of the displayed character. The selected basic stroke 181 is displayed within character display area 176. After basic stroke selection, the changes the shape of the basic stroke to match the stroke of the character moving the basic stroke's key points. For example, as shown in FIGS. 6C and 6D, the user has changed the key point locations of the basic stroke 181 to better match that of the outline stroke. The secondary parameters are moved and displayed in real-time according to relative key point's position. The left most key point has been moved from location (39, 54) to (37, 35). Key point movement can be performed by the use of a user controlled cursor or by directly entering new coordinate locations for the key points.

FIGS. 6B–6E illustrate an example of the user increasing the basic stroke's width value for the basic stroke 181 to more closely match the stroke 183. In FIG. 6C, the user has increased the width value to 16 from an original 12 and further increases the width value to 20, as shown in FIG. 6E, thus matching the basic stroke 181 to the stroke of the selected character. In FIG. 6E, basic stroke 181 matches the stroke 183. The newly created basic stroke 181 is now saved in memory for later use in stroke generation. The user font generation CAD tool is designed for use in a windows-based operating system, however, it can also be implemented in various other types of operating systems. It is also noted, that the method performed by the user font generation CAD tool could be performed automatically using image analysis techniques. Also performed within the user font generation CAD tool is the method of hinting, described below. Hinting could also be performed in the basic stroke CAD tool.

HINTING

A font designer or user assigns hints to key points to increase the display quality of strokes of the constructed font in low resolution space. Hint information modifies stroke shapes to avoid jammed strokes and maintains symmetry of strokes in the viewing space during character rendering. In order to assign hint information, the font designer or user simply labels which key point(s) of a stroke, such as that shown in FIG. 6E, requires hinting.

Figure 7A:
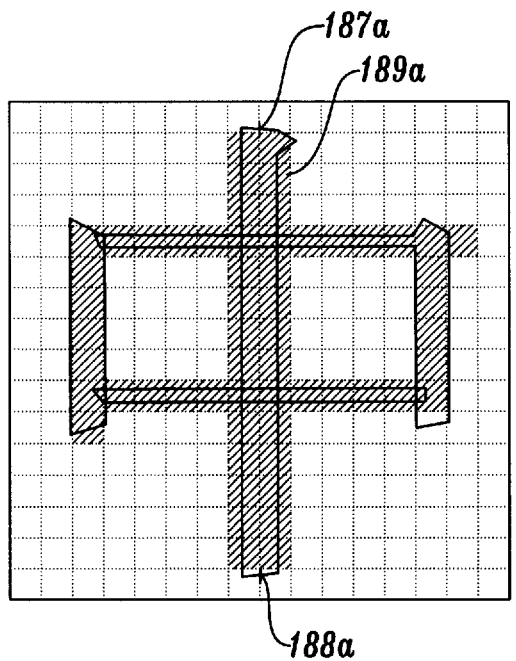
FIGS. 7A and 7B are illustrations of a bitmap character with unlabeled and labeled key points, respectively.
Figure 7B:
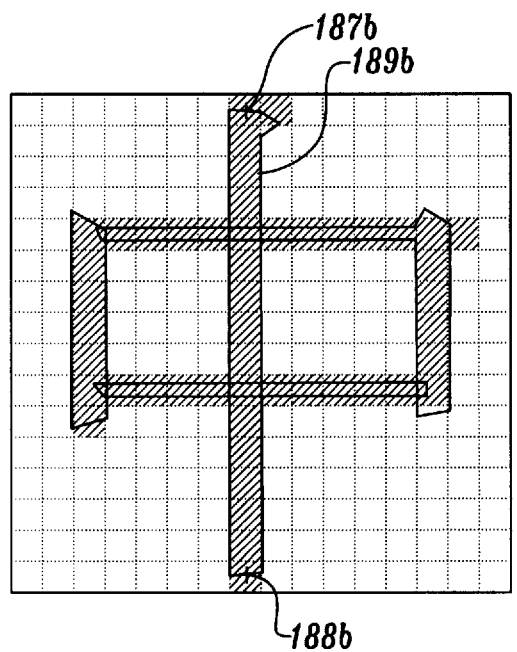

Hint information is used during the display of key points. A key point with hint information is moved to the center of the display cell (pixel) in which it appears. FIGS. 7A and 7B illustrate the contrast of unlabeled and labeled key points. In FIG. 7A, key points 187*a* and 188*a* are unlabeled. Thus, the outline of stroke 189*a* activates two columns of display cells in the low resolution space, because the outline covers at least 50% of display cells of two columns.

In contrast, as shown in FIG. 7B, key points 187*b* and 188*b* are labeled and the key points are moved to the center of the display cell. Thus, stroke 189*b* maintains a stroke width of one display cell, because the key points 187*b* and 188*b* are moved to the center of display cells of the same display cell column. The outline of stroke 189*b* activates only one column of pixels.

Figure 8A:
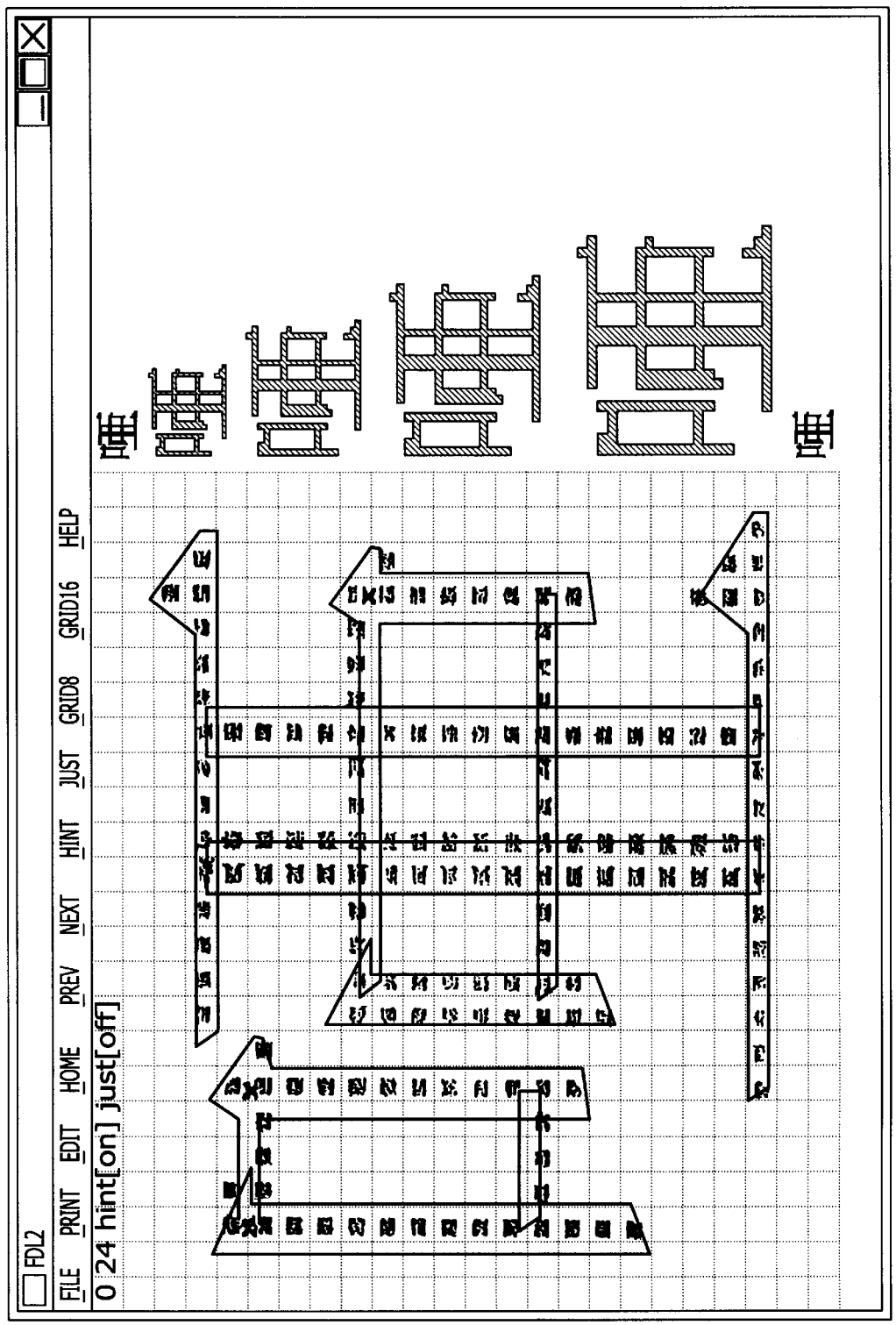
FIGS. 8A and 8B are screen shots illustrating nonadjusted strokes and adjusted strokes, respectively.
Figure 8B:
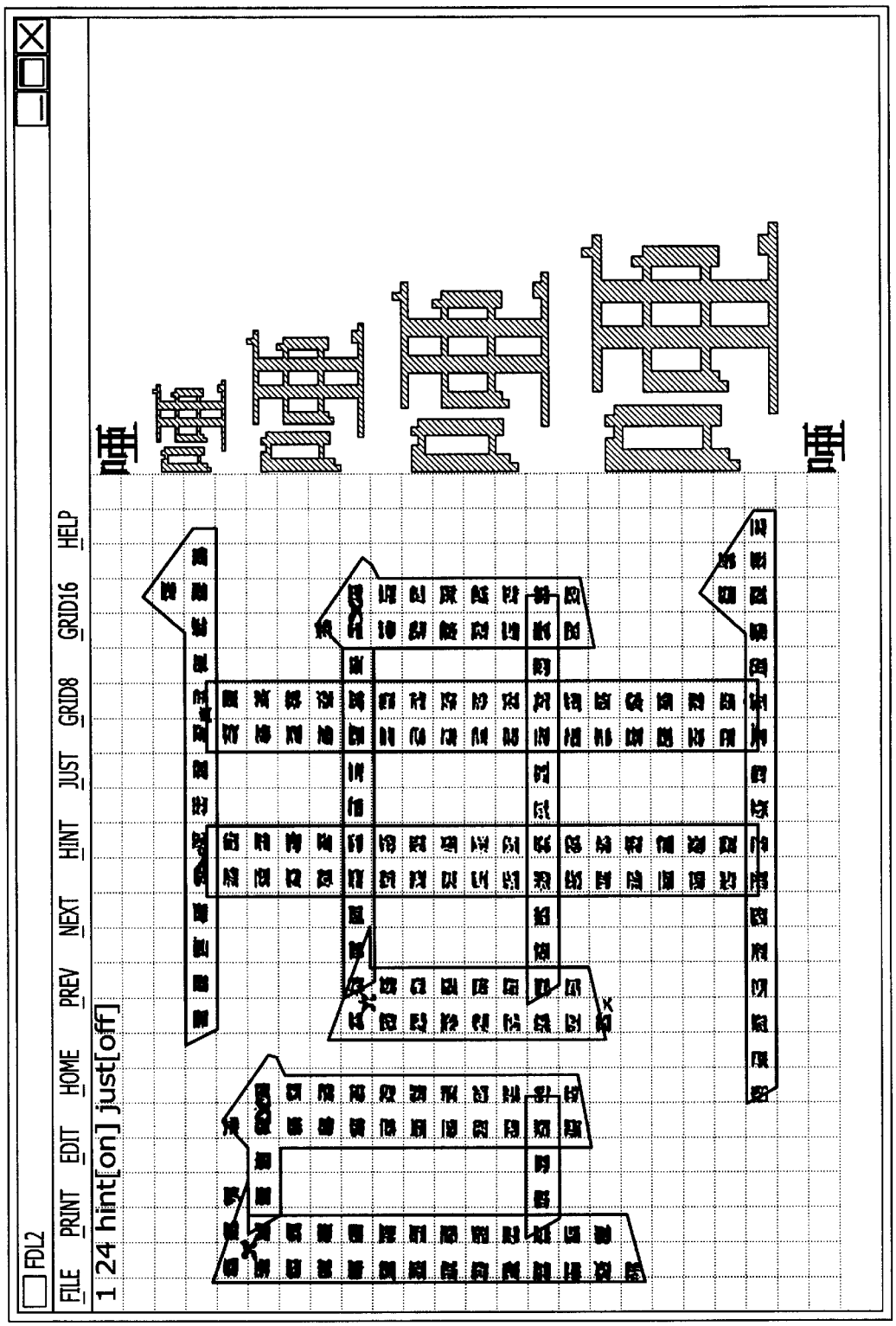

FIG. 8A illustrates another technique performed when hinting is activated. As shown in FIG. 8A, all the vertical strokes are approximately the same width of two pixels. However, some of the stroke outlines activate only a single column of pixels and others activate two pixel columns. In order to maintain consistency for like-widthed strokes, a stroke's width dimension, number of pixels, is first determined. If the determination results in an odd pixel value, the key points of the stroke are positioned to the center of the pixel in which they are initially located, otherwise, the key point is adjusted to the nearest grid line (line separating pixels) parallel to the lengthwise dimension of the stroke. As shown in FIG. 8B, all the key points of the vertical strokes have been adjusted to the nearest grid line, thereby keeping the vertical stroke widths consistent throughout the character.

STROKE ADJUSTMENTS

Low resolution displays may at times cause parallel strokes in a character to overlap or cause multiple parallel strokes to be improperly balanced; for example, a middle stroke closer to a left stroke than a right stroke. FIGS. 9–11 illustrate these problems that may occur and the solution according to the present invention.

Figure 9A:
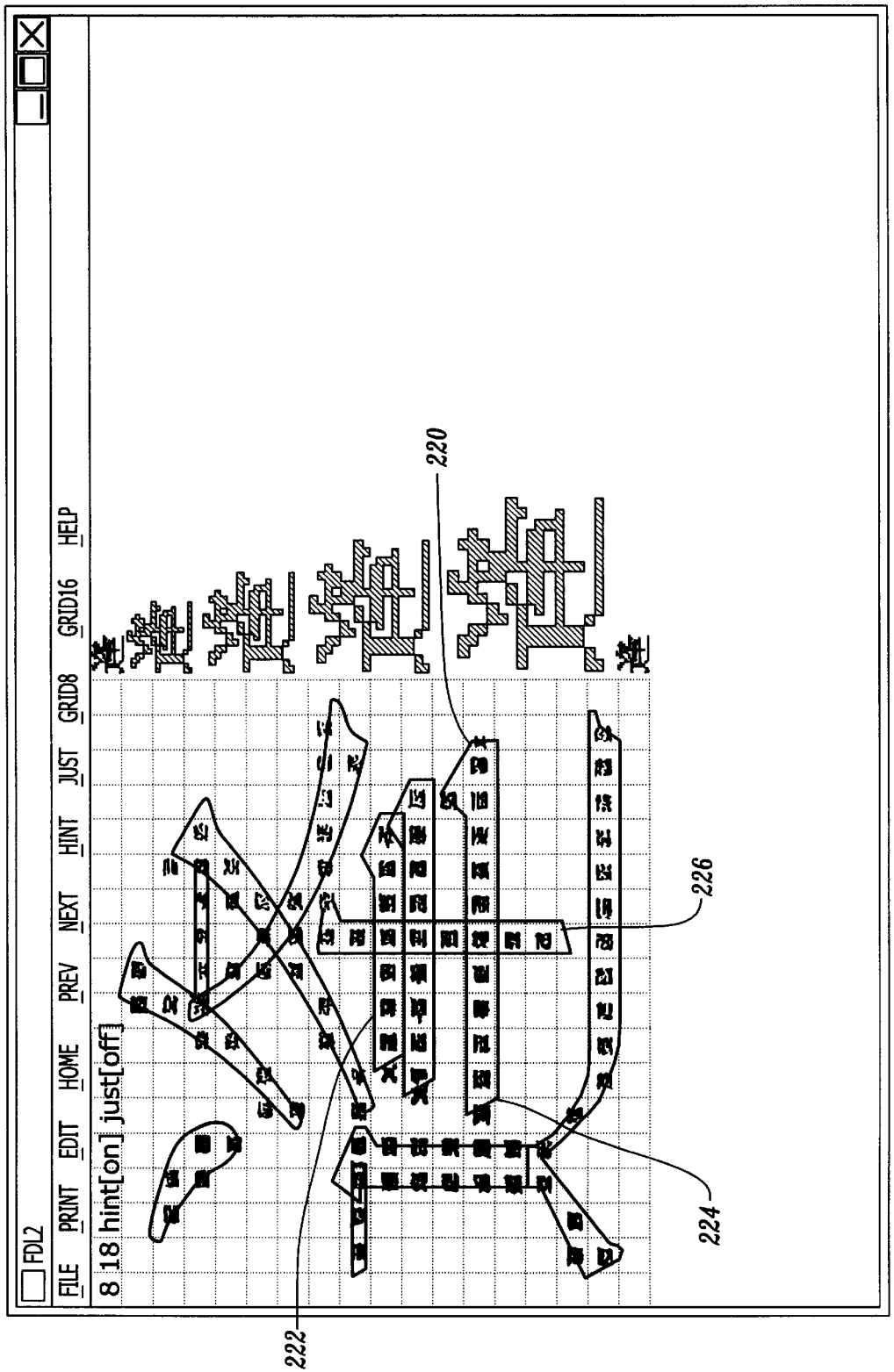
FIGS. 9A and 9B are screen shots illustrating overlapped strokes and corrected nonoverlapped strokes in a character, respectively.
Figure 9B:
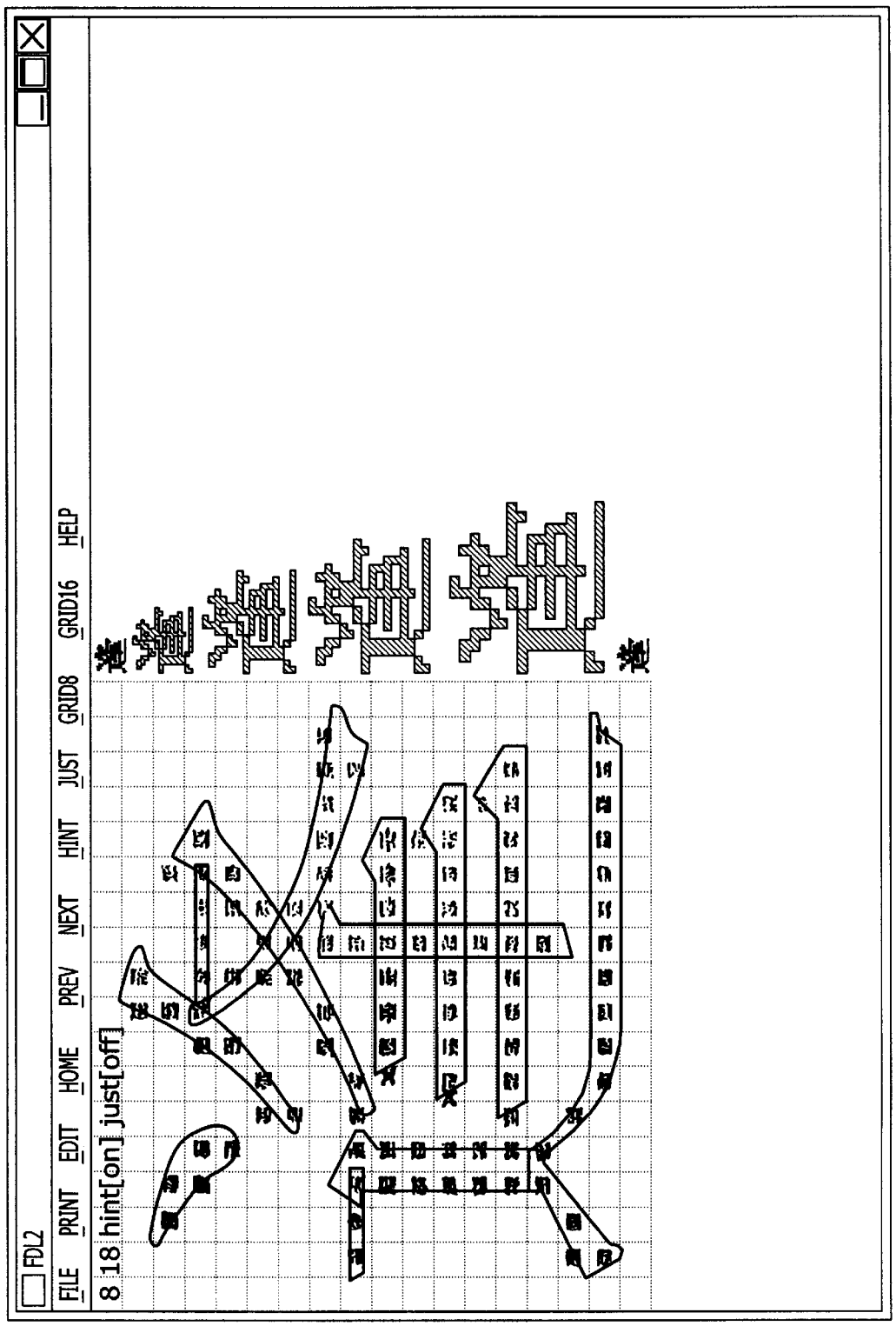

As shown in FIG. 9A, an overlap has occurred between two horizontal strokes 220 and 222. This situation is unacceptable because the viewer sees strokes 220 and 222 as a single stroke. The following rules resolve the possible occurrence of an overlap. Three strokes 220, 222 and 224 are illustrated in parallel and must not overlap each other. The first rule is that the top stroke is allowed to move up one pixel. The second rule is that the bottom stroke is allowed to be moved down one pixel. The procedure thus follows: if an overlap of strokes is detected, first check if the lower stroke can be moved down one pixel; otherwise, move the top stroke up one pixel. A stroke may not be moved up or down if it fails to fulfill a predefined criteria. In the example of FIG. 9, the criteria is that the horizontal strokes must maintain at least a one pixel distance from the end of vertical stroke 226 of which they make contact. FIG. 9B illustrates the displayed result of the procedure described above.

Figure 10A:
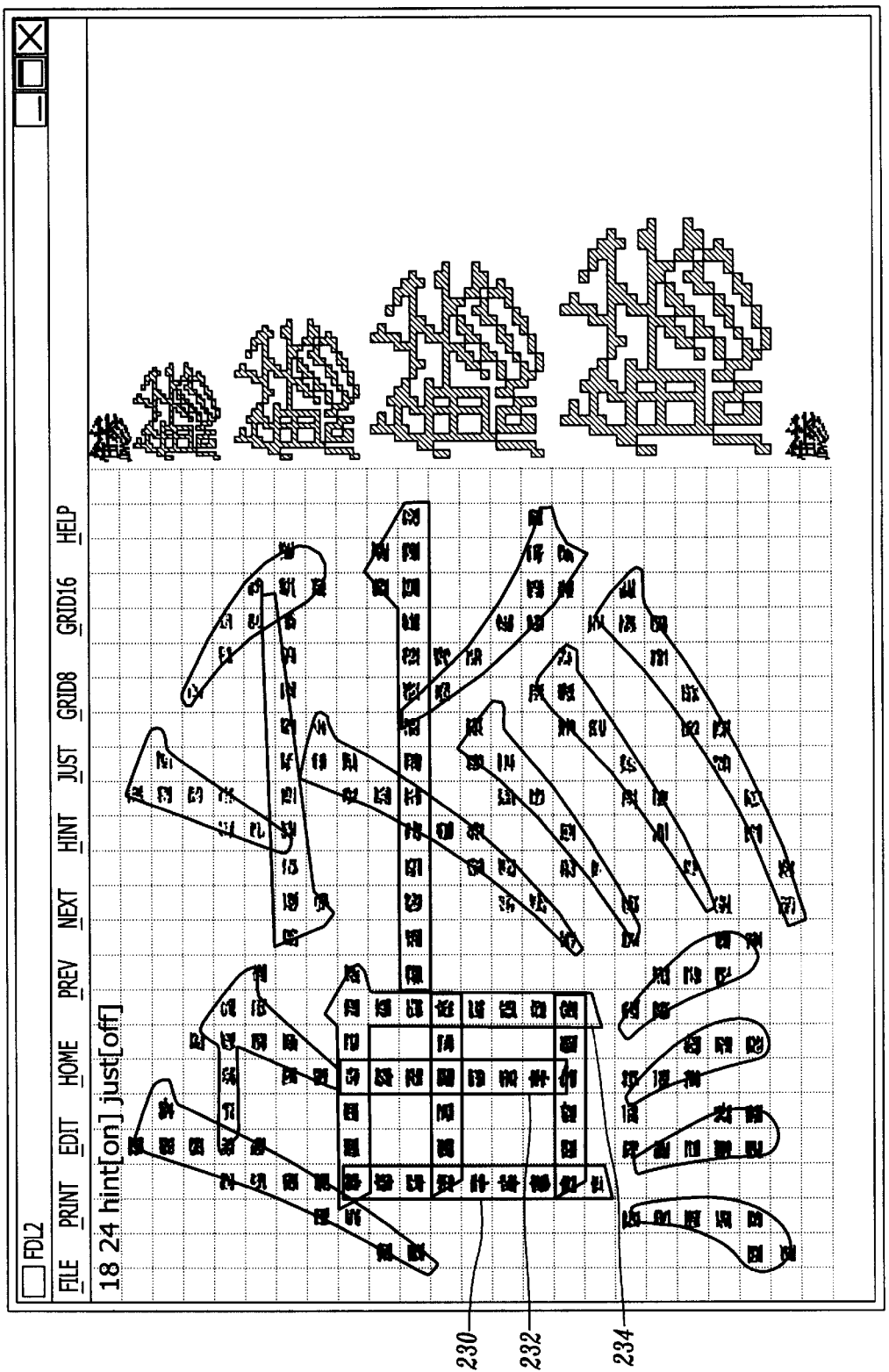
FIGS. 10A and 10B are screen shots illustrating three unbalanced strokes and three balanced strokes in a character, respectively.
Figure 10B:
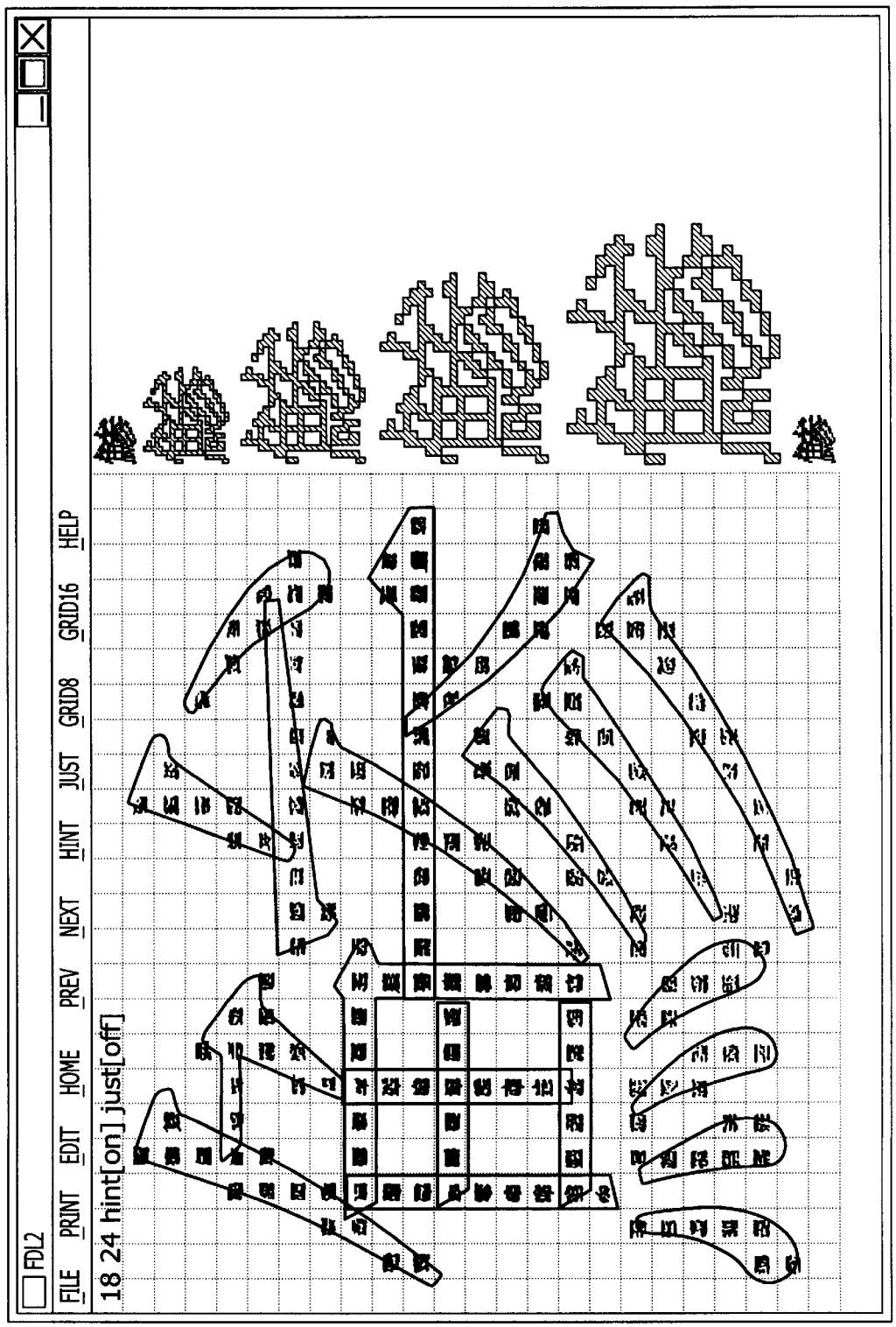

As shown in FIG. 10A, vertical strokes 230, 232 and 234 are displayed in the character shown with the center stroke 232 one pixel distance closer to right vertical stroke 234 than to left stroke 230. However, in this particular character, the vertical strokes 230, 232 and 234 must maintain symmetry (equal white space between the strokes). The following procedures are invoked if this situation occurs. First, the character is checked to see if the smaller white space can expand. If the smaller space between the strokes cannot be expanded, the larger space between the strokes is reduced to equal that of the smaller space. In the example of FIG. 10A, right stroke 234 is moved one space to the right to make the white space between it and the center stroke 232 equal to two pixels, thus equal to the pixel space between center stroke 232 and left stroke 230. If right stroke 234 had no room to move, left stroke 230 would have moved one pixel closer to center pixel 232, thus making the spaces between the strokes equal. FIG. 10B illustrates the result of the procedure just described.

Figure 11A:
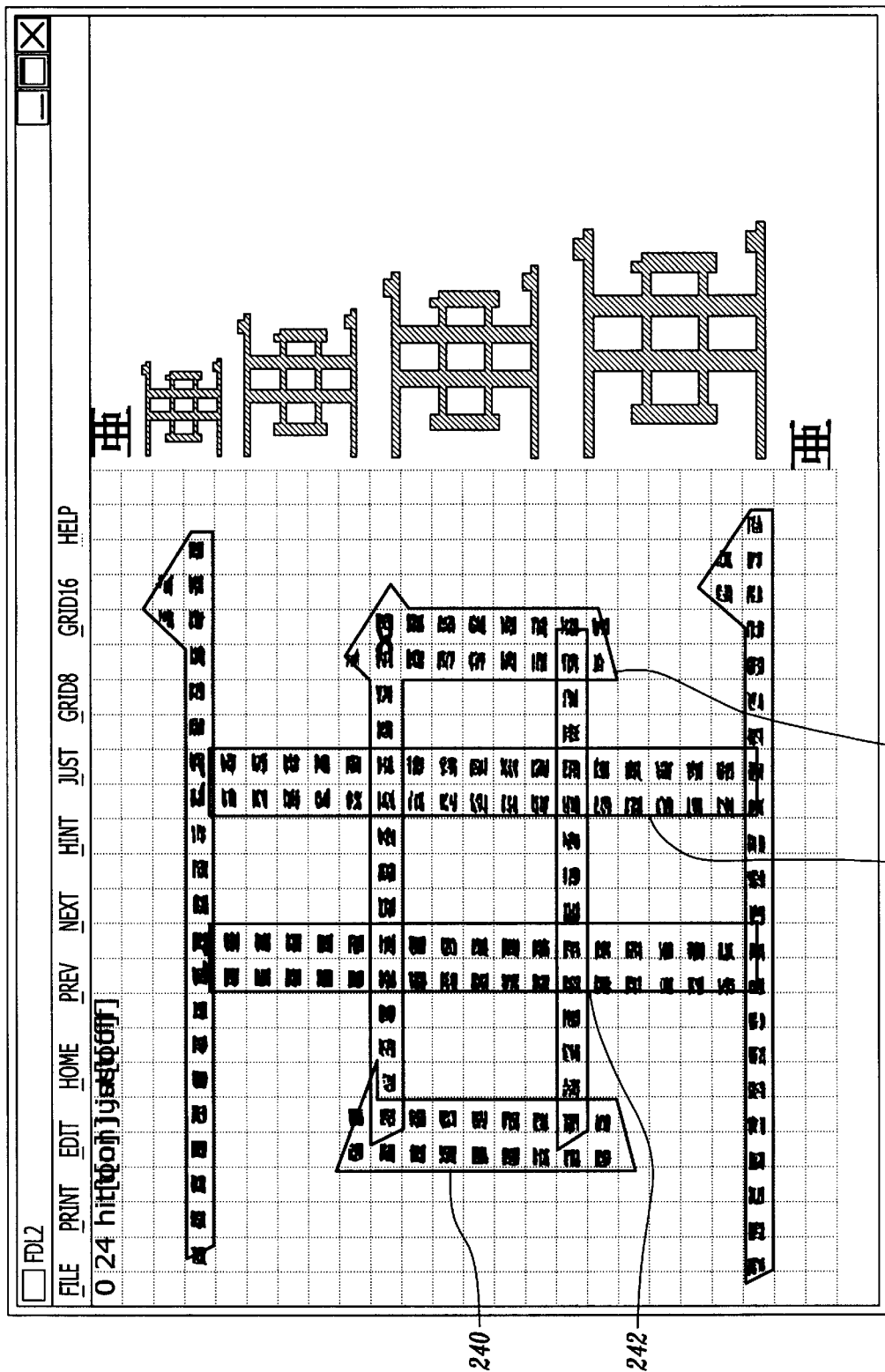
FIGS. 11A and 11B are screen shots illustrating four unbalanced strokes and four balanced strokes in a character, respectively.
Figure 11B:
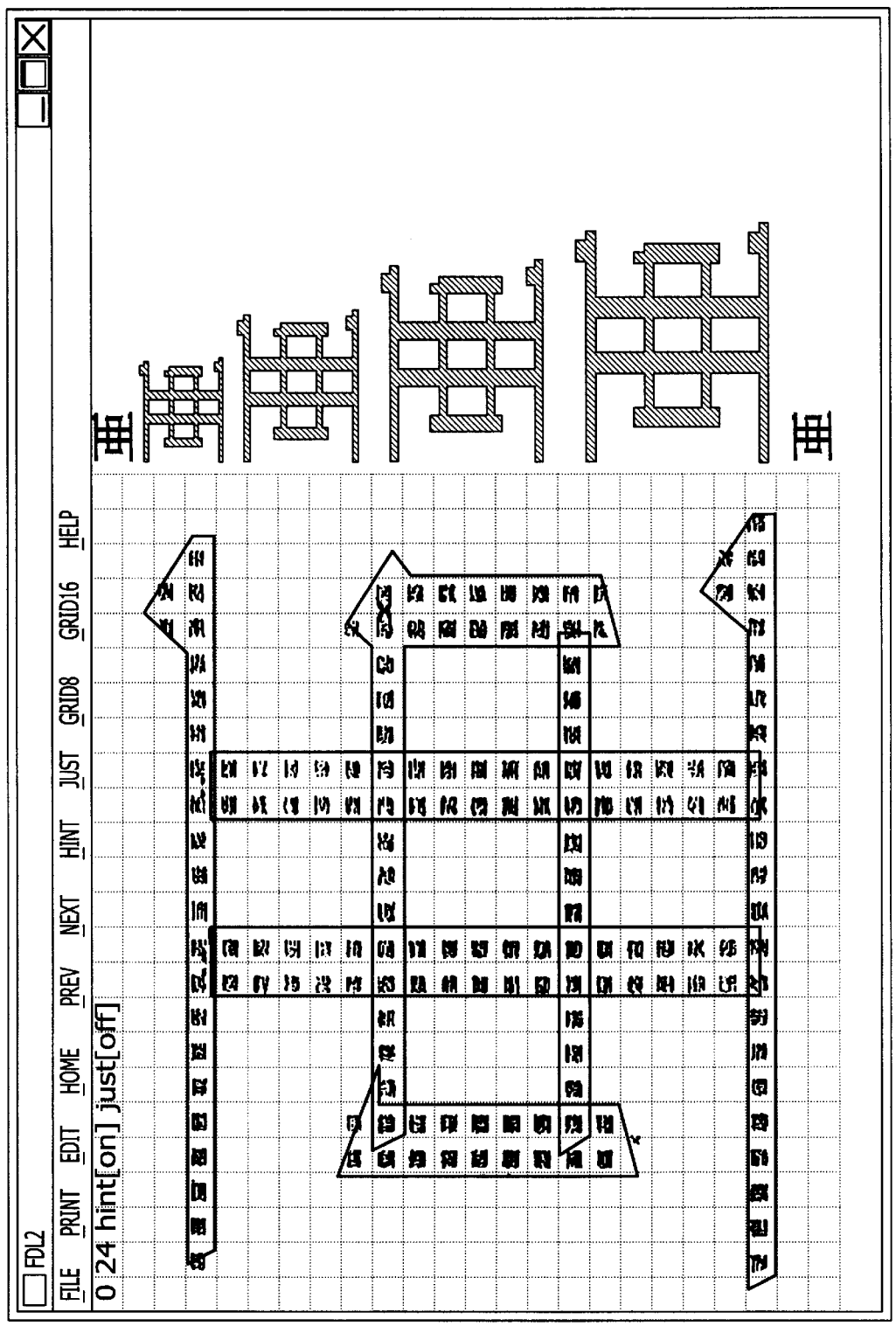

FIG. 11A illustrates an inconsistency that may occur with four parallel strokes that must be displayed with equal spacing. The spaces between the two center vertical strokes 242 and 246 and the space between the left stroke 240 and center stroke 242 equals three pixel widths. However, the space between center stroke 246 and right stroke 248 is equal to two pixel widths. The same procedure applies as that described above for the three parallel stroke situation. However, there is just one more stroke that must be moved in case of a display error. FIG. 11B illustrates that the right stroke 248 had enough space within the character space to move and make the space between right stroke 248 and center stroke 246 equal to three, thereby producing equal spaces between the vertical strokes.

FIG. 12 shows an illustration of the stored data of the font identifier 410 of a "Ming-type" font created in the CAD tool. The starred symbols 191 indicate that the associated key points are labeled with hint information. Column 192 is a list of feature points represented by codes. Column 193 is a list of referenced key points with X and Y coordinates. Column 194 is a list of coded width values. Column 195 is a list of referenced relative positions for determining feature point positions relative to key point locations. The relative position values in column 195 are determined by the predefined formulas for calculating relative coordinate positions, for example see Equations 1–4. Column 196 is a list of curve segments represented in codes. Column 197 lists pairs of two feature points for each curve segment. Column 198 is a list of ratios for determining the midcontrol points. The midcontrol point ratios of column 198 are calculated from Equations 5–8. Column 199 is a list of stroke areas represented in codes, and finally, Column 200 indicates the feature points which form the area vertices.

The stored key point locations show at the top of FIG. 12 are stored in accordance with a predetermined resolution value. In the example of FIG. 12 the key point location shown is stored relative to a 256×256 character space. If the character 410 is displayed in a character space other than a 256×256 character space, a proportional calculation is performed to maintain key point positions within the character space.

CHARACTER RENDERING

The font generation technique is essentially the reverse process of the font creation techniques. The first step centers each labeled key point with hint information in the dot matrix grid (pixel) that it is addressed to. If a key point is not labeled with hint information, the key point location is unchanged in the display character space. Then, the feature points are calculated according to the generated and stored values relative to the location of the key points and width values. Curve segments between the calculated feature points are calculated according to curve ratios stored in the curve level table. The curve ratios are retrieved from the curve level table according to the level in the table the ratio is assigned and the curve level retrieved according to the resolution level of the output device. The curve segments join to form the outline of the strokes. Finally, a filling technique fills the area within the stroke outline. The filling technique activates a pixel according to predefined criteria. In the present invention a pixel is filled if at least half of the pixel is covered by the area within the calculated stroke outline or if the center of a pixel is within the calculated stroke outline or if an extending portion of the calculated stroke outline is predefined as requiring display emphasis. In order to save processing time, a commonly known filing technique uses a predetermined number of cords to represent curve segments of various radii for activating pixels. Other type of filling techniques may be used to accomplish efficient generation of the characters.

Figure 13:
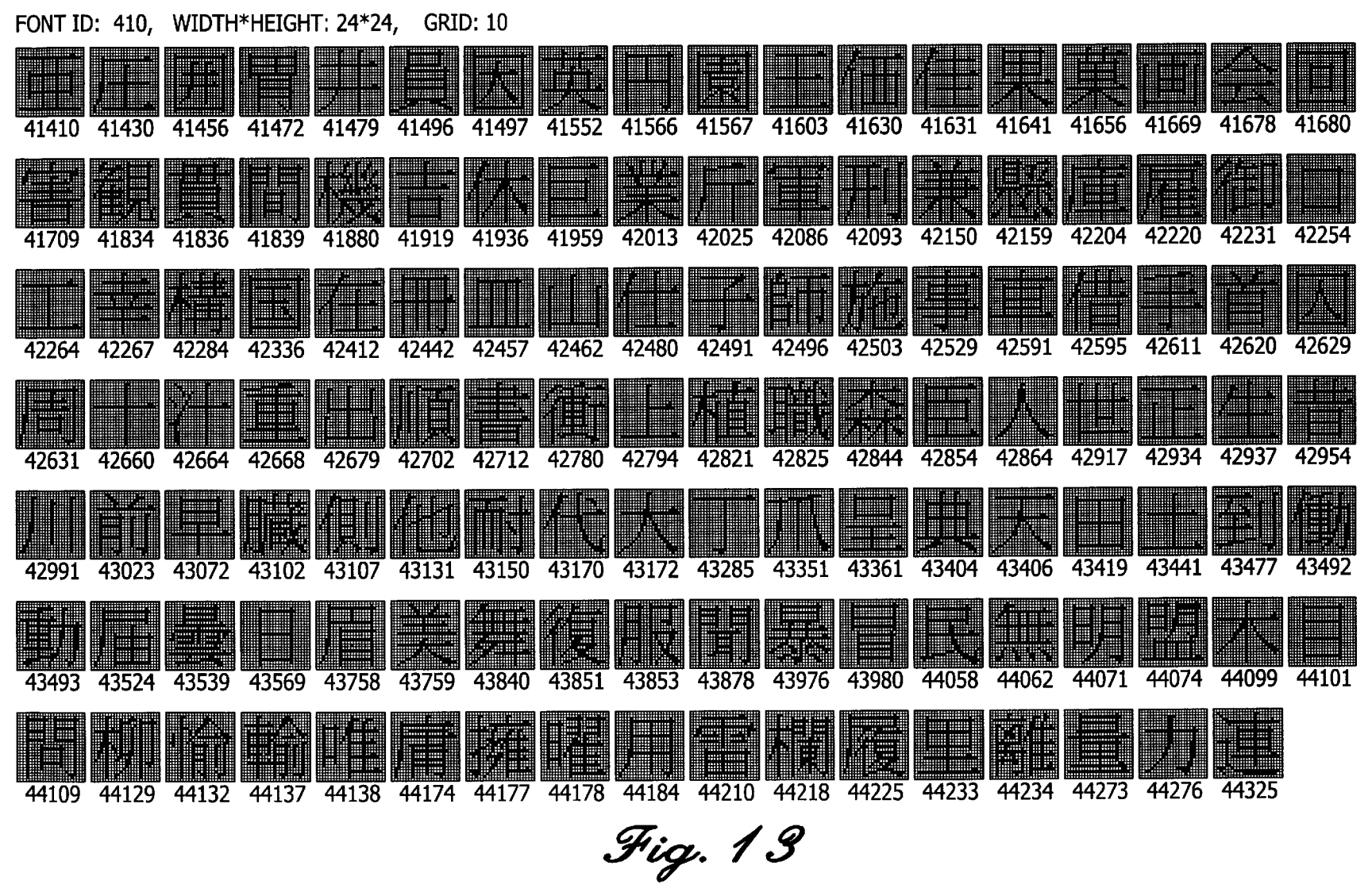

FIG. 13 shows the output result of sample characters of a "Ming-type" font in a 24×24, low resolution, single character bitmap produced by the method of this invention.

While the preferred embodiment of the invention has been illustrated and described, it will be apparent that various changes can be made therein without departing from the spirit and scope of the invention.

The embodiments of the invention in which an exclusive property or privilege is claimed are defined as follow:

1. A character generating method for generating character bitmap images in a character bitmap space for display on an output device, wherein each generated character comprises a plurality of strokes, said method comprising the steps of:

a. selecting a character for display on the output device, wherein each stroke comprises predefined, prestored key points, width values, curve ratios stored in a curve ratio table, and feature points that have a predefined spatial relationship to the key points and wherein a key point is labeled with hint information if the key point requires a predefined specific display location;

b. determining the resolution of the output device;

c. retrieving curve ratios from the prestored curve level table according to the determined resolution of the output device;

d. calculating non-labeled key point positions that are associated with the strokes of said selected character in the characters display space at the key points' prestored position;

e. calculating labeled key point positions that are associated with the strokes of said selected character in the characters display space at predetermined positions relative to the bitmap cell that contains the labeled key points' prestored position; and f. rendering the strokes of the selected character in the character bitmap space on the output device according to the width values, the retrieved curve ratios, and feature points of the strokes and calculated, labeled and non-labeled key points.

2. The character generating method of claim 1, wherein step f further comprises the steps of:

i) calculating feature points according to the predefined spatial relationship with the key points;

ii) calculating at least one curve segment between consecutive generated feature points according to at least one retrieved curve ratio;

iii) calculating outlines for strokes by connecting the generated curve segments;

iv) activating pixels on the output device if at least half of the pixel is covered by the area within the calculated stroke outline, if the center of a pixel is within the calculated stroke outline or if a specific feature of the calculated stroke outline is predefined as requiring display emphasis.

3. The character generating method of claim 2, wherein step f.ii further comprises the steps of:

calculating at least one mid control point existing between two consecutive feature points according to the at least one curve ratio; and calculating said at least one curve segment with Bezier triangle curve generation according to the defined at least one mid control point and the corresponding feature points.

4. The character generating method of claim 1, wherein step e further comprises the steps of:

calculating the bitmap cell width of the strokes in said selected characters;

positioning the labeled key point of a stroke at the nearest bitmap cell center, if the calculated bitmap cell width of the stroke is odd; and positioning the labeled key point of a stroke on the nearest bitmap cell edge, if the calculated bitmap cell width of the stroke is even.

5. The character generating method of claim 1, wherein each stroke that is parallel with another stroke within a selected character further comprises a predefined spatial relationship with any parallel stroke.

6. The character generating method of claim 5, wherein step e further comprises calculating labeled key point positions of key points of a stroke that is parallel to at least one other stroke according to said predefined spatial relationship with said at least one parallel stroke.

7. A character generating apparatus for generating character bitmap images in character bitmap space for display on an output device, wherein each generated character comprises a plurality of strokes, said apparatus further comprising:

means for selecting a character for display on the output device, wherein each stroke comprise predefined, prestored key points, width values, curve ratios stored in a curve ratio table, and feature points that have a predefined spatial relationship to the key points and wherein a key point is labeled with hint information if the key point requires a predefined specific display location;

means for determining the resolution of the output device;

means for retrieving ratios values from the prestored curve level table according to the determined resolution of the output device;

means for calculating non-labeled key point positions that are associated with the strokes of said selected character in the characters display space at the key points' prestored position;

means for calculating labeled key point positions that are associated with the strokes of said selected character in the characters display space at predetermined positions relative to the bitmap cell that contains the labeled key points' prestored position; and means for rendering the strokes of the selected character in the character bitmap space on the output device according to the width values, the retrieved curve ratios, and feature points of the strokes and calculated, labeled and non-labeled key points.

8. The character generating apparatus of claim 7, wherein said means for rendering the strokes further comprises:

means for calculating feature points according to the predefined spatial relationship with the key points;

means for calculating at least one curve segment between consecutive generated feature points according to at least one retrieved curve ratio;

means for calculating outlines for strokes by connecting the generated curve segments;

means for activating pixels on the output device if at least half of the pixel is covered by the area within the calculated stroke outline or if the center of a pixel is within the calculated stroke outline or if a specific feature of the calculated stroke outline is predefined as requiring display emphasis.

9. The character generating apparatus of claim 8, wherein said means for calculating outlines further comprises:

means for calculating at least one mid control point existing between two consecutive feature points according to the at least one curve ratio; and means for calculating said at least one curve segment with Bezier triangle curve generation according to the defined at least one mid control point and the corresponding feature points.

10. The character generating apparatus of claim 7, wherein said means for calculating further comprises:

means for calculating the bitmap cell width of the strokes in said selected characters;

means for positioning the labeled key point of a stroke at the nearest bitmap cell center, if the calculated bitmap cell width of the stroke is odd; and means for positioning the labeled key point of a stroke on the nearest bitmap cell edge, if the calculated bitmap cell width of the stroke is even.

11. The character generating apparatus of claim 7, wherein each stroke that is parallel with another stroke within a selected character further comprises a predefined spatial relationship with any parallel stroke.

12. The character generating apparatus of claim 11, wherein said means for calculating further comprises means for calculating labeled key point positions of key points of a stroke, that is parallel to at least one other stroke, according to said predefined spatial relationship with said at least one parallel stroke.

13. A computer readable medium encoded with a data structure for generating character bitmap images in character bitmap space for display on an output device, wherein each generated character comprises a plurality of strokes, said computer readable medium further comprising:

means for selecting a character for display on the output device, wherein each stroke comprise predefined, prestored key points, width values, curve ratios stored at different predefined levels of a tree type data structure, and feature points that have a predefined spatial relationship to the key points and wherein a key point is labeled with hint information if the key point requires a predefined specific display location;

means for determining the resolution of the output device;

means for retrieving ratios values from the prestored tree type data structure according to the determined resolution of the output device;

means for calculating non-labeled key point positions that are associated with the strokes of said selected character in the characters display space at the key points' prestored position;

means for calculating labeled key point positions that are associated with the strokes of said selected character in the characters display space at predetermined positions relative to the bitmap cell that contains the labeled key points' prestored position; and means for rendering the strokes of the selected character in the character bitmap space on the output device according to the width values, the retrieved curve ratios, and feature points of the strokes and calculated, labeled and non-labeled key points.

14. The computer readable medium of claim 13, wherein said means for rendering the strokes further comprises:

means for calculating feature points according to the predefined spatial relationship with the key points;

means for calculating at least one curve segment between consecutive generated feature points according to at least one retrieved curve ratio;

means for calculating outlines for strokes by connecting the generated curve segments;

means for activating pixels on the output device if at least half of the pixel is covered by the area within the calculated stroke outline or if the center of a pixel is within the calculated stroke outline or if a specific feature of the calculated stroke outline is predefined as requiring display emphasis.

15. The computer readable medium of claim 14, wherein said means for calculating outlines further comprises:

means for calculating at least one mid control point existing between two consecutive feature points according to the at least one curve ratio; and means for calculating said at least one curve segment with Bezier triangle curve generation according to the defined at least one mid control point and the corresponding feature points.

16. The computer readable medium of claim 13, wherein said means for calculating further comprises:

means for calculating the bitmap cell width of the strokes in said selected characters;

means for positioning the labeled key point of a stroke at the nearest bitmap cell center, if the calculated bitmap cell width of the stroke is odd; and means for positioning the labeled key point of a stroke on the nearest bitmap cell edge, if the calculated bitmap cell width of the stroke is even.

17. The computer readable medium of claim 13, wherein each stroke that is parallel with another stroke within a selected character further comprises a predefined spatial relationship with any parallel stroke.

18. The computer readable medium of claim 17, wherein said means for calculating further comprises means for calculating labeled key point positions of key points of a stroke, that is parallel to at least one other stroke, according to said predefined spatial relationship with said at least one parallel stroke.

19. A computer graphical user interface tool for generating stroke-based fonts using stroke representation and stroke shape bitmap generation for displaying stroke-based fonts in a bitmap space, said interface tool includes an output device, processor and memory, said graphical user interface comprising:

means for generating a set of basic strokes from an observed scanned set of master characters, wherein each basic stroke in the generated set of basic strokes includes key points and width values;

means for labeling key points of basic strokes, wherein keypoints are labeled if said respective stroke requires rendering to a specific display location;

means for defining a stroke shape formula for each basic stroke according to the key points and width values;

means for defining feature points for each basic stroke according to said defined stroke shape formula;

means for defining curve segments between said defined feature points, said means for defining curve segments between said defined feature points further comprising:

means for generating curve ratios of second order Bezier curves between said defined feature points according to the outline of strokes in the observed scanned set of master characters;

means for assigning the second order Bezier curve ratios to levels in a curve level table; and means for assigning the levels in the curve level table to ranges of bitmap resolutions; and means for storing key points, width values, the defined stroke shape formula, feature points and curve segments in said memory.

20. A method for generating stroke-based fonts using stroke representation and stroke shape bitmap generation for displaying stroke-based fonts in a bitmap space, said method comprising:

generating a set of basic strokes from an observed scanned set of master characters, wherein each basic stroke in the generated set of basic strokes includes key points and width values;

labeling key points of the basic strokes, wherein keypoints are labeled if said respective stroke requires rendering to a specific display location;

defining a stroke shape formula for each basic stroke according to the key points and width values;

defining feature points for each basic stroke according to said defined stroke shape formula;

defining curve segments between said defined feature points, said defining curve segments between said defined feature points further comprises:

generating curve ratios of second order Bezier curves between said defined feature points according to the outline of strokes in the observed scanned set of master characters;

assigning the second order Bezier curve ratios to levels in a curve level table; and assigning the levels in the curve level table to ranges of bitmap resolutions; and storing key points, width values, the defined stroke shape formula, feature points and curve segments.

* * * * *